United States Patent
Torii et al.

(10) Patent No.: US 7,750,085 B2
(45) Date of Patent: Jul. 6, 2010

(54) WATER-ABSORBING AGENT AND ITS PRODUCTION PROCESS

(75) Inventors: Kazushi Torii, Himeji (JP); Kenji Kadonaga, Kakogawa (JP); Hirofumi Shibata, Himeji (JP); Taku Iwamura, Himeji (JP); Kazuki Kimura, Himeji (JP); Koji Miyake, Okayama (JP); Kozo Nogi, Kakogawa (JP)

(73) Assignee: Nippon Shokubai Co., Ltd., Osaka (JP)

( * ) Notice: Subject to any disclaimer, the term of this patent is extended or adjusted under 35 U.S.C. 154(b) by 841 days.

(21) Appl. No.: 11/373,215

(22) Filed: Mar. 13, 2006

(65) Prior Publication Data

US 2006/0247351 A1 Nov. 2, 2006

(30) Foreign Application Priority Data

Mar. 14, 2005 (JP) ............... 2005-071104
Feb. 8, 2006 (JP) ............... 2006-031177

(51) Int. Cl.
*C08F 20/02* (2006.01)

(52) U.S. Cl. ............ 525/330.2; 525/191; 525/195; 525/196; 525/221; 525/370; 525/329.7; 428/407

(58) Field of Classification Search .......... 524/437; 525/191, 196, 221, 329.7, 370, 384
See application file for complete search history.

(56) References Cited

U.S. PATENT DOCUMENTS

| | | | |
|---|---|---|---|
| 632,352 | A | 9/1899 | Jones |
| 3,935,099 | A | 1/1976 | Weaver et al. |
| 3,959,569 | A | 5/1976 | Burkholder, Jr. |
| 4,076,663 | A | 2/1978 | Masuda et al. |
| 4,093,776 | A | 6/1978 | Aoki et al. |
| 4,124,748 | A | 11/1978 | Fujimoto et al. |
| 4,367,323 | A | 1/1983 | Kitamura et al. |

(Continued)

FOREIGN PATENT DOCUMENTS

EP 0 456 136 A2 11/1991

(Continued)

OTHER PUBLICATIONS

Definition of "contain" from Merriam-Webster online dicationary, Apr. 2009.*

(Continued)

*Primary Examiner*—Vasu Jagannathan
*Assistant Examiner*—Robert C Boyle
(74) *Attorney, Agent, or Firm*—Harness, Dickey & Pierce, P.L.C.

(57) ABSTRACT

A water-absorbing agent according to the present invention includes water-absorbent resin particles having an internal cross-linked structure, wherein a vicinity of a surface of the water-absorbent resin particle is cross-linked with a surface cross-linking agent, and the water-absorbent resin particle has therein a sea-island structure having (i) part containing a first water-soluble multivalent metal salt such as aluminum sulfate and (ii) part not containing the first water-soluble multivalent metal salt. With this arrangement, it is possible to provide a water-absorbing agent having less water-soluble component content, more excellent liquid permeability, and more excellent water retention under pressure than the conventional water-absorbing agent.

16 Claims, 8 Drawing Sheets

U.S. PATENT DOCUMENTS

| | | | |
|---|---|---|---|
| 4,389,513 A | 6/1983 | Miyazaki | |
| 4,446,261 A | 5/1984 | Yamasaki et al. | |
| 4,625,001 A | 11/1986 | Tsubakimoto et al. | |
| 4,654,039 A | 3/1987 | Brandt et al. | |
| 4,683,274 A | 7/1987 | Nakamura et al. | |
| 4,690,996 A | 9/1987 | Shih et al. | |
| 4,721,647 A | 1/1988 | Nakanishi et al. | |
| 4,738,867 A | 4/1988 | Itoh et al. | |
| 4,748,076 A | 5/1988 | Saotome | |
| 4,769,427 A | 9/1988 | Nowakowsky et al. | |
| 4,873,299 A | 10/1989 | Nowakowsky et al. | |
| 4,950,692 A | 8/1990 | Lewis et al. | |
| 5,164,459 A | 11/1992 | Kimura et al. | |
| 5,250,640 A | 10/1993 | Irie et al. | |
| 5,264,495 A | 11/1993 | Irie et al. | |
| 5,275,773 A | 1/1994 | Irie et al. | |
| 5,478,879 A | 12/1995 | Kajikawa et al. | |
| 5,610,208 A | 3/1997 | Dairoku et al. | |
| 6,071,976 A | 6/2000 | Dairoku et al. | |
| 6,228,930 B1 | 5/2001 | Dairoku et al. | |
| 6,300,423 B1 | 10/2001 | Engelhardt et al. | |
| 6,458,921 B1 | 10/2002 | Dairoku et al. | |
| 6,565,768 B1 | 5/2003 | Dentler et al. | |
| 6,605,673 B1 | 8/2003 | Mertens et al. | |
| 2002/0040095 A1 | 4/2002 | Dairoku et al. | |
| 2002/0193492 A1 | 12/2002 | Wilson | |

FOREIGN PATENT DOCUMENTS

| | | | |
|---|---|---|---|
| EP | 0 530 517 A1 | 3/1993 | |
| EP | 0 844 270 A1 | 5/1998 | |
| EP | 1 178 059 A2 | 2/2002 | |
| JP | 05-202199 | 8/1993 | |
| JP | 06-041319 | 2/1994 | |
| JP | 09-235378 | 9/1997 | |
| JP | 09-509591 | 9/1997 | |
| JP | 09-278900 | 10/1997 | |
| JP | 11-106514 | 4/1999 | |
| JP | 11-254429 | 9/1999 | |
| JP | 2002-527547 | 8/2002 | |
| JP | 2002-539281 | 11/2002 | |
| JP | 2003-516431 | 5/2003 | |
| JP | 2004-002891 | 1/2004 | |
| WO | WO 93/05080 | 3/1993 | |
| WO | WO 95/05856 | 3/1995 | |
| WO | WO 95/22356 | 8/1995 | |
| WO | WO 01/89591 A2 | 11/2001 | |
| WO | 2004/069915 | * 8/2004 | |
| WO | WO 2004/113452 A1 | 12/2004 | |

OTHER PUBLICATIONS

Definition of "involve" from Merriam-Webster online dicationary, Apr. 2009.*

International Search Report mailed Apr. 25, 2006 for the corresponding International Application No. PCT/JP2006/304895.

* cited by examiner

WATER-ABSORBING AGENT AND ITS PRODUCTION PROCESS

This Nonprovisional application claims priority under 35 U.S.C. §119(a) on Patent Application No. 071104/2005 filed in Japan on Mar. 14, 2005, and Patent Application No. 031177/2006 filed in Japan on Feb. 08, 2006, the entire contents of which are hereby incorporated by reference.

FIELD OF THE INVENTION

The present invention relates to (i) a water-absorbing agent favorably used in sanitary materials such as disposable diapers, sanitary napkins, and so-called incontinence pads, and (ii) a production process for the water-absorbing agent.

BACKGROUND OF THE INVENTION

An absorbent core containing a hydrophilic fiber such as pulp and a water-absorbent resin as its components is widely used in sanitary materials such as disposable diapers, sanitary napkins, incontinence pads and the like, in order to absorb body fluids.

Recently, the sanitary material has higher performance and a thinner size, and an amount of the water-absorbent resin used for each sanitary material tends to increase, and also a ratio of the water-absorbent resin tends to increase with respect to the whole absorbent core constituted of the water-absorbent resin and a hydrophilic fiber. That is, by using (i) a smaller amount of a hydrophilic fiber whose bulk density is low and (ii) a larger amount of a water-absorbent resin having a superior water absorbing property and high bulk density, a ratio of the water-absorbent resin contained in the absorbent core is increased, thereby making the sanitary material thinner without decreasing an amount of water absorption.

However, the sanitary material which includes a smaller amount of the hydrophilic fiber and a larger amount of the water absorbent resin is preferable merely in terms of liquid storage, but raises problems in terms of distribution and diffusion of liquid in actual use in diapers. For example, when a large amount of the water absorbent resin is used, the water absorbent resin becomes soft and gelatinous upon absorbing water. This causes a gel blocking phenomenon. As a result, a liquid diffusing property of the diaper significantly drops. In order to avoid such phenomenon and to keep high absorbing property of the absorbent core, a ratio of the hydrophilic fiber and the water absorbent resin is inevitably limited, so that there is a limit in making the sanitary material thinner.

In view of this, for example, Patent document 1 discloses that an internal cross-linking agent for forming cross-linkage by covalent bonding and an internal cross-linking agent for forming cross-linkage by multivalent metal bonding are used in combination as an internal cross-linking agent for a water-absorbent resin so that a water-absorbent resin having a low water absorption rate is produced. In Patent document 1, multivalent metal exists evenly inside the water-absorbent resin. Also, Patent document 1 discloses that a produced water-absorbent resin is subjected to surface cross-linking with an organic cross-linking agent.

For example, Patent documents 2 through 4 disclose that for production of a water-absorbent resin, surface treatment by multivalent metal and organic surface cross-linking treatment with a surface cross-linking agent are used in combination. The combination use mainly exerts the following effects: prevention of flocculation of a water-absorbent resin and enhancement of liquid permeability. In this case, multivalent metal exists only in the vicinity of the surface of the water-absorbent resin particle.

Patent document 5 discloses a process for producing a water-absorbent resin by agglomeration. Patent document 5 also discloses that multivalent metal is used as a surface cross-linking agent.

However, even when such a water-absorbent resin is used in an absorbent core, the water-absorbent resin is not enough to maintain absorption properties of the absorbent core.

By the way, a water-absorbent resin is a cross-linked polymer having water-absorbing property. A vicinity of the surface of the water-absorbent resin particle can be subjected to surface cross-linking treatment for forming a cross-linked structure therein. The surface cross-linking treatment is performed to appropriately control water-absorption properties of the water-absorbent resin particles so that various performances are balanced.

Generally, it is preferable that a water-absorbent resin has a low content of fine powder (water-absorbent resin fine particles). If a water-absorbent resin used in sanitary material has a high content of the fine powder, the fine powder forms a gel block in the sanitary material when the sanitary material absorbs urine. Formation of the gel block becomes a factor of lowering liquid permeability.

In the case of handing a water-absorbent resin having the fine powder remaining therein, the fine powder dissipates in the form of powder dust. This becomes a factor of lowing yield of a water-absorbent resin. Further, the fine powder in powder dust form may have industrial safety and health concerns. Here, the fine powder is, for example, a fine powder composed of fine particles each having a particle diameter of not more than 150 μm, and is generated in the process of the production for a water-absorbent resin. Especially, a powder dust which is considered to have industrial safety and health concerns is, for example, a fine particle having a particle diameter of not more than 10 μm. Examples of a form that the fine powder takes include a fine particle gel during reversed suspension polymerization and a fine powder that occurs in the process of pulverizing a dried polymer gel used for production of a water-absorbent resin, or in the process of classifying obtained pulverized particles.

One example of a method for solving the problem is to collect the fine powder in the process of the production for a water-absorbent resin so that the collected fine powder is reused (recycled) in the previous step of the production process for a water-absorbent resin. However, the fine powder is agglomerated for its reuse because the fine powder itself is difficult to handle. Some methods for agglomerating the fine powder have been suggested (e.g. Patent document 6).

The present inventors have been aware of the following problem associated with agglomeration of fine powder.

That is, the agglomeration is performed by adding a water base liquid to a fine power. However, the fine powder has a large surface area. Because of this, in the case of a fine powder which is not subjected to surface cross-linking treatment, fine particles at portions of the fine powder where they are in contact with the water base liquid quickly absorb the water base liquid. As a result of this, fish eye (nonuniform agglomeration) occurs, and uneven gelation thus occurs. This decreases the efficiency in agglomeration and increases a rate of returning from an agglomerated product to a fine powder.

On the other hand, in the case of a fine powder having been subjected to surface cross-linking treatment, nonuniform agglomeration is less likely to occur. However, the fine powder having been subjected to surface cross-linking treatment has a low surface bonding property due to the surface cross-linking treatment, and fine powders are therefore weakly bound together. Thus, the agglomerated product is easy to damage under a mechanical impact. The production process for a water-absorbent resin includes the process of pulverizing a dried polymer gel and the process of classifying obtained pulverized particles. Thus, upon mechanical impact during these processes, the agglomerated product can possibly turn back to fine powder form. Even after the agglomerated product is turn into commercial products, the agglomerated product can possibly be damaged during storage of the commercial product and in the process of using the agglomerated product in sanitary materials or other applications.

[Patent document 1]
U.S. Patent Application Publication No. 2002/193492
[Patent document 2]
U.S. Pat. No. 632,352
[Patent document 3]
Japanese PCT National Phase Unexamined Patent Publication No. 539281/2002
(Tokuhyo 2002-539281)
[Patent document 4]
International Publication WO04/113452
[Patent document 5]
Japanese Unexamined Patent Publication No. 254429/1999
(Tokukaihei 11-254429)
[Patent document 6]
Japanese Unexamined Patent Publication No. 106514/1999
(Tokukaihei 11-106514)
[Patent document 7]
Japanese Unexamined Patent Publication No. 254429/1999
(Tokukaihei 11-254429)

SUMMARY OF THE INVENTION

An object of the present invention is to provide a water-absorbing agent and its production process which realize less water-soluble component content, more excellent liquid permeability, and more excellent water retention under pressure than the conventional water-absorbing agent.

Another object of the present invention is to provide (i) an agglomerated water-absorbent resin which is excellent in mechanical strength and can be used not only as a product but also as a recycled material, (ii) a production process for the water-absorbing agent excellent in agglomeration efficiency, and use of the water-absorbing agent. Still another object of the present invention is to provide a water-absorbing agent having a low content of fine powder and thus realizing low powder dust emissions.

In order to achieve the above object, a production process for a water-absorbing agent of the present invention is a production process for a water-absorbing agent containing water-absorbent resin particles having an internal cross-linked structure obtained by polymerizing a water-soluble unsaturated monomer, and includes the following steps (A) and (B):

(A) step of forming non-surface-treated water-absorbent resin particles having an internal cross-linked structure obtained by polymerizing a water-soluble unsaturated monomer in the presence of a covalent bonding cross-linking agent; and (B) step of causing surface-treated water-absorbent resin fine particles to be contained in the non-surface-treated water-absorbent resin particles.

This allows a non-surface-treated water-absorbent resin particle to have a structure in which surface-treated water-absorbent resin fine particles are localized in the non-surface-treated water-absorbent resin particle (sea-island structure). A water-absorbing agent including such a water-absorbent resin particle has such water absorption properties as less water-soluble component content, more excellent liquid permeability, and more excellent water retention under pressure than the conventional water-absorbing agent.

In order to achieve the above object, another production process for a water-absorbing agent of the present invention is a production process for a water-absorbing agent containing water-absorbent resin particles having an internal cross-linked structure obtained by polymerizing a water-soluble unsaturated monomer, and includes the following steps (A') and (B'):

(A') forming surface-treated water-absorbent resin particles having an internal cross-linked structure obtained by polymerizing a water-soluble unsaturated monomer in the presence of a covalent bonding cross-linking agent; and (B') causing non-surface-treated water-absorbent resin fine particles to be contained in the surface-treated water-absorbent resin particles.

This allows a surface-treated water-absorbent resin particle to have a structure in which non-surface-treated water-absorbent resin fine particles are localized in the surface-treated water-absorbent resin particle (sea-island structure). A water-absorbing agent including such a water-absorbent resin particle has such water absorption properties as less water-soluble component content, more excellent liquid permeability, and more excellent water retention under pressure than the conventional water-absorbing agent.

In order to achieve the above object, a water-absorbing agent of the present invention is obtained by any of the foregoing production processes for a water-absorbing agent.

This water-absorbing agent includes a water-absorbent resin particle having water-absorbent resin fine particles localized therein. On this account, it is possible to provide a water-absorbing agent having such water absorption properties as less water-soluble component content, more excellent liquid permeability, and more excellent water retention under pressure than the conventional water-absorbing agent.

In order to achieve the above object, a water-absorbing agent including water-absorbent resin particles having an internal cross-linked structure obtained by polymerizing a water-soluble unsaturated monomer, is arranged such that the internal cross-linked structure includes covalent bonds, and the water-absorbent resin particle has a sea-island structure having (i) part containing a first water-soluble multivalent metal salt and (ii) part not containing the first water-soluble multivalent metal salt.

The water-absorbing agent has a water-absorbent resin particle having a first water-soluble multivalent metal salt localized therein. On this account, it is possible to provide a water-absorbing agent having such water absorption properties as less water-soluble component content, more excellent liquid permeability, and more excellent water retention under pressure than the conventional water-absorbing agent.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 7($b$) is a cross-sectional diagram schematically illustrating a water-absorbent resin particle illustrated in FIG. 7($a$) wherein part of the surface of the water-absorbent resin particle is coated with a second water-soluble multivalent metal salt.

DESCRIPTION OF THE EMBODIMENTS

Figure 1:
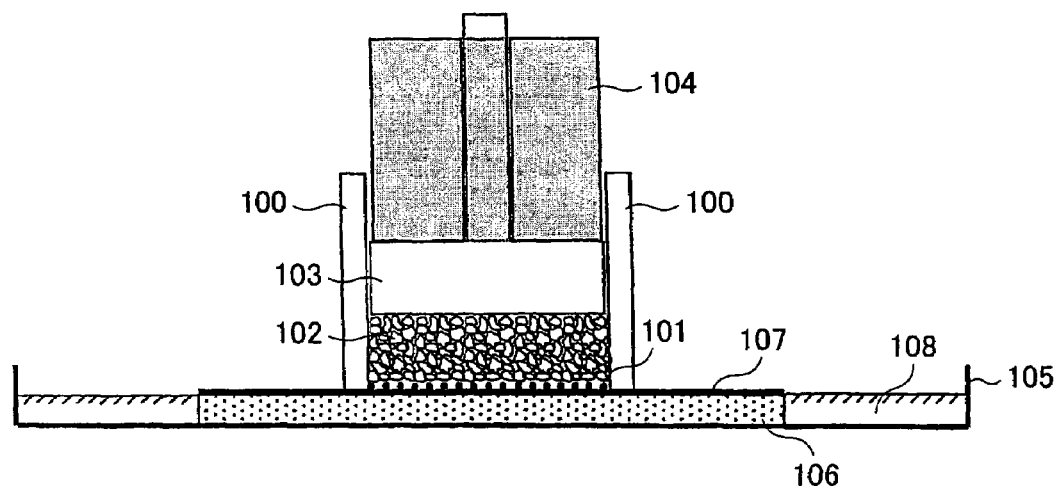
FIG. 1 is a schematic view of an AAP measuring apparatus.

Detailed description of the present invention is made below. While the invention is susceptible to various modifications and alternative forms, specific embodiments thereof will be described below by way of example. It should be understood, however, that it is not intended to limit the invention to the particular forms disclosed, but on the contrary, the invention is to cover all modifications, equivalents, and alternatives falling within the scope of the invention as defined in the appended claims.

(1) Outline of the Present Invention

As a result of extensive research conducted by the inventors of the present invention for the achievement of the above object, the inventors have found that excellent water absorption properties such as a less water-soluble component content, an excellent liquid permeability, and an excellent water retention under pressure can be maintained by causing polyvalent metal salt to be localized at least in a water-absorbent resin particles, and completed the present invention.

More specifically, in the conventional water-absorbent resin, excessive cross-linking due to evenly existed water-soluble multivalent metal salt inside the water-absorbent resin particles caused the reduction in the amount of water absorbed in some cases. Moreover, in the case where multivalent metal salt is water-soluble, it is was extremely difficult to cause such multivalent metal salt to be unevenly presented inside the water-absorbent resin particles.

In view of this, as a result of extensive research, the inventors of the present invention have found that:

(i) water-absorbent fine particles containing water-soluble multivalent metal salt are caused to be contained in a water-absorbent resin not containing water-soluble multivalent metal salt, whereby a water-absorbent resin particle having a sea-island structure is formed; and (ii) water-absorbent fine particles not containing water-soluble multivalent metal salt are caused to be contained in a water-absorbent resin containing water-soluble multivalent metal salt, whereby a water-absorbent resin particle having a sea-island structure is formed. The sea-island structure is the structure consisting of part containing water-soluble multivalent metal salt and part not containing water-soluble multivalent metal salt. Thus, unlike the conventional water-absorbent resin, it is possible to improve strength of water-absorbent resin particles without a considerable decrease in water absorption capacity. In other words, the present invention has realized a water-absorbing agent having a less water-soluble component content, excellent liquid permeability, and excellent water retention under pressure.

Further, as a result of various studies and many experiments, the inventors of the present invention have found that the above object can be achieved by using, as a fine powder used for agglomeration, the combination of a fine powder not having yet subjected to surface treatment and a fine powder having been subjected to surface cross-linking, and completed the present invention.

(2) Detailed Descriptions of the Present Invention

A water-absorbing agent of the present invention is a water-absorbing agent containing water-absorbent resin particles having an internal cross-linked structure obtained by polymerizing a water-soluble unsaturated monomer. The water-absorbing agent of the present invention includes covalent bonds in the internal cross-linked structure, and the water-absorbent resin particle has a sea-island structure having (i) part containing water-absorbent resin fine particles having been subjected to surface treatment or water-absorbent resin fine particles not having been subjected to surface treatment and (ii) part not containing water-absorbent resin fine particles having been subjected to surface treatment or water-absorbent resin fine particles not having been subjected to surface treatment.

Here, the surface treatment of the water-absorbent resin particle and the water-absorbing agent means chemical modification or physical modification to which the surface of the water-absorbent resin particle is subjected or the vicinity of the surface of the water-absorbent resin particle is subjected.

For example, the chemical modification means the formation of cross-linkage (chemical linkage) on the surface of the water-absorbent resin particle or in the vicinity of the surface of the water-absorbent resin particle. The cross-linkage may be either cross-linkage by covalent bonding or cross-linkage by ionic bonding.

The cross-linkage by covalent bonding can be formed by surface cross-linking treatment using an organic surface cross-linking agent. The organic surface cross-linking agent has at least two functional groups each reactable with a functional group (particularly, a carboxyl group) that exists on the surface of the water-absorbent resin particle or in the vicinity of the surface of the water-absorbent resin particle. For example, in the case where the water-absorbent resin particle is partially-neutralized and cross-linked polyacrylic acid, the organic surface cross-linking agent is polyhydric alcohol, polyglycidyl compound, polyamine, ethylene carbonate, 2-oxazolidinone, for example.

The cross-linkage by ionic bonding can be formed by surface treatment using water-soluble multivalent metal salt. The multivalent metal salt includes multivalent metal capable of forming an ionic bond with a functional group (particularly, carboxyl group) that exists on the surface of the water-absorbent resin particle or in the vicinity of the surface of the water-absorbent resin particle. The multivalent metal is trivalent aluminum, for example.

Meanwhile, the physical modification means the modification on the surface of the water-absorbent resin particle or in the vicinity of the surface of the water-absorbent resin particle by depositing or coating. The physical modification means that the surface of the water-absorbent resin particle or the vicinity of the surface of the water-absorbent resin particle is coated with polyhydric alcohol or other substance as previously mentioned, or means that the surface of the water-absorbent resin particle or the vicinity of the surface of the water-absorbent resin particle is coated with water-soluble multivalent metal without being accompanied by chemical bonding. In other words, the physical modification means that, for example, the polyhydric alcohol or the water-soluble multivalent metal is deposited on the surface of the water-absorbent resin particle or in the vicinity of the surface of the water-absorbent resin particle.

Thus, the chemical modification is the modification accompanied by some kind of chemical bonding with the surface of the water-absorbent resin particle. The physical modification is the modification by depositing or coating, without being accompanied by such chemical bonding.

The present embodiment will describe a water-absorbing agent produced through surface cross-linking treatment by way of example of the surface treatment and its production process. However, the present invention is not limited to the descriptions of the present embodiment.

The water-absorbing agent of the present invention includes water-absorbent resin particles each having an internal cross-linked structure. Further, in the water-absorbing agent of the present invention, a vicinity of the surface of the water-absorbent resin particle is cross-linked with a surface cross-linking agent, and the water-absorbent resin particle has such a structure that each of the water-absorbent resin particles has a first inorganic compound (preferably, a first water-soluble multivalent metal salt) localized therein (i.e. sea-island structure having (i) part containing the first inorganic compound (preferably, the first water-soluble multivalent metal salt) and (ii) part not containing first inorganic compound). Further, the water-absorbing agent of the present invention is preferably arranged such that at least part of the surface of the water-absorbent resin particle is coated with a second inorganic compound (preferably, second water-soluble multivalent metal salt). The water-absorbing agent of the present invention has such water absorption properties as less water-soluble component content, more excellent liquid permeability, and more excellent water retention under pressure than the conventional water-absorbing agent.

Note that, the descriptions of the present embodiment assume that the first water-soluble multivalent metal salt and the second water-soluble multivalent metal salt are mainly used as the first inorganic compound and the second inorganic compound, respectively. However, the present invention is not limited to this arrangement.

[Water-Absorbent Resin Particles]

The most striking characteristic of the water-absorbing agent as used in the present invention is a structure such that the water-absorbent resin particle has the first water-soluble multivalent metal salt localized (scattered) therein (sea-island structure).

The following will describe the water-absorbent resin particles that are a major component in the water-absorbing agent of the present invention.

The water-absorbent resin particles as used in the present invention is particles having an internal cross-linked structure obtained by polymerizing a water-soluble unsaturated monomer. The water-absorbent resin particles are particles of a water-insoluble water-swelling hydrogel formation polymer (hereinafter, referred to also as a water-absorbent resin) obtained by polymerizing a water-soluble unsaturated monomer, and are particles, each having a sphere shape or an irregular shape, whose absorption capacity with respect to a physiological saline (0.90 mass % of NaCl aqueous solution) is not less than 5, preferably not less than 10. Note that, in the present invention, the water absorbent resin particles are referred to also as the water absorbent resin.

Specific examples of the water-insoluble water-swelling hydrogel formation polymer includes: a partially neutralized cross-linked polyacrylic acid polymer (U.S. Pat. No. 4,625,001, U.S. Pat. No. 4,654,039, U.S. Pat. No. 5,250,640, U.S. Pat. No. 5,275,773, European Pat. No. 456,136, and the like); a cross-linked partially neutralized starch-acrylic acid graft polymer (U.S. Pat. No. 4,076,663); an isobutylene-maleic acid copolymer (U.S. Pat. No. 4,389,513); a saponified vinyl acetate-acrylic acid copolymer (U.S. Pat. No. 4,124,748); a hydrolyzed acrylamide (co)polymer (U.S. Pat. No. 3,959,569); a hydrolyzed acrylonitril copolymer (U.S. Pat. No. 3,935,099); and the like.

It is preferable that the water absorbent resin used in the present invention is particles of a water absorbent resin made of a cross-linked polyacrylic acid (salt) polymer, obtained by polymerizing a monomer containing acrylic acid and/or a salt thereof, which cross-linked polyacrylic acid (salt) polymer contains acrylic acid and/or a salt thereof as a component unit. In the present invention, the cross-linked polyacrylic acid (salt) polymer is a cross-linked polymer obtained by polymerizing a monomer containing not less than 50 mol %, preferably not less than 70 mol %, more preferably not less than 90 mol % of acrylic acid and/or a salt thereof, with respect to all constitutional units. Further, it is preferable that 50 to 90 mol %, preferably 60 to 80 mol % of an acid group contained in the polymer is neutralized, and examples of the salt include: alkali metal salt such as sodium, potassium, and lithium; ammonium salt; and amine salt. The water absorbent resin for forming salt may be neutralized in a monomer phase before polymerization, or may be neutralized during and after polymerization, or these processes may be combined with each other.

The polyacrylic acid (salt) cross-linked polymer which serves as the water absorbent resin particles favorably used in the present invention may be obtained by copolymerizing a monomer (acrylic acid and/or a salt thereof) used as a main component with other monomer as required. Specific examples of other monomer include: an anionic unsaturated monomer such as methacrylic acid, maleic acid, vinyl sulfonic acid, styrene sulfonic acid, 2-(meth)acrylamide-2-methylpropane sulfonic acid, 2-(meth)acryloyloxyethane sulfonic acid, 2-(meth)acryloyloxypropane sulfonic acid, and salt thereof; a nonionic hydrophilic-group-containing unsaturated monomer such as acrylamide, methacrylamide, N-ethyl(meth)acrylamide, N-n-propyl(meth)acrylamide, N-isopropyl(meth)acrylamide, N,N-dimethyl(meth)acrylamide, 2-hydroxyethyl(meth)acrylate, 2-hydroxypropyl (meth)acrylate, methoxypolyethyleneglycol (meth)acrylate, polyethyleneglycol mono (meth)acrylate, vinylpyridine, N-vinylpyrrolidone, N-acryloylpiperidine, N-acryloylpyrrolidine and N-vinylacetamide; and cationic unsaturated monomer such as N,N-dimethylaminoethyl (meth)acrylate, N,N-diethylaminoethyl (meth)acrylate, N,N-dimethylaminopropyl (meth)acrylate, N,N-dimethylaminopropyl (meth)acrylamide, and quaternary salt thereof; and the like. An amount of the monomer other than acrylic acid and/or a salt thereof is 0 to 30 mol %, preferably 0 to 10 mol %, with respect to the whole monomer.

The water absorbent resin particles used in the present invention is a cross-linked polymer having an internal cross-linked structure. Here, the cross-linked structure is a structure having, for example, the following cross-linkage: cross-linkage by covalent bonding or cross-linkage by ionic bonding.

Examples of a method for introducing a cross-linked structure into the water absorbent resin particles used in the present embodiment are as follows: self cross-linking is promoted without using a cross-linking agent; an internal cross-linking agent having two or more polymerizable unsaturated groups and/or two or more reactive groups is copolymerized or reacted with the water absorbent resin particles; and a similar method. It is preferable to copolymerize or react the internal cross-linking agent. Such a method allows for the formation of a cross-linkage by covalent bonding.

Note that, the cross-linkage by ionic bonding can be formed with the water-soluble multivalent metal salt, as will be described later.

Examples of the internal cross-linking agent for the internal cross-linkage by covalent bonding include: N,N'-methylenebis(meth)acrylamide, (poly)ethyleneglycol di(meth)acrylate, (poly)propyleneglycol di(meth)acrylate, trimethylolpropanetri(meth)acrylate, trimethylolpropanedi(meth)acrylate, glycerinetri(meth)acrylate, glycerineacrylatemethacrylate, ethyleneoxide modified trimethylolpropanetri(meth)acrylate, pentaerythritoltetra(meth)acrylate, dipentaerythritolhexa(meth)acrylate, triallyl cyanurate, triallyl isocyanurate, triallyl phosphate, triallyl amine, poly(meth)allyloxyalkane, (poly)ethyleneglycol diglycidyl ether, glycerol diglycidyl ether, ethyleneglycol, polyethyleneglycol, propyleneglycol, glycerine, pentaerythritol, and sorbitol, glycidyl(meth)acrylate. These internal cross-linking agents may be used either independently or in a suitable combination of two or more kinds. When using one or more internal cross-linking agents, it is preferable that a compound including not less than two polymerizable unsaturated groups is used as the internal cross-linking agent, taking into account the absorption properties and other properties of the product water-absorbent resin particles. An amount of internal cross-linking agent used is preferably 0.005 to 3 mol %, more preferably 0.01 to 1.5 mol %, with respect to a total number of moles of the whole monomer.

In the polymerization, it is possible to add (i) hydrophilic polymers such as a mixture of starch and cellulose, a derivative of starch and cellulose, polyvinyl alcohol, polyacrylic acid (salt), cross-linked polyacrylic acid (salt), and the like or (ii) a chain -transfer agent such as hypophosphorous acid (salt). In the polymerization, for example, the hydrophilic polymers of 0 to 30 wt % and/or the chain transfer agent of 0 to 1 wt % may be added to a polymerization system.

In polymerizing the monomer containing acrylic acid and/or a salt thereof as main components so as to obtain the water-absorbent resin used in the present embodiment, aqueous polymerization, bulk polymerization, reversed suspension polymerization, or precipitation polymerization may be performed. However, in terms of (i) performance of the water absorbent resin particles and (ii) controllability of polymerization, a more preferable method of polymerization is aqueous polymerization performed under such condition that an aqueous solution of the monomer is used. Such polymerization method is recited for example in U.S. Pat. No. 4,625,001, U.S. Pat. No. 4,769,427, U.S. Pat. No. 4,873,299, U.S. Pat. No. 4,093,776, U.S. Pat. No. 4,367,323, U.S. Pat. No. 4,446,261, U.S. Pat. No. 4,683,274, U.S. Pat. No. 4,690,996, U.S. Pat. No. 4,721,647, U.S. Pat. No. 4,738,867, U.S. Pat. No. 4,748,076, and U.S. Pat. Application Publication No. 2002/40095.

In initiating the polymerization, it is possible to use: a radical polymerization initiator such as potassium persulfate, ammonium persulfate, sodium persulfate, t-butylhydroperoxide, hydrogen peroxide, 2,2'-azobis (2-amidino-propane) dihydrochloride; or an active energy ray such as an ultraviolet ray and an electron ray. Further, in case of using a radical polymerization initiator, redox polymerization may be carried out by using a reducing agent such as sodium sulfite, sodium bisulfite, ferrous sulfate, L-ascorbic acid, and the like, together. An amount of polymerization initiators used is preferably 0.001 to 2 mol %, more preferably 0.01 to 0.5 mol %, with respect to the whole monomer.

It is general that a particle shape of thus obtained water absorbent resin particle is an irregularly-pulverized shape, a sphere shape, a fibrous shape, a bar shape, a substantially sphere shape, or an oblate shape. The water absorbent resin particle used in the present invention is particulate. Thus, it is preferable to use an irregularly-pulverized particle obtained by pulverizing the polymer after performing the drying operation since this results in greater effect of the present invention.

When an aqueous solution of the monomer including acrylic acid and/or its salt as main components is subjected to aqueous polymerization, the resultant monomer becomes gel. This gel is pulverized into small particles of a desired particle diameter. The pulverization is performed by using a meat chopper, a kneader, a cutter mill, or the like after a polymer gel is dried as needed. If the polymerization is performed in a kneader, a resultant gel is polymerized while being pulverized.

When the polymerization is performed by reversed suspension polymerization, a resultant water-absorbent resin is particulate, but its particles can be a little bound together when it is taken out of the polymerization system. Also, when the water-absorbent resin is subjected to the surface cross-linking treatment as will be described later, the resultant water-absorbent resin particles can be a little bound together. In such a case, the bound particles are disintegrated, after being dried as needed, so that loose particles can be obtained.

Pulverization and disintegration of a dried product can be performed by using, for example, a vibrating mill, a roll granulator (see Japanese Unexamined Patent Publication No. 235378/1997, paragraph [0174]), a knuckle pulverizer, a roll mill (see Japanese PCT National Phase Unexamined Patent Publication No. 527547/2002, paragraph [0069]), a high-speed pulverizer (pin mill, hammer mill, screw mill, roll mill, or the like (see Japanese Unexamined Patent Publication No. 41319/1994, paragraph [0036])), and a cylinder mixer (see Japanese Unexamined Patent Publication No. 202199/1993, paragraph [0008]). By using an airflow drier or the like, pulverization and drying can be performed at the same time.

In drying a polymer gel and suspension particles, normal dryer and heater can be used. Also, the drying can be performed by azeotropic dehydration. Examples of the dryer include hot-air dryer, groove type agitating dryer, rotary dryer, disk dryer, fluidized-bed dryer, airflow dryer, and infrared dryer.

Drying temperature is preferably 100 to 250° C., more preferably 150 to 230° C., still more preferably 160 to 210° C.

The obtained dried product preferably has a solids content of 50 to 100 mass % (moisture content of 50 to 0 mass %), more preferably 85 to 100 mass % (moisture content of 15 to 0 mass %), still more preferably 90 to 98 mass % (moisture content of 10 to 2 mass %). Generally, the solids content is calculated based on drying loss after 1 g of the dried product placed on aluminum cup or glass petri dish is dried at 180° C. for three hours.

Note that, as will be described later, it is preferable that a water-absorbent resin obtained as a result of the aforementioned drying, pulverization, and disintegration is the one (water-absorbent resin before being subjected to surface cross-linking) that has a predetermined size (particle diameter) as a result of undergoing classification or the like. Further, agglomerated water-absorbent resin particles which will be described later, together with a non-agglomerated water-absorbent resin, if necessary, is preferably subjected to classification in order to obtain the even-sized agglomerated product having a predetermined size.

It is preferable that the water-absorbent resin particle used in the present invention is the one whose vicinity of a surface is surface cross-linked. The surface treatment in the vicinity of the surface of the water-absorbent resin particle improves, increases, and controls the water absorbing performances of the water-absorbent resin particle, thus enabling a better balance between various performances. This is why the water-absorbent resin particle is subjected to cross-linking treatment.

The surface cross-linking treatment may be performed by using a surface cross-linking agent or may be performed in accordance with other known surface cross-linking treating method. Here, the surface cross-linking agent is the one capable of forming a cross-linked structure by covalent bonding.

As the surface cross-linking agent which can be used in the surface cross-linking treatment, it is possible to use an organic surface cross-linking agent or a multivalent metal component which can react with a functional group of the water-absorbent resin particles, particularly with a carboxyl group of the water absorbent resin particles, so as to form a cross-linked structure. Particularly, it is preferable to use, for example, the following organic surface cross-linking agents: polyhydric alcohols such as ethyleneglycol, diethyleneglycol, propyleneglycol, triethyleneglycol, tetraethyleneglycol, polyethyleneglycol, 1,3-propanediol, dipropyleneglycol, 2,2,4-trimethyl-1,3-pentandiol, polypropyleneglycol, glycerin, polyglycerin, 2-butene-1,4-diol, 1,3-butandiol, 1,4-butandiol, 1,5-pentandiol, 1,6-hexanediol, 1,2-cyclohexanedimethanol, 1,2-cyclohexanol, trimethylolpropane, diethanolamine, triethanolamine, polyoxypropylene, oxyethlene-oxypropylene block copolymer, pentaerythritol, and sorbitol; epoxy compounds such as ethyleneglycol diglycidyl ether, polyethyleneglycol dyglycidyl ether, glycerol polyglycidyl ether, diglycerol polyglycidyl ether, polyglycerol polyglycidyl ether, propyleneglycol diglycidyl ether, polypropyleneglycol diglycidyl ether, and glycidol; multivalent amine compounds such as ethylenediamine, diethylenetriamine, triethylenetetramine, tetraethylenepentamine, pentaethylenehexamine, and polyethyleneimine, and inorganic salts or organic salts thereof (for example, azetidinium salt and the like); multivalent isocyanate compounds such as 2,4-tolylenediisocyanate, and hexamethylenediisocyanate; multivalent oxazoline compounds such as 1,2-ethylenebisoxazoline; carbonic acid derivatives such as urea, thiourea, guanidine, dicyandiamide, and 2-oxazolidinon; alkylene carbonate compounds such as 1,3-dioxolane-2-one, 4-methyl-1,3-dioxolane-2-one, 4,5-dimethyl-1,3-dioxolane-2-one, 4,4-dimethyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, and 1,3-dioxisopane-2-one; haloepoxy compounds such as epichlorohydrin, epibromohydrin, and α-methylepichlorohydrin, and multivalent amine addition products thereof (for example, Kymene produced by Hercules: registered trademark); silane coupling agents such as γ-glycidoxypropyltrimethoxysilane and γ-aminopropyltriethoxysilane; and oxethane compounds such as 3-methyl-3-oxethane methanol, 3-ethyl-3-oxethane methanol, 3-butyl-3-oxethane methanol, 3-methyl-3-oxethane ethanol, 3-ethyl-3-oxethane ethanol, 3-butyl-3-oxethane ethanol, 3-chloromethyl-3-methyloxethane, 3-chloromethyl-3-ethyloxethane, and a multivalent oxethane compound; and the like. Such surface cross-linking agents enable the formation of a cross-linked structure by covalent bonding. These surface cross-linking agents may be used either independently or in a suitable combination of two or more kinds. Among the cross-linking agents, the polyhydric alcohol is preferable since it is superior in terms of safety and it improves the hydrophilic property of the surfaces of the water absorbent resin particles.

An amount of the surface cross-linking agent used is preferably 0.001 to 5 parts by mass with respect to 100 parts by mass of solid components of the water absorbent resin particles.

In mixing the surface cross-linking agent with the water absorbent resin particles, water may be used. An amount of water to be used is preferably 0.5 parts by mass to 10 parts by mass, more preferably 1 part by mass to 5 parts by mass, with respect to 100 parts by mass of solid components of the water absorbent resin particles.

In mixing the surface cross-linking agent and aqueous solution thereof, a hydrophilic organic solvent and a third substance may be used as a mixing coadjuvant.

Examples of the hydrophilic organic solvent include: lower alcohols such as methyl alcohol, ethyl alcohol, n-propyl alcohol, isopropyl alcohol, n-butyl alcohol, isobutyl alcohol, and t-butyl alcohol; ketones such as acetone; ethers such as dioxane, tetrahydrofuran, and methoxy(poly)ethyleneglycol; amides such as ε-caprolactam and N,N-dimethylformamide; sulfoxides such as dimethylsulfoxide; polyhydric alcohols such as ethyleneglycol, diethyleneglycol, propyleneglycol, triethyleneglycol, tetraethyleneglycol, polyethyleneglycol, 1,3-propanediol, dipropyleneglycol, 2,2,4-trimethyl-1,3-pentandiol, polypropyleneglycol, glycerin, polyglycerin, 2-butene-1,4-diol, 1,3-butandiol, 1,4-butandiol, 1,5-pentandiol, 1,6-hexanediol, 1,2-cyclohexanedimethanol, 1,2-cyclohexanol, trimethylolpropane, diethanolamine, triethanolamine, polyoxypropylene, oxyethlene-oxypropylene block copolymer, pentaerythritol, and sorbitol. An amount of the hydrophilic organic solvent varies depending on a type, a particle diameter, a moisture content, and the like of the water absorbent resin particles. However, the amount of the hydrophilic organic solvent is preferably 10 parts by mass or less, more preferably 0.1 part by mass to 5 parts by mass, with respect to 100 parts by mass of solid components of the water absorbent resin particles.

Further, inorganic acid, organic acid, polyamino acid, etc. that are recited in U.S. Pat. No. 5,610,208 as a third substance may exist therein. Such mixing coadjuvant may act as a surface cross-linking agent, but it is preferable to use a substance which prevents a water absorbing performance of the water absorbent resin particles from dropping after performing the surface cross-linking treatment. Particularly, it is preferable to use a volatile alcohol whose boiling point is less than 150° C. since the volatile alcohol evaporates at the time of the surface cross-linking treatment so that there is no residue.

In order to evenly mix the water absorbent resin particles with the surface cross-linking agent, non-cross-linking water-soluble inorganic bases (preferably, alkali metal salt, ammonium salt, alkali metal hydride, and ammonia or hydride thereof) or non-reducing alkali metal salt pH buffer (preferably, bicarbonate, dihydrogen phosphate salt, hydrogen phosphate salt, and the like) may coexist in mixing the water absorbent resin particles with the surface cross-linking agent. An amount of these components varies depending on a type, a particle diameter, etc. of the water absorbent resin particles, but preferably ranges from 0.005 to 10 parts by mass, more preferably from 0.05 to 5 parts by mass, with respect to 100 parts by mass of solid components of the water absorbent resin particles.

Various methods can be adopted in mixing the water absorbent resin particles with the surface cross-linking agent. Examples of the mixing method are as follows: the water absorbent resin particles are immersed in the hydrophilic organic solvent, and a surface cross-linking agent dissolved in water and/or the hydrophilic organic solvent as required is mixed; the surface cross-linking agent dissolved in the water and/or the hydrophilic solvent is sprayed or dropped directly to the water absorbent resin particles.

Generally, it is preferable that the water absorbent resin is subjected to a heating treatment so as to promote the cross-linking reaction after mixing the water absorbent resin particles with the surface cross-linking agent. Conditions of the heating treatment are as follows. A heating temperature preferably ranges from 40° C. to 250° C., more preferably from 150° C. to 250° C. In case where the heating temperature is less than 40° C., the absorbing property such as the absorbency against pressure may be insufficiently improved. In case where the heating temperature exceeds 250° C., the water absorbent resin particles deteriorate which causes various performances to drop, so that it is necessary to be careful. A heating time preferably ranges from one minute to two hours, more preferably from five minutes to one hour.

In case where the water absorbent resin particles of the present invention are obtained by performing the heating treatment, the heating treatment is performed for example as follows. As recited in European Patent No. 530517, European Patent No. 603292, International Publication No. 95/05856, the dried water absorbent resin particles are further heated.

The water-absorbent resin particles having been subjected to heating for the surface cross-linking treatment (including heat treatment) can be a little bound together. In order to separate the bound particles from each other, the aforementioned disintegration may be performed. Even when particles of a uniform particle diameter have been obtained through the classification or the like at the previous stage to the surface cross-linking treatment, the particle diameter can change due to the surface cross-linking treatment. Because of this, classification can be performed again. That is, the water-absorbent resin after having been subjected to surface cross-linking treatment includes an agglomerated product and fine powder which are generated during the surface cross-linking treatment. In order to obtain a water-absorbent resin, as a product having a predetermined particle size, from the water-absorbent resin after having been subjected to surface cross-linking treatment, it is necessary to perform disintegration and classification of the agglomerated product generated during the surface cross-linking treatment or classification of a fine powder generated during the surface cross-linking treatment and during disintegration of the agglomerated product.

Prior to the disintegration treatment and the classification treatment, it is preferable to let the water-absorbent resin cool. The type of a cooling system used in cooling is not limited. For example, the water-absorbent resin can be cooled by a two-shaft agitating dryer or the like having inner walls and other heating surfaces cooled with water of a temperature in the order of 35° C.

After the surface cross-linking treatment, either disintegration or classification may be performed first.

The disintegration is performed using a normal disintegrator. For example, the disintegration can be performed using a knife-cutter disintegrator such as a flash mill. An apparatus used in the classification is not particularly limited as far as it is a normal classification apparatus. For example, a vibrating screen or a airflow classifier may be used. For the disintegration and classification, the previous descriptions on the disintegration and classification treatment may be referred to.

A step of obtaining a fine powder of water-absorbent resin having been subjected to surface cross-linking treatment will be described later, but such a fine powder is most preferably obtained in the disintegrating and classifying step- performed after the surface cross-linking treatment. By removing from a product a fine powder of water-absorbent rein having been subjected to surface cross-linking treatment in the disintegrating and classifying step performed after the surface cross-linking treatment which is closer to the final step for obtaining a final product, it is possible to obtain a water-absorbent resin having a low fine powder content and realizing low powder dust emissions. By removing the fine powder of water-absorbent rein having been subjected to surface cross-linking treatment in this step, it is also possible to obtain a water-absorbent resin which attains an improved saline flow conductivity (SFC) among the properties of the water-absorbent resin.

The most striking characteristic of the water-absorbent resin particles of the present invention is the sea-island structure (microdomain-site binding structure) in which the water-absorbent resin particle has therein (i) the part containing the first water-soluble multivalent metal salt and (ii) the part not containing the first water-soluble multivalent metal salt. That is, the water-absorbent resin particle has such a structure that the water-absorbent resin particle has the first water-soluble multivalent metal salt localized therein. In other words, the water-absorbent resin particle has an ionic cross-linked structure formed with the first water-soluble multivalent metal salt and localized (scattered) therein.

Here, the wording "the first water-soluble multivalent metal salt is localized" means that there unevenly exists the first water-soluble multivalent metal salt in the water-absorbent resin particle. Whether the first water-soluble multivalent metal salt is localized in the water-absorbent resin particle can be confirmed, for example, by measuring and observing a cross section of the water-absorbent resin particle using an electron microprobe analyzer (Electron Probe Micro Analyzer; hereinafter referred to as EPMA).

Note that examples of a method of causing the first water-soluble multivalent metal salt to be localized in the water-absorbent resin particle include the method, as will be described later, of causing water-absorbent resin fine particles containing the first water-soluble multivalent metal salt to be contained in the water-absorbent resin particle having an internal cross-linked structure and not containing the first water-soluble multivalent metal salt.

Thus, the water-absorbent resin particle used in the present invention has, for example, the cross-linked structure by covalent bonding and the cross-linked structure by ionic bonding formed with the water-soluble multivalent metal salt, as the internal cross-linking structure. Further, on the surface of the water-absorbent resin particle, a covalent surface cross-linked structure is also formed. Particularly, the water-absorbent resin particle has the internal cross-linked structure formed with the first water-soluble multivalent metal salt localized therein (sea-island structure). This arrangement brings the water-absorbing agent having more excellent water-absorbing properties such as less water-soluble component content, more excellent liquid permeability, and more excellent water retention under pressure, than the arrangement in which the internal cross-linked structure formed with the first water-soluble multivalent metal salt is not localized in the water-absorbent resin particle (i.e. the arrangement in which the water-absorbent resin particle does not have the sea-island structure), as described later in Examples.

More specifically, in the water-absorbent resin particles used in the present invention, the elusion of soluble component from the particles is suppressed due to ionic cross-linkage occurred in the water-absorbent resin. For example, when such a water-absorbent resin is used in a disposable diaper, the surface of the disposable diaper is dry. Further, since the surface of the water-absorbent resin particle is cross-linked, gel strength in the water-absorbent resin particle increases. Still further, thanks to such a surface cross-linking, the water-absorbent resin particle enhances its liquid permeability, thus exerting an excellent liquid absorption. Further, as will be described later, since the water-absorbent resin particle has high AAP/CRC, it exerts a high degree of retention under pressure, relative to the amount of absorbed water that the water-absorbent resin particle can retain. This decreases a wet-back amount.

In the water-absorbent resin particle used in the present invention, the part containing the first water-soluble multivalent metal salt in the sea-island structure preferably has a major axis of not shorter than 10 μm long, more preferably not shorter than 20 μm long. This arrangement enhances the effects brought by the formation of the sea-island structure. As a result, it is possible to improve properties of the water-absorbent resin. For example, a length of the major axis can be measured by the following method: First, the water-absorbent resin particle is coated with an epoxy resin, and thereafter subjected to curing. Then, the resultant is plane-ground with 800 grit and 1500 grit emery papers. This plane grinding is performed to expose a cross section of the water-absorbent resin particle on the side having its center. The cross section of the water-absorbent resin particle is observed by means of an electron probe micro analyzer (e.g. product name: EPMA-1610, produced by Shimadzu Corporation). This can identify the part including multivalent metal. Note that the observation by means of the electron probe micro analyzer is carried out under the following conditions: applied voltage of 15 kV, sample current of 50 nA, and beam size of 1 μm. In this manner, a length of the major axis can be measured.

Figure 8:
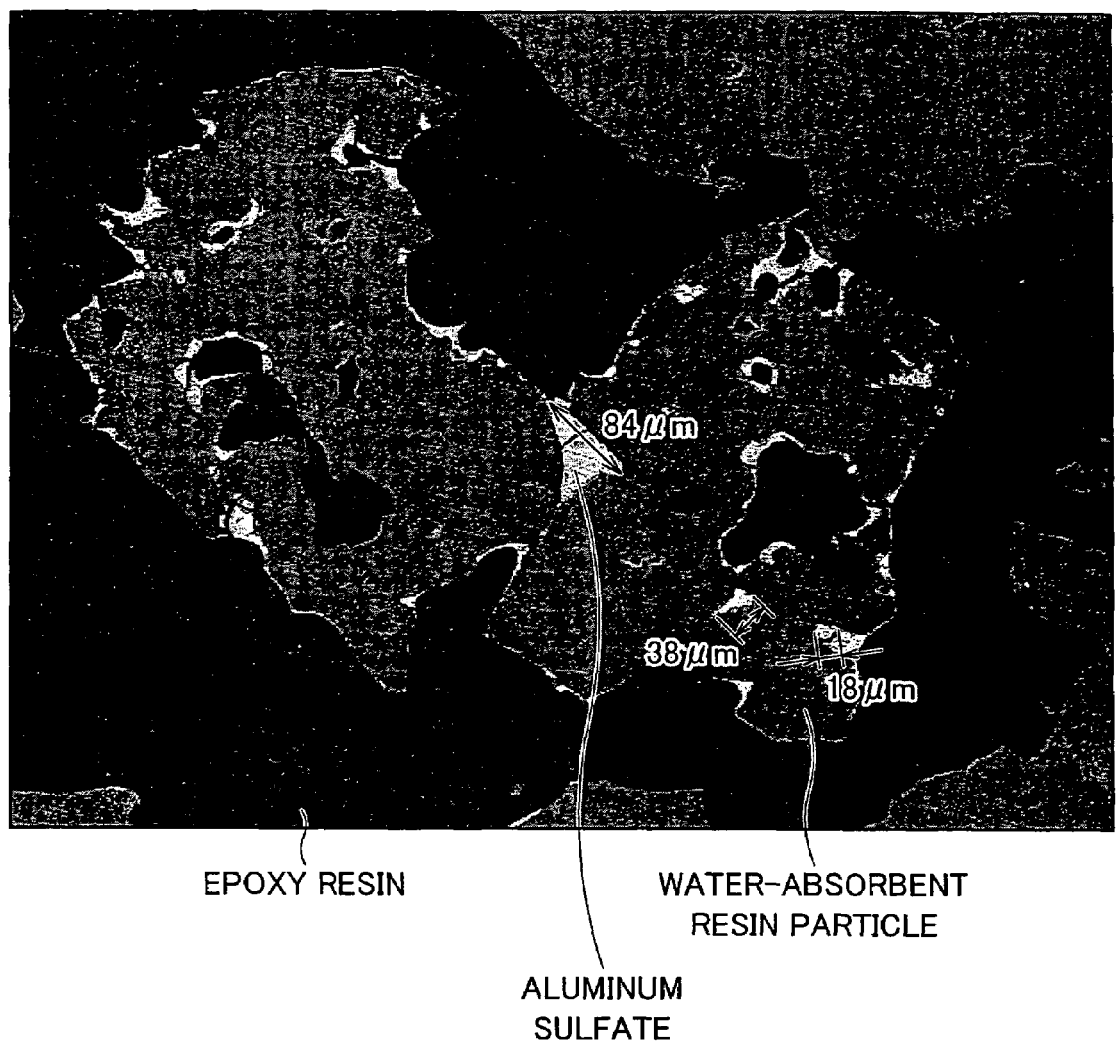
FIG. 8 is a view of a cross section of a water-absorbent resin particle in the present invention obtained by observing using an electron probe micro analyzer.
Figure 9:
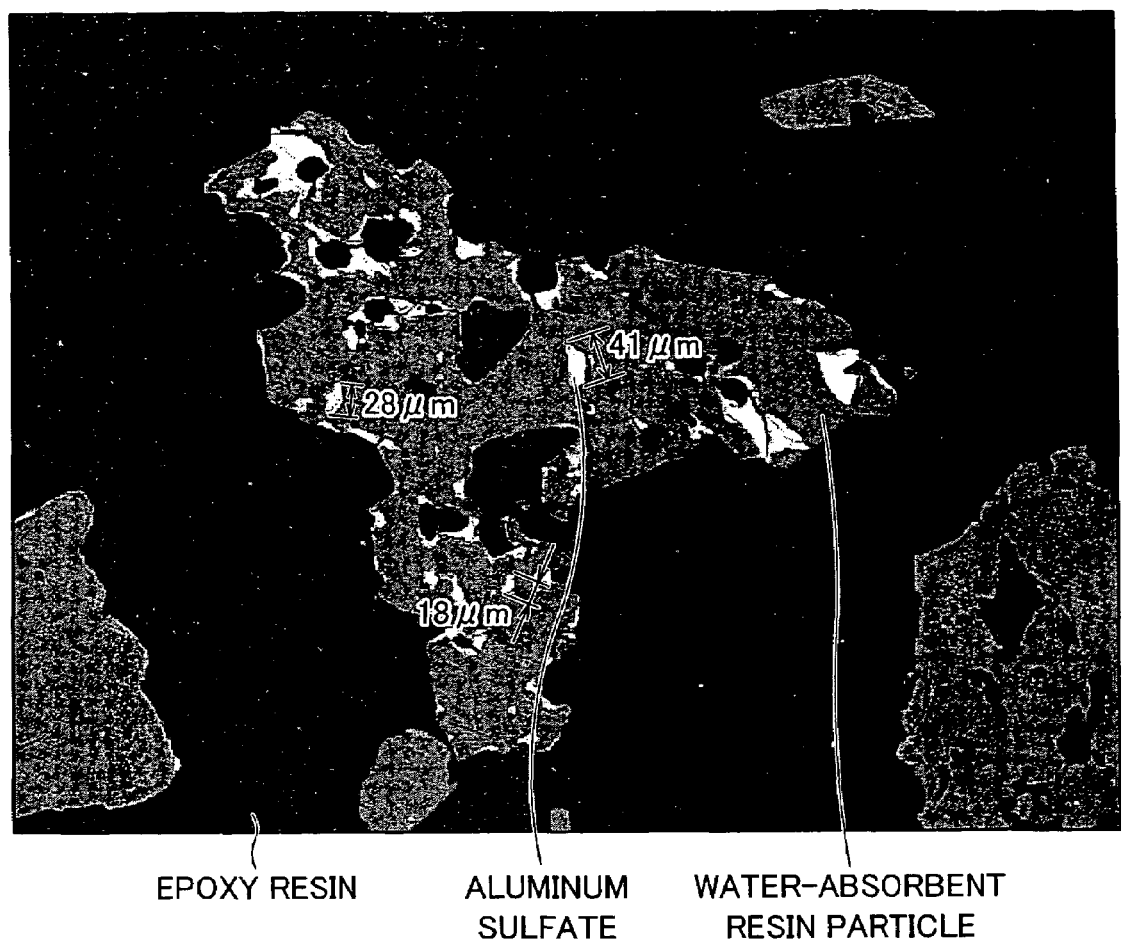
FIG. 9 is a view of a cross section of a water-absorbent resin particle in the present invention obtained by observing using an electron probe micro analyzer.

FIGS. 8 and 9 are cross-sectional views of the water-absorbent resin particle observed by the EPMA. In FIGS. 8 and 9, a black area shows epoxy resin, and a gray area shows a water-absorbent resin particle. A white area that exists inside the water-absorbent resin particle shows the first water-soluble multivalent metal salt (In FIGS. 8 and 9, aluminum sulfate). As illustrated in FIGS. 8 and 9, in the present invention, there unevenly exists the first water-soluble multivalent metal salt in the water-absorbent resin particle.

The water-absorbent resin particle shown in FIG. 8 has portions containing aluminum sulfate and having respective major axes of 84 μm, 38 μm, and 18 μm long. Meanwhile, the water-absorbent resin particle shown in FIG. 9 has portions containing aluminum sulfate and having respective major axes of 41 μm, 28 μm, and 18 μm long.

In the water-absorbent resin particle used in the present invention, it is preferable that at least part of an area cross-linked with the surface cross-linking agent is coated with the second water-soluble multivalent metal salt. More specifically, on the surface of the water-absorbent resin particle cross-linked with a cross-linkage by covalent bonding, a cross-linkage by ionic bonding is further formed. Thus, the surface of the water-absorbent resin particle whose surface has been cross-linked is further cross-linked in part or in entirety with the second water-soluble multivalent metal salt. This brings further more excellent water absorbing properties.

Now, the following will describe the first water-soluble multivalent metal salt and the second water-soluble multivalent metal salt.

The first water-soluble multivalent metal salt becomes a water-soluble multivalent metal salt substantially included inside the water-absorbent resin particle at the end of the production process. Further, the first water-soluble multivalent metal salt forms a sea-island structure inside the water-absorbent resin particle. The first water-soluble multivalent metal salt preferably exists at a depth of 20 μm or more, more preferably 40 μm or more below the surface of the water-absorbent resin particle.

Meanwhile, the second water-soluble multivalent metal salt becomes a water-absorbent resin water-soluble multivalent metal salt substantially included in the surface of the water-absorbent resin particle at the end of the production process. The second water-soluble multivalent metal salt preferably exists at a depth of 20 μm or less below the surface of the water-absorbent resin particle.

Note that the "water-soluble multivalent metal salt substantially included in the surface of the water-absorbent resin particles" means that the water-soluble multivalent metal salt exists on the surface of the water-absorbent resin in such a manner so as to coat not less than 50%, preferably not less than 70%, more preferably not less than 90% of the surface area of the water-absorbent resin particle.

The "water-soluble multivalent metal salt" in the first water-soluble multivalent metal salt and the second water-soluble multivalent metal salt is the one in which multivalent metal ions are soluble in an aqueous solution so that a pH value of the aqueous solution is in the range from 1 to 12, and in which 100 g of the aqueous solution has a multivalent metal ion content of preferably not less than 1 ppm, more preferably not less than 10 ppm.

The first water-soluble multivalent metal salt and the second water-soluble multivalent metal salt are more preferably trivalent and/or quadrivalent metal salt. Hereinafter, both the first water-soluble multivalent metal salt and the second water-soluble multivalent metal salt are simply referred to as "water-soluble multivalent metal salt" unless they are not necessary to be independently identified.

Examples of the trivalent water-soluble multivalent metal salt which can be used in the present invention include: chloride, sulfate, nitrate, persulfate, sulfite, carbonate, phosphate, water-soluble organic acid salt (e.g. carboxylate), or the like of aluminum, iron, cerium, ruthenium, yttrium, or chromium including aluminum chloride, aluminum polychloride, aluminum sulfate, aluminum nitrate, aluminum potassium bis sulfate, sodium aluminum bis sulfate, potassium alum, ammonium alum, sodium alum, sodium aluminate, iron chloride (III), cerium chloride (III), ruthenium chloride (III), yttrium chloride (III), and chromium chloride (III).

Further, examples of the tetravalent water-soluble metal salt which can be used in the present invention include: zirconium sulfate, 6-zirconium sodium fluoride, zirconium ammonium carbonate, zirconium potassium carbonate, zirconium sodium carbonate, titanium sulfate, zinc oxide, and synthetic zeolite.

Further, these water-soluble multivalent metal salts are salts having the crystal water in terms of solubility with respect to absorbed liquid such as urine. It is particularly preferable to use aluminum compounds (aluminum salts). Among aluminum compounds, it is preferable to use aluminum chloride, aluminum polychloride, aluminum sulfate, aluminum nitrate, potassium aluminum bis sulfate, sodium aluminum bis sulfate, potassium alum, ammonium alum, sodium alum, and sodium aluminate. It is particularly preferable to use aluminum sulfate, and it is most preferable to use an aqueous solution of aluminum sulfate. These components may be independently or in a suitable combination of two or more kinds. The first water-soluble multivalent metal salt and the second water-soluble multivalent metal salt may be the same one or different ones.

Apart from the first water-soluble multivalent metal salt and the second water-soluble multivalent metal salt, examples of the first inorganic compound and the second inorganic compound include inorganic oxides such as hydrophilic amorphous silica, minerals, and other multivalent metal salts. Examples of the hydrophilic amorphous silica include: Reolosil QS-20 (produced by a drying method by Tokuyama Corporation); and Sipernat 22S and Sipernat 2000 (produced by precipitation method by DEGUSSA Co., Ltd.). Examples of the minerals include: talc, kaoline, fuller's earth, bentonite, active white clay, heavy spar, natural asphaltum, strontianite, ilmenite, and perlite. Examples of the multivalent metal salts include: inorganic oxide such as a composite of silicon dioxide, aluminum oxide, and magnesium oxide (e.g. Attagel #50; produced by ENGELHARD), a composite of silicon dioxide and aluminum oxide, and a composite of silicon dioxide and magnesium oxide; titanium oxide; zinc oxide; and synthetic zeolite. In addition, substances exemplified in the patent publications such as U.S. Pat. No. 5,164,459 may be used as the first organic compound and the second organic compound. The first organic compound and the second organic compound may be the same one or different ones.

In the water-absorbent resin particle used in the present invention, the water-absorbent resin particle has a first water-soluble multivalent metal salt content ranging from 0.001 to 1 mass % relative to 100 parts by mass of the water-absorbent resin particles. The water-absorbent resin particle has a second water-soluble multivalent metal salt content ranging from 0.001 to 4 mass % relative to 100 parts by mass of the water-absorbent resin particle. The first water-soluble multivalent metal salt content is preferably less than the second water-soluble multivalent metal salt content. There is the possibility that water-absorption capacity might drop if the first water-soluble multivalent metal salt content is more than the second water-soluble multivalent metal salt content.

In the water-absorbent resin particle used in the present invention, a ratio of the first water-soluble multivalent metal salt and the second water-soluble multivalent metal salt is preferably 1:10 to 10:11, more preferably 1:7 to 10:13, particularly preferably 1:5 to 10:17.

A particle size distribution logarithmic standard deviation ($\sigma\zeta$) of the water-absorbent resin particle used in the present invention preferably ranges from 0.20 to 0.45, more preferably from 0.27 to 0.43, most preferably from 0.30 to 0.40. The particle size distribution logarithmic standard deviation ($\sigma\zeta$) is a value indicative of uniformity of the particle size distribution. As the particle size distribution logarithmic standard deviation ($\sigma\zeta$) is lower, the particle size distribution is narrower. When the particle size distribution logarithmic standard deviation ($\sigma\zeta$) is less than 0.20, the particle size distribution is so narrow that a relationship between the liquid diffusion/liquid permeation property and a capillary force may be off balance. When the particle size distribution logarithmic standard deviation ($\sigma\zeta$) exceeds 0.45, it may be difficult to treat the water absorbent resin composition and a relationship between the liquid diffusion/liquid permeation property and a capillary force may be off balance.

A water-absorbent resin particle having such a particle diameter can be preferably obtained by pulverizing water-absorbent resin (particles) obtained by aqueous polymerization or by sieving the water-absorbent resin (particles) through a sieve for their particle size control. Further, water absorbent resin particles obtained by agglomerating fine powder of water-absorbent resin particles (water-absorbent resin fine particles) whose particle diameter is 300 μm or less (preferably 200 μm or less, more preferably 150 μm or less) for their particle size control may be used, or water absorbent resin particles obtained by mixing part of agglomerated fine powder with irregularly pulverized particles obtained by pulverizing the water absorbent resin may be used. In other words it is preferable that the water-absorbent resin fine particles. (e.g. water-absorbent fine particles including the first water-soluble multivalent metal salt) each has such a size that it can pass through a sieve having a mesh opening of 300 μm (preferably 200 μm, more preferably 150 μm). In case where part of agglomerated water absorbent resin particles is mixed, it is possible to obtain a water absorbing agent which is much superior in absorbing properties such as a water absorption rate, a capillary absorption capacity, and the like. An amount of the agglomerated fine powder mixed is preferably 5 mass % or more, more preferably 10 mass % or more, still more preferably 15 mass % or more.

As a method for producing the agglomerated fine powder, it is possible to adopt a known technique for reproducing fine powder. Examples of the technique are as follows: hot water and fine powder of the water absorbent resin particles are mixed with each other and thus obtained mixture is dried (U.S. Pat. No. 6,228,930); fine powder of the water absorbent resin particles is mixed with a monomer aqueous solution and thus obtained mixture is polymerized (U.S. Pat. No. 5,264,495); water is added to fine powder of the water absorbent resin particles and thus obtained mixture is agglomerated at not less than a specific surface pressure (European Patent No. 844270); fine powder of the water absorbent resin particles is sufficiently swollen so as to form a non-crystalline gel and thus obtained non-crystalline gel is dried and pulverized (U.S. Pat. No. 4,950,692); fine powder of the water absorbent resin particles is mixed with a polymerized gel (U.S. Pat. No. 5,478,879); and a similar technique is performed. Among them, it is preferable to adopt the method in which hot water and fine powder of the water absorbent resin particles are mixed with each other and thus obtained mixture is dried. Note that, a particle diameter is indicated by a sieve diameter by which particles are classified.

The water-absorbent resin particle used in the present invention is preferably an agglomerate (agglomerated particle). With this, the agglomerated particle reliably contains an internal cross-linked structure by covalent bonding and a cross-linked structure by ionic bonding formed with the first water-soluble multivalent metal salt. In other words, it is possible to localize the first water-soluble multivalent metal salt inside the agglomerated particle. This agglomerated particle can be obtained, for example, by agglomerating a mixture of (i) water-absorbent resin fine particles (fine powder) having internal cross-linked structure by covalent bonding and (ii) water-absorbent resin fine particles (fine powder) having an internal cross-linked structure by ionic bonding formed with the first water-soluble multivalent metal salt.

A particle diameter and a particle distribution of the water-absorbent resin particles used in the present invention are not particularly limited. However, it is preferable to use water absorbent resin particles, having a relatively small particle diameter, in which a large number of small-diameter particles exist. Such water absorbent resin particles remarkably improve the water absorbing performances such as a water absorption rate and capillary absorption capacity.

In the water-absorbent resin particles of the present invention, a centrifuge retention capacity (CRC) is preferably 5

(g/g) or more, more preferably 10 (g/g) or more, still more preferably 15 (g/g) or more, yet more preferably 20 (g/g) or more, particularly preferably 25 (g/g) or more. An upper limit of the centrifuge retention capacity (CRC) is not particularly limited, but is preferably 100 (g/g) or less, more preferably 70 (g/g) or less, still more preferably 50 (g/g) or less. In case where the centrifuge retention capacity (CRC) is less than 5 (g/g), an amount of absorbed liquid is so small that the water absorbent resin particles are not suitable for use in a sanitary material such as a diaper. Further, in case where the centrifuge retention capacity (CRC) exceeds 60 (g/g), particularly exceeds 100 (g/g), it may be impossible to obtain a water absorbing agent which is superior in liquid permeability.

In the water absorbent resin particles of the present invention, an absorbency against pressure (AAP) (pressure is 4.83 kPa) is preferably 5 (g/g) or more, more preferably 10 (g/g) or more, still more preferably 15 (g/g) or more, yet more preferably 18 (g/g) or more, further more preferably 20 (g/g) or more, particularly preferably 22 (g/g) or more. An upper limit of the absorbency against pressure (AAP) is not particularly limited, but is preferably 50 (g/g) or less. In case where the absorbent against pressure (AAP) (pressure is 4.83 kPa) is less than 5 g/g, it may be impossible to obtain a water absorbing agent which is superior in liquid permeability.

In the water absorbent resin particles of the present invention, a saline flow conductivity (SFC) is preferably $10(\times 10^{-7} \text{ cm}^3 \cdot \text{s} \cdot \text{g}^{-1})$ or more, more preferably $30(\times 10^{-7} \text{ cm}^3 \cdot \text{s} \cdot \text{g}^{-1})$ or more, still more preferably $40(\times 10^{-7} \text{ cm}^3 \cdot \text{s} \cdot \text{g}^{-1})$ or more, yet more preferably $50(\times 10^{-7} \text{ cm}^3 \cdot \text{s} \cdot \text{g}^{-1})$ or more, further more preferably $100(\times 10^{-7} \text{ cm}^3 \cdot \text{s} \cdot \text{g}^{-1})$ or more. As the saline flow conductivity (SFC) increases, the liquid permeability increases. An upper limit of the saline flow conductivity (SFC) is not limited, but is preferably $2000(\times 10^{-7} \text{ cm}^3 \cdot \text{s} \cdot \text{g}^{-1})$ or less. In case where the saline flow conductivity (SFC) is less than $10(\times 10^{-7} \text{ cm}^3 \cdot \text{s} \cdot \text{g}^{-1})$, even when the water-soluble multivalent metal salt is added, the liquid permeability may be unimproved.

In the water absorbent resin particles of the present invention., an amount of water-soluble components is preferably 35 mass % or less, more preferably 25 mass % or less, still more preferably 15 mass % or less. When the amount of the water-soluble components exceeds 35 mass %, its gel strength may be low and its liquid permeability may drop. Further, when the water absorbent resin particles are used in a diaper for an extended period of time, its absorbing properties (CRC and AAP) may drop as time elapses.

The water-absorbent resin particles as described above are a major component of the water-absorbing agent of the present invention. In this water-absorbing agent, a content of the water-absorbent resin particles as its major components is preferably at least not less than 10 mass %, more preferably not less than 50 mass %, still more preferably not less than 90 mass %, most preferably 100 mass % (i.e. the water-absorbing agent consisting of the water-absorbent resin particles). Here, each of the water-absorbent resin particles as the major component has (i) the internal cross-linked structure at least having cross-linked structure by covalent bonding and cross-linked structure by ionic bonding formed with the first water-soluble multivalent metal salt and (ii) a surface cross-linked structure by covalent bonding, and has a localized first water-soluble multivalent metal salt (sea-island structure) therein. That is, as described in Examples below and illustrated in FIG. 4, the water-absorbing agent of the present invention may include at least water-absorbent resin particles in Example 2, water-absorbent resin particles in Example 1, or a mixture of the water-absorbent resin particles in Example 2 and the water-absorbent resin particles in Example 1.

More specifically, in the water-absorbing agent of the present invention, for example, it is preferable that the content of (a) the water-absorbent resin particles each having the sea-island structure ranges from 10 mass % to 100 mass %, the content of (b) the water-absorbent resin particles each having no such sea-island structure (no scattered first water-absorbent resin particles) ranges from 0 mass % to 90 mass %, and a total content of the water-absorbent resin particles (a) and (b) is not less than 80 mass %.

Further, as long as the water-absorbing agent of the present invention contains at least any of the water-absorbent resin particles described in Examples 1 through 4, the water-absorbing agent of the present invention may further contain water-absorbent resin particles described in Comparative Examples 1 through 3. With this arrangement, it is possible to provide a water-absorbing agent having less water-soluble component content, more excellent liquid permeability, and more excellent water retention under pressure than the conventional water-absorbing agent.

[Production Process for Water-Absorbing Agent]

A production process for a water-absorbing agent according to the present invention is a production process for a water-absorbing agent containing the foregoing water-absorbent resin particles, and includes the following steps (A) and (B):

(A) Step of forming non-surface-treated water-absorbent resin particles having an internal cross-linked structure obtained by polymerizing a water-soluble unsaturated monomer in the presence of a covalent bonding cross-linking agent; and (B) Step of causing surface-treated water-absorbent resin fine particles to be contained in the non-surface-treated water-absorbent resin particles.

Preferably, the production process for a water-absorbing agent according to the present invention includes the following step (C):

(C) Step of heating (i) a non-surface-treated water-absorbent resin particle having the surface-treated water-absorbent resin fine particles contained therein, or mixing (ii) a water-absorbent resin particle having the surface-treated water-absorbent resin fine particles contained therein with a surface cross-linking agent and then heating a resultant mixture, so as to cross-link the vicinities of the surfaces of the water-absorbent resin particles (i) or (ii).

Particularly preferably, the production process for a water-absorbing agent according to the present invention includes the following steps (a) through (c):

(a) Step of forming water-absorbent resin particles not containing first water-soluble multivalent metal salt, the water-absorbent resin particles having an internal cross-linked structure and being obtained by polymerizing a water-soluble unsaturated monomer in the presence of a covalent bonding cross-linking agent;

(b) Step of causing water-absorbent resin fine particles containing the first water-soluble multivalent metal salt to be contained in the water-absorbent resin particles not containing the first water-soluble multivalent metal salt; and (c) Step of heating (i) water-absorbent resin particles having the first water-soluble multivalent metal salt contained therein, or mixing (ii) the water-absorbent resin particles having the first water-soluble multivalent metal salt contained therein with a surface cross-linking agent and then heating a resultant mixture, so as to cross-link the vicinities of surfaces of the water-absorbent resin particles (i) or (ii) (surface cross-linking step).

In other words, the non-surface-treated water-absorbent resin particles in the steps (A) through (C) are the water-absorbent resin particles not containing the first water-soluble multivalent metal salt in the steps (a) through (c), respectively.

In the step (a), water-absorbent resin particles having an internal cross-linked structure are formed. Since the step (a) is performed in the presence of the covalent bonding cross-linking agent, a resultant water-absorbent resin particle has a cross-linked structure by covalent bonding. The water-absorbent resin particle in the step (a) does not contain the first water-soluble multivalent metal salt. As the covalent bonding cross-linking agent, the foregoing internal cross-linking agents can be used favorably.

Meanwhile, in the step (b), the water-absorbent resin fine particles containing the first water-soluble multivalent metal salt are caused to be contained in the water-absorbent resin particle not containing the first water-soluble multivalent metal salt. This causes the water-absorbent resin particle to have formed therein a cross-linked structure by ionic bonding with multivalent metal ions derived from the first water-soluble multivalent metal salt. In the step (b), part of the first water-soluble multivalent metal salt may exist on the surface of the water-absorbent resin.

Thus, through the steps (a) and (b), it is possible to obtain water-absorbent resin particle with the internal cross-linked structure having the cross-linked structure by covalent bonding and the cross-linked structure by ionic bonding. Besides, the step (b) enables the first water-soluble multivalent metal salt to be localized inside the water-absorbent resin particle. More specifically, with the cross-linked structure by ionic bonding with multivalent metal ions, the sea-island structure having part containing the first water-soluble multivalent metal salt and part not containing the first water-soluble multivalent metal salt is formed in the water-absorbent resin particle. In other words, the cross-linked structure by ionic bonding with multivalent metal ions is scattered in the water-absorbent resin particle. That is, the cross-linked structure by ionic bonding with multivalent metal ions is unevenly formed (localized) inside the water-absorbent resin particle, rather than evenly formed (non-localized) inside the water-absorbent resin particle.

The step (a) is not performed in the presence of the first water-soluble multivalent metal salt. This is because the step (a) performed in the presence of the first water-soluble multivalent metal salt causes the first water-soluble multivalent metal salt to exist evenly inside the water-absorbent resin particle, without localizing in the water-absorbent resin particle. However, if the first water-soluble multivalent metal salt can be eventually existed unevenly inside the water-absorbent resin particle, the step (a) may be performed in the presence of the first water-soluble multivalent metal salt.

Then, in the step (c), cross-linkage is formed in the vicinity of the surface of the water-absorbent resin particle obtained as a result of undergoing the steps (a) and (b) (i.e. water-absorbent resin particle having the first water-soluble multivalent metal salt contained therein).

Thus, the water-absorbent resin particle obtained as a result of undergoing the steps (a) through (c) has: the internal cross-linked structure having a cross-linked structure by covalent bonding and a cross-linked structure by ionic bonding; and a surface cross-linked structure having a cross-linked structure by covalent bonding on the surface of the water-absorbent resin particle. In addition, inside this water-absorbent resin particle, localized in the water-absorbent resin particle (sea-island structure). Such a water-absorbent resin particle brings the water-absorbing agent excellent water-absorbing properties such as less water-soluble component content, excellent liquid permeability, and excellent water retention under pressure.

It is preferable that the production process for the water-absorbing agent of the present invention further includes:

(d) Step of adding a second water-soluble multivalent metal salt to the surfaces of the water-absorbent resin particles obtained in the step (c).

Through the step (d), part of a cross-linked area of the surface cross-linked water-absorbent resin particle obtained in the step (c) is coated with the second water-soluble multivalent metal salt. That is, a cross-linked structure by ionic bonding formed with the second water-soluble multivalent metal salt is further formed on at least part of the surface of the surface cross-linked water-absorbent resin particle. In other words, the surface cross-linked structure of the water-absorbent resin particle has not only the cross-linked structure by covalent bonding but also cross-linked structure by ionic bonding. This enables a further improvement of the absorbing properties.

Note that the step (d) may be performed in any manner, as far as the second water-soluble multivalent metal salt is added to the surface cross-linked water-absorbent resin particle obtained in the step (c) so that the cross-linked structure formed with the second water-soluble multivalent metal salt is formed in the vicinity of the surface of the cross-linked water-absorbent resin particle.

Here, it is preferable that the first water-soluble multivalent metal salt and the second water-soluble multivalent metal salt are powdery salt of water-soluble multivalent metal whose atomic valence is trivalence and/or tetravalence. In terms of a condition under which the water-absorbing agent produced in the present invention is used in an absorbent core of a sanitary material such as a diaper, it is preferable to select a water-absorbing agent, not being colored, which is harmless for a human body. The first water-soluble multivalent metal salt and the second water-soluble multivalent metal salt may be the same one or different ones.

In order to efficiently keep an effect of the water-soluble multivalent metal salt for an extended period of time upon, absorption, it is preferable to select a water-soluble multivalent metal salt which is soluble in normal temperature pure water when its concentration is 5 mass % or more. It is more preferable to select a water-soluble multivalent metal salt which is soluble in normal temperature pure water when its concentration is 10 mass % or more. It is still more preferable to select a water-soluble multivalent metal salt which is soluble in normal temperature pure water when its concentration is 20 mass % or more.

The water-soluble multivalent metal salt which can be used in the present invention may be particulate. In terms of a mixing property, it is preferable that a particle diameter thereof is smaller than a particle diameter of the water absorbent resin particles. Its mass average particle diameter is preferably 500 μm or less, more preferably 400 μm or less. In terms of a performance, it is more preferable that 20 mass % or more of particles whose particle diameter is 150 μm or less is contained with respect to the whole water-soluble multivalent metal salt. It is most preferable that 30 mass % or more of particles whose particle diameter is 150 μm or less is contained with respect to the whole water-soluble multivalent metal salt.

In the present invention, the water-soluble multivalent metal salt in aqueous solution form is preferably mixed with the water-absorbent resin particles. In order to prevent multivalent metal ions (e.g. aluminum ions) from being permeated and diffused in the water-absorbent resin particles, a concentration of the water-soluble multivalent metal salt in the aqueous solution containing the water-soluble multivalent metal salt is preferably 50 mass % or more, more preferably 60 mass % or more, still more preferably 70 mass % or more, further still more preferably 80 mass % or more, particularly preferably 90 mass % or more, with respect to a saturated concentration, in order to prevent permeation and diffusion in the water absorbent resin particles. Of course, the concentration may be the saturated concentration.

The water-absorbing agent obtained in the present invention preferably includes the first water-soluble multivalent metal salt and the second water-soluble multivalent metal salt in total amount of 0.002 to 5 parts by mass, more preferably 0.01 to 5 parts by mass, still more preferably 0.1 to 2 parts by mass with respect to 100 parts by mass of the water-absorbent resin particles that are main components of the water-absorbing agent. Note that the content of the first water-soluble multivalent metal salt ranges from 0.001 to 1 parts by mass, and the content of the second water-soluble multivalent metal salt ranges from 0.001 to 4 parts by mass. As described previously, the content of the first water-soluble multivalent metal salt is less than the content of the second water-soluble multivalent metal salt.

In the case where the water-absorbing agent according to the present invention includes only the first water-soluble multivalent metal salt, not the second water-soluble multivalent metal salt, the content of the first water-soluble multivalent metal salt ranges from 0.1 to 2 parts by mass.

If the total amount of the first water-soluble multivalent metal salt and the second water-soluble multivalent metal salt is less than the minimum permissive amount, it is not preferable because increases of the liquid permeability and the resistance to blocking as the objects of the present invention are not realized. The water-soluble multivalent metal salt in amount larger than the maximum permissive amount may deteriorate absorbing properties such as CRC and AAP.

Here, the water-absorbent resin fine particles including the first water-soluble multivalent metal salt used in the step (b) preferably has a size such that they pass through a sieve having a mesh opening size of 300 μm, preferably 200 μm. More specifically, it is preferable to, prior to the step (b), perform the step of classifying the water-absorbent resin fine particles including the first water-soluble multivalent metal salt (classifying step). This allows the water-soluble multivalent metal salt to be evenly distributed in the entire water-absorbent resin, and allows the sea-island structure to be formed therein. This allows the water-soluble multivalent metal salt to unevenly exist in part of the water-absorbent resin.

Through the classifying step, a fine powder consisting of microscopic particles, which is smaller than a predetermined size, can be removed and collected. The classifying step is the step including the removal of a fine powder of not more than 150 μm in fine powder size from the water-absorbing agent in the steps (e.g. the sizing steps such as disintegration and classification) of the process for the production of the water-absorbing agent. An apparatus used for the classification is not particularly limited as long as it is a normal classification apparatus. For example, a vibrating screen, an air classifier, a bag filter, or the like can be used.

A particle diameter of the resultant water-absorbent resin particles (agglomerated product and/or non-agglomerated product) obtained by removing a fine powder preferably ranges from 100 to 850 μm, more preferably 150 to 850 μm, still more preferably 200 to 700 μm, most preferably 200 to 600 μm. A mass average particle diameter of the water-absorbent resin particles preferably ranges from 200 to 600 μm, more preferably 200 to 500 μm. Further, a logarithmic standard deviation ($\sigma\zeta$) of the mass average particle diameter is preferably 0.2 to 0.45.

Through such a classifying step, the fine powder consisting of microscopic particles is collected. Note that the microscopic particles are the ones that contain 90 wt % or more of particles having a particle diameter of 100 to 300 μm, although varying depending upon classifying point and classifier efficiency.

In the step (b), the method of adding the first water-soluble multivalent metal salt into the water-absorbent resin particle is carried out (i) during the agglomeration for obtaining of the water-absorbent resin or (ii) before and/or during the polymerization for obtaining of the water-absorbent resin.

Figure 3:
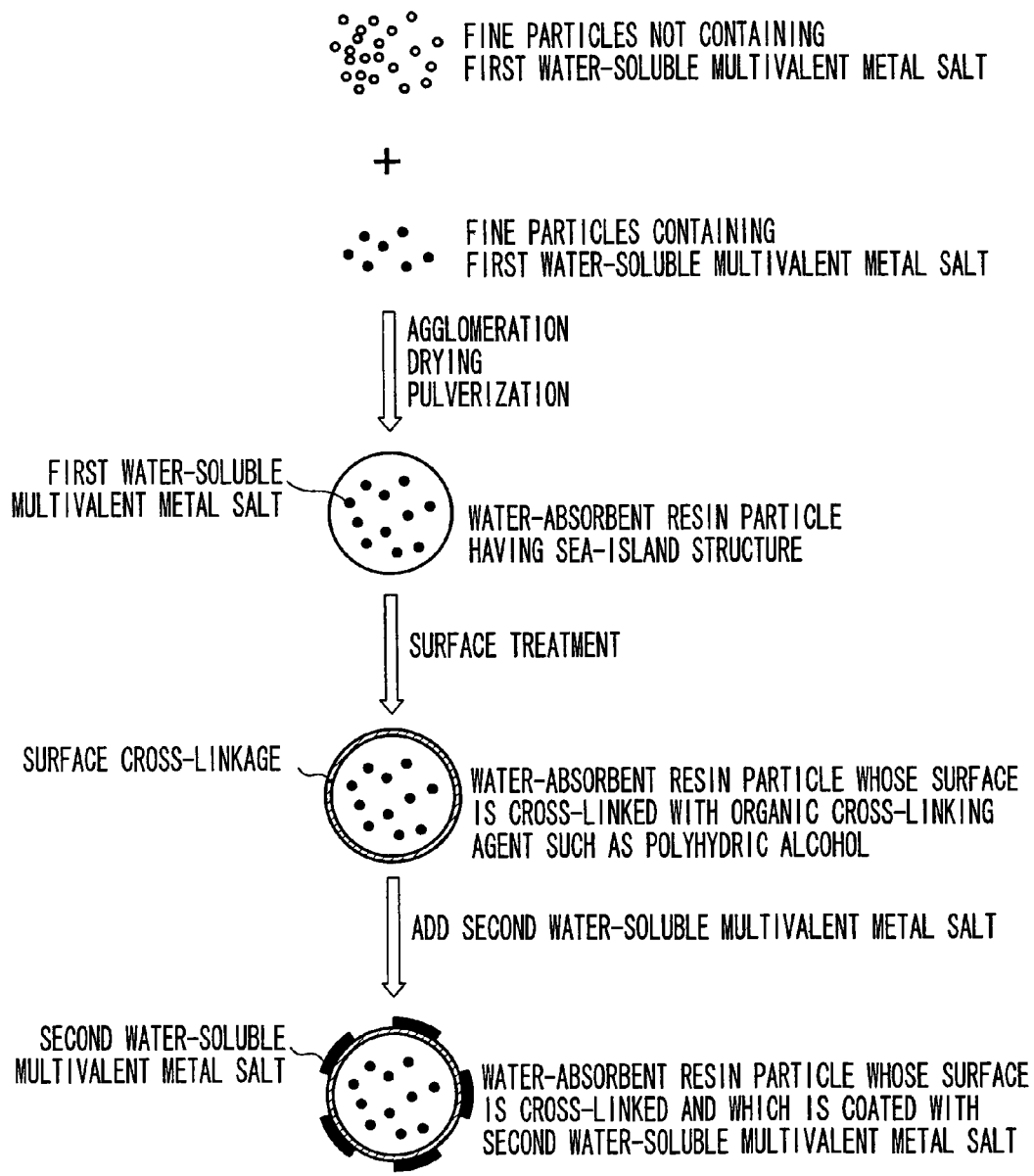
FIG. 3 is a schematic view illustrating a production process for a water-absorbing agent according to the present invention.

FIG. 3 is a schematic view illustrating the method of adding the first water-soluble multivalent metal salt during the agglomeration for obtaining of the water-absorbent resin. As illustrated in FIG. 3, this method is carried out, for example, in the following manner: water-absorbent resin particles (fine powder) not containing the first water-soluble multivalent metal salt are mixed with water-absorbent resin particles (fine powder) containing the first water-soluble multivalent metal salt for their agglomeration. Subsequently, through drying and pulverization, a water-absorbent resin particle having a sea-island structure is formed. Next, the vicinity of the surface of the thus obtained water-absorbent resin particle having a sea-island structure is subjected to surface cross-linking treatment with an organic cross-linking agent. Finally, the second water-soluble multivalent metal salt is added to the surface cross-linked water-absorbent resin particle. In this manner, a water-absorbent resin particle is formed wherein part of the surface of the surface cross-linked water-absorbent resin particle is coated with the second water-soluble multivalent metal salt.

Here, when the total amount of (i) the water-absorbent resin fine particles containing the first water-soluble multivalent metal salt and (ii) the water-absorbent resin fine particles not containing the first water-soluble multivalent metal salt is 100 mass %, a content of (i) the water-absorbent resin fine particles containing the first water-soluble multivalent metal salt is preferably 5 to 50 mass %, more preferably 10 to 40 mass %, particularly preferably 15 to 30 mass %. That is, the ratio of (ii) the water-absorbent resin fine particles not containing the first water-soluble multivalent metal salt and (i) the water-absorbent resin fine particles containing the first water-soluble multivalent metal salt is preferably 50:50 to 95:5. With such a range, the obtained agglomerated particle has a structure such that the first water-soluble multivalent metal salt is further localized therein.

A manner of the mixture of (i) the water-absorbent resin fine particles not containing the first water-soluble multivalent metal salt and (ii) the water-absorbent resin fine particles containing the first water-soluble multivalent metal salt is not particularly limited. For the mixture of the water-absorbent resin fine particles (i) and (ii), they may be introduced into a hopper or tank. In mixing the water-absorbent resin fine particles (i) and (ii), they may be agitated. For the agglomeration of the water-absorbent resin fine particles (i) and (ii), they may be introduced into an agglomeration apparatus. Apart from the foregoing agglomeration method, the agglomeration of the water-absorbent resin fine particles may be carried out in the presence of the first water-soluble multivalent metal salt.

Figure 4:
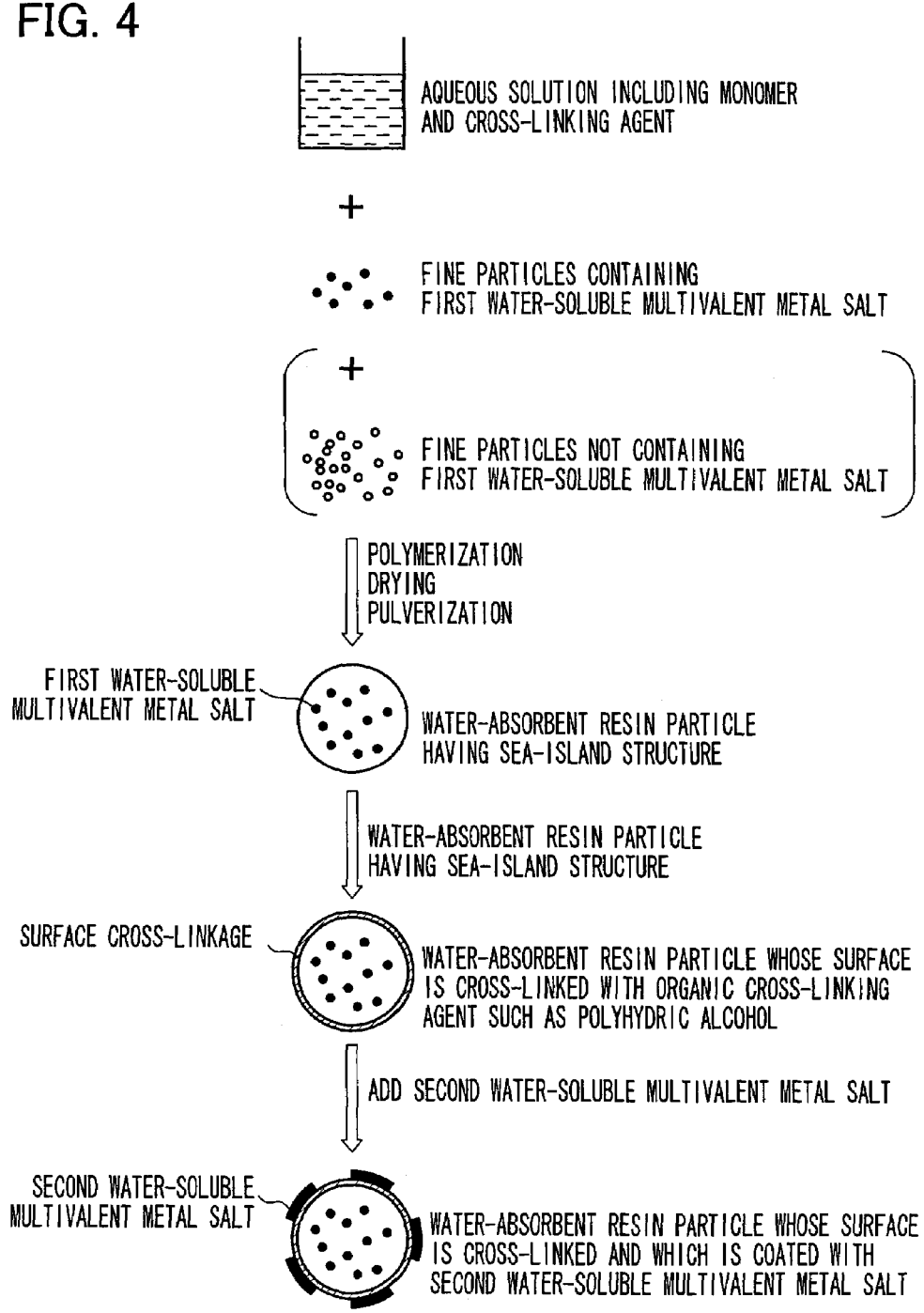
FIG. 4 a schematic view illustrating another production process for a water-absorbing agent according to the present invention.

Meanwhile, FIG. 4 is a schematic diagram illustrating the method of carrying out the step (b) before and/or during the polymerization in the step (a). In this method, the first water-soluble multivalent metal salt is added before and/or during the polymerization of the water-soluble unsaturated monomer in the step (a). More specifically, the water-absorbent resin fine particles containing the first water-soluble multivalent metal salt are added before and/or during the polymerization of a monomer (water-soluble unsaturated monomer) in the presence of a covalent bonding cross-linking agent. With this, the water-absorbent resin fine particles containing the first water-soluble multivalent metal salt and the water-absorbent resin fine particles not containing the first water-soluble multivalent metal salt are mixed together. Thereafter, through drying and pulverization, a water-absorbent resin particle having a sea-island structure is formed. The treatment after the formation of the water-absorbent resin particle having the sea-island structure is performed as in the case of FIG. 3. With such a process, it is also possible to form a water-absorbent resin particle having the structure in which the first water-soluble multivalent metal salt is localized in the water-absorbent resin particle (sea-island structure). Note that, according to the method illustrated in FIG. 4, in practical cases, the resultant water-absorbent resin particle can include a structure in which the first water-soluble multivalent metal salt is not localized (evenly exists) therein.

Figure 5:
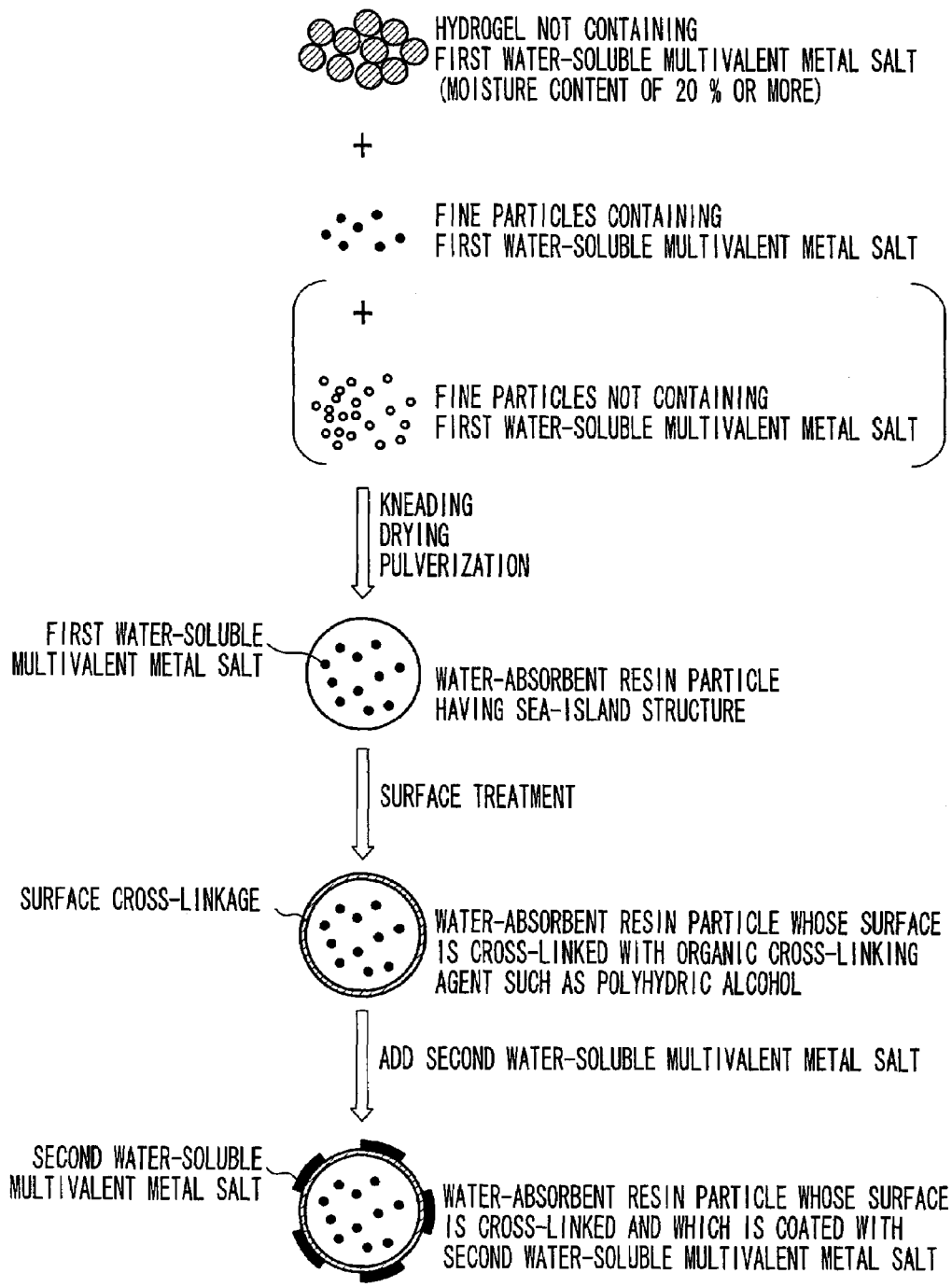
FIG. 5 is a schematic view illustrating still another production process for a water-absorbing agent according to the present invention.
Figure 6:
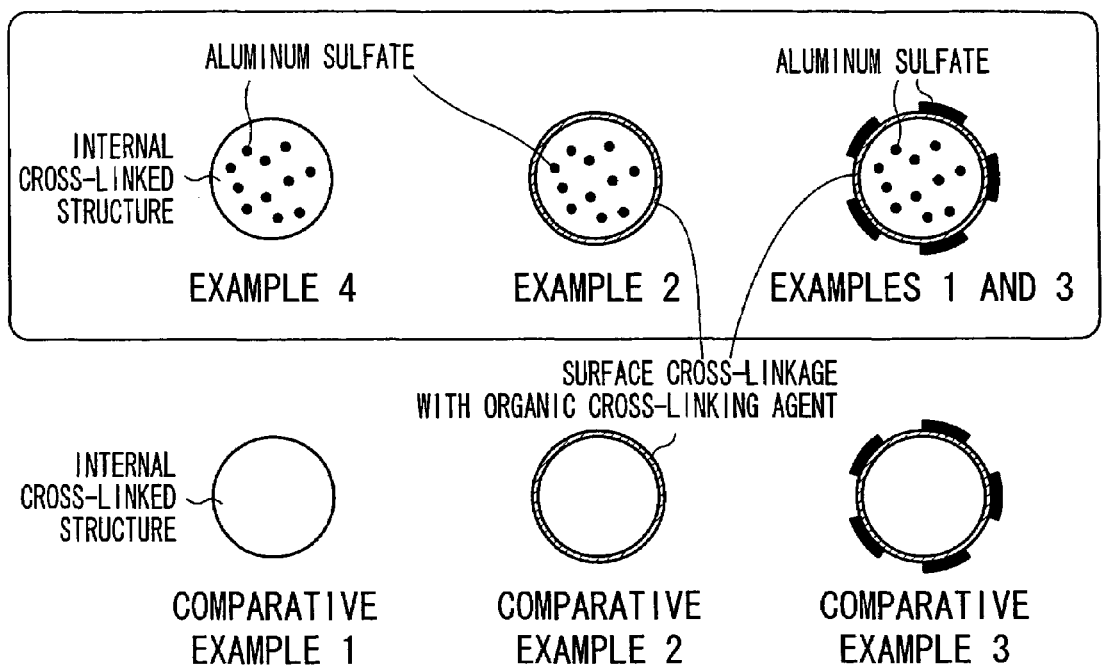
FIG. 6 is a schematic view of respective structure of water-absorbent resin particles in the present invention.

FIG. 5 is a schematic diagram illustrating the method of carrying out the step (b) by using a hydrogel water-absorbent resin not containing the first water-soluble multivalent metal salt. In this method, the step (b) is carried out by mixing (kneading) (i) a hydrogel water-absorbent resin having a moisture content of not less than 20 mass % (preferably 30 to 100 mass %) with (ii) water-absorbent resin fine particles containing the first water-soluble multivalent metal salt. Thereafter, through drying and pulverization, a water-absorbent resin particle having a sea-island structure is formed. In this manner, the first water-soluble multivalent metal salt is caused to evenly distribute in the entire water-absorbent resin, as well as the sea-island structure is formed. This enables the first water-soluble multivalent metal salt to unevenly exist in part of the water-absorbent resin particle. The treatment performed after the formation of the water-absorbent resin particle having the sea-island structure is performed as in the cases of FIGS. 3 and 4.

Figure 7:
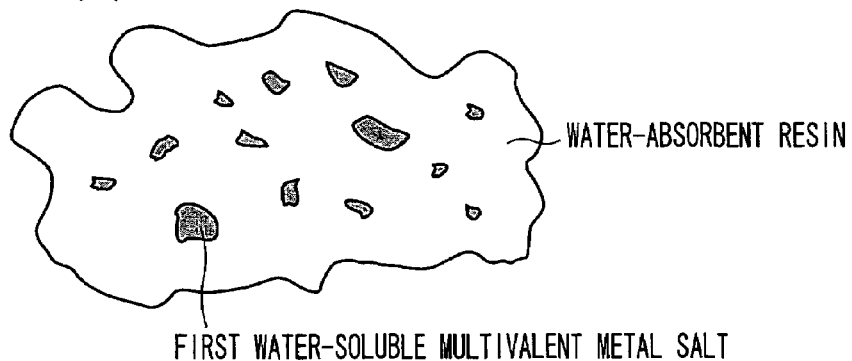
FIG. 7($a$) is a cross-sectional diagram schematically illustrating a water-absorbent resin particle having a sea-island structure.
Figure 7:
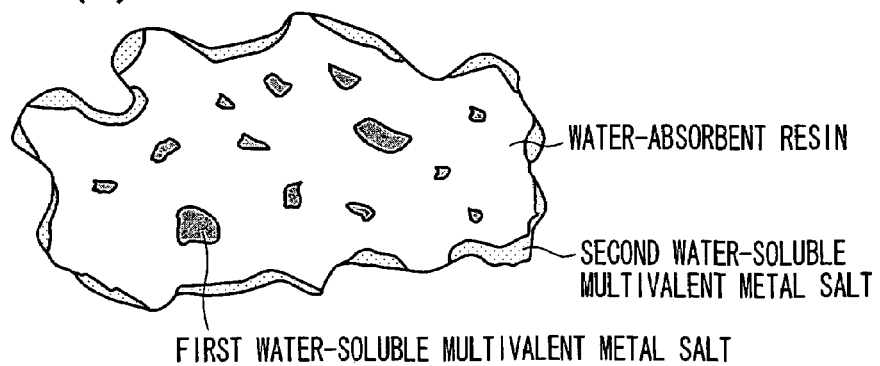

FIG. 7(a) is a cross-sectional diagram schematically illustrating the water-absorbent resin particle having the sea-island structure obtained by the processes in FIGS. 3 through 6. FIG. 7(b) is a cross-sectional diagram schematically illustrating the water-absorbent resin particle illustrated in FIG. 7(a) wherein part of the surface of the water-absorbent resin particle is coated with the second water-soluble multivalent metal salt.

Each of the water-absorbent resin particles obtained as a result of undergoing the processes shown in FIGS. 3 through 6 has therein the sea-island structure in which the first water-soluble multivalent metal salt is scattered in the water-absorbent resin particle (FIGS. 7(a) and 7(b)). Further, part of the surface of the water-absorbent resin particle is coated with the second water-soluble multivalent metal salt (FIG. 7(b)).

Thus, in the present invention, it is preferable to obtain an absorbent resin particle by agglomeration.

That is, it is preferable that the water-absorbing agent of the present invention includes agglomerated water-absorbent resin particles or consists of agglomerated water-absorbent resin particles. This agglomerated product is made by agglomerating a fine powder of water-absorbent resin not having been yet subjected to surface cross-linking treatment (non-surface-cross-linked water-absorbent resin particle) with a fine powder of water-absorbent resin having been subjected to surface cross-linking treatment (surface cross-linked water-absorbent resin particle). Further, this agglomerated product can be produced by a method of agglomerating a mixture of a fine powder of water-absorbent resin not having been yet subjected to surface cross-linking treatment and a fine powder of water-absorbent resin having been subjected to surface cross-linking treatment.

The fine powder of water-absorbent resin not having been yet subjected to surface cross-linking treatment (also referred to as "pre-surface cross-linked fine powder") and the fine powder of water-absorbent resin having been subjected to surface cross-linking treatment (also referred to as "post-surface cross-linked fine powder") is blended in a ratio of 99:1 to 1:99, preferably 99:1 to 50:50, more preferably 99:1 to 60:40.

The pre-surface cross-linked fine powder and the post-surface cross-linked fine powder may be the ones obtained in independently different steps or in the same step of the entire production process for a water-absorbent resin, as a product, obtained by polymerizing a water-soluble unsaturated monomer and then subjecting the thus obtained cross-linked polymer to surface cross-linking. These fine powders can be obtained not only in the pulverization/disintegration/classification step, which has been described previously, but also by a bag filter provided in a heat treatment apparatus, a product hopper, or the like apparatus.

In the present invention, the method for obtaining a water-absorbent resin that is an agglomerated product includes: a method of agglomerating the pre-surface cross-linked fine powder and the post-surface cross-linked fine powder and thereafter mixing them; and a method of agglomerating a mixture of the pre-surface cross-linked fine powder and the post-surface cross-linked fine powder. In terms of mechanical strength of the agglomerated product and simplification of the production process for the agglomerated product, preferable is the latter method, i.e. the method of agglomerating a mixture of the pre-surface cross-linked fine powder and the post-surface cross-linked fine powder.

A manner of mixing the pre-surface cross-linked fine powder and the post-surface cross-linked fine powder is not particularly limited. For the mixture of the pre-surface cross-linked fine powder and the post-surface cross-linked fine powder, they may be introduced into a hopper or tank. In mixing the pre-surface cross-linked fine powder and the post-surface cross-linked fine powder, they may be agitated. For the agglomeration of the pre-surface cross-linked fine powder and the post-surface cross-linked fine powder, they may be introduced into an agglomeration apparatus. In order to obtain an agglomerated product having a high mechanical strength it is preferable that the pre-surface cross-linked fine powder and the post-surface cross-linked fine powder are mixed together before being agglomerated.

In the present invention, as a method for agglomerating a fine powder of the water-absorbent resin, the forgoing method for producing the agglomerated fine powder can be adopted. It is preferable that agglomeration of fine powder is performed in the presence of water. It is more preferable that a water base liquid is added to a mixture of the pre-surface cross-linked fine powder and the post-surface cross-linked fine powder for their agglomeration. The water base liquid is not limited to water, and may include various water-soluble or water-dispersive binders, multivalent metal salts, and various surface cross-linking agents used in the previously described surface cross-linking treatment.

Mixing the water base liquid into the mixture of the fine powder of the pre-surface cross-linked water-absorbent resin particles and the fine powder of the post-surface cross-linked water-absorbent resin particles allows the water base liquid to be more evenly mixed in the whole fine powder than mixing the water base liquid into only the fine powder of the pre-surface cross-linked water-absorbent resin particles, and reduces the tendency to generate fish eye (nonuniform agglomeration), i.e. part where the water base liquid is not mixed. On the other hand, mixing the water base liquid into only the fine powder of the post-surface cross-linked water-absorbent resin particles for agglomeration is likely to produce an agglomerated product inferior in mechanical strength. However, the agglomeration using the mixture of the fine powder of the pre-surface cross-linked water-absorbent resin particles and the fine powder of the post-surface cross-linked water-absorbent resin particles, produces an agglomerated product superior in mechanical strength.

One of preferred embodiments according to the present invention is that a fine powder of water-absorbent resin particle is agglomerated in the presence of multivalent metal salt such as aluminum (water-soluble multivalent metal salt). By agglomerating the fine powder in the presence of multivalent metal salt such as aluminum, it is possible to obtain water-absorbent resin particles that are an agglomerated product having a further improved mechanical strength. Also, it is possible to enhance yield of the agglomerated product. The multivalent-metal salt such as aluminum may be added at the time of agglomeration, or may be included in advance in the fine powder before being agglomerated. For example, by surface cross-linking in the presence of the multivalent metal salt or adding the multivalent metal salt in the form of powder or aqueous solution after surface cross-linking, the multivalent metal salt can be included in the fine powder before being agglomerated.

The agglomerated water-absorbent resin particles may be directly included in a water-absorbing agent as a product, or may be recycled in the production process for a water-absorbing agent.

In the case where the agglomerated water-absorbent resin particles may be directly used for a product, for example, it is preferable that drying, pulverization, and further classification are performed after the agglomeration. As methods for drying, pulverization, and classification, the foregoing methods can be adopted without change.

In terms of water-absorption performance of the agglomerated water-absorbent resin particles, as a product, an absorbency against pressure of 2.07 kPa (AAP2) preferably ranges from 10 to 40 (g/g), more preferably 15 to 35 (g/g). In case where the absorbency against pressure of 2.07 kPa (AAP2) is less than 10 (g/g), when the agglomerated water-absorbent resin particles are used in a sanitary material, e.g. a diaper, a wet back amount (an amount of returning liquid which had been absorbed) might be large and leakage of urine might easily occur.

The uses to which such agglomerated water-absorbent resin particles are put are as follows: A first use is to recycle the agglomerated product as one material in the production process for a water-absorbent resin particles or a water-absorbing agent. A second use is to directly use the agglomerated product for a product used as a water-absorbing agent.

<First Use>

The first use relates to the recycling. More specifically, the agglomerated water-absorbent resin particles, which are made by agglomerating (i) a fine powder of water-absorbent resin not having been yet subjected to surface cross-linking treatment (non-surface-treated water-absorbent resin particles) and (ii) a fine powder of water-absorbent resin having been subjected to surface cross-linking treatment (surface-treated water-absorbent resin particles), is added in a system of any stage in the production process for water-absorbent resin particles or a water-absorbing agent.

Addition of the agglomerated product is not limited as long as the agglomerated product is added in at least one step of the production process for water-absorbent resin particles or a water-absorbing agent. For example, examples of the step in which the agglomerated product is added include aqueous monomer solution preparing step, polymerization step, drying step, pulverization/disintegration/classification step, surface treatment step, and storage step. The agglomerated product can be added during transportation between the exemplified steps. An agglomerated water-absorbent resin can be added to a non-agglomerated water-absorbent resin as a final product.

More specifically, the agglomerated water-absorbent resin can be added to an aqueous monomer solution before being polymerized and to a gel being polymerized in progress or after being polymerized. In addition, the agglomerated water-absorbent resin may be added in the pulverization step and in the surface cross-linking agent mixing step. The agglomerated water-absorbent resin used in recycling is not necessarily dried and pulverized and can be added as it is, i.e. in form of agglomerated product in which the water base liquid is mixed.

A known recycling method is a method of adding a fine powder of water-absorbent resin as it is to an aqueous monomer solution or a gel being polymerized in progress or after being polymerized. However, this method has the problem of difficulty in even mixture. This problem occurs because the fine powder is likely to generate nonuniform agglomeration in mixing the fine powder into the monomer. In addition, the method of adding to a polymer gel has the problem that water vapor caused adheres to a pipe and an inner surface in the apparatus. On the contrary, the method of adding a fine powder of water-absorbent resin in the form of agglomerated product to an aqueous monomer solution or a polymer gel prevents the occurrence of nonuniform agglomeration and the adhesion of water vapor caused to a pipe and an inner surface in the apparatus, thus realizing industrially advantageous recycling of a fine powder of water-absorbent resin.

<Second Use>

The second use is to use as a final product. Agglomerated water-absorbent resin particles can be used as they are as long as their particle diameters are adjusted so as to be in a predetermined particle diameter range. However, as described below, a preferable use of the agglomerated water-absorbent resin particles is to mix the agglomerated water-absorbent resin particles with the non-agglomerated water-absorbent resin particles. Note that, even when the agglomerated water-absorbent resin particles are used alone, it is preferable that the vicinities of the surfaces of the water-absorbent rein particles are further subjected to cross-linking treatment as necessary.

That is, the water-absorbing agent according to the present invention may be a water-absorbent resin composition containing water-absorbent resin particles. A use of a final product relates to this water-absorbent resin composition. In the case where the water-absorbent resin composition contains agglomerated water-absorbent resin particles and non-agglomerated water-absorbent resin particles, it is preferable that the agglomerated water-absorbent resin particles are classified to obtain the agglomerated water-absorbent resin particles of a uniform particle diameter. For example, the agglomerated water-absorbent resin particles are preferably classified so as to include particles whose particle diameter is in the range from 100 to 850 μm, preferably 98 wt % or more (preferably 99 wt % or more) of particles whose particle diameter is in the range from 150 to 850 μm. It is still further preferable that the agglomerated water-absorbent resin particles are classified so as to obtain their mass average particle diameter of 200 to 500 μm and its mass average particle diameter logarithmic standard deviation (σζ) of 0.2 to 0.45.

In the water-absorbent resin composition, a content of the agglomerated water-absorbent resin ranges from 1 to 100 wt %, preferably 3 to 50 wt %, more preferably 5 to 30 wt %.

In the present invention, it is preferable that the vicinity of the surface of the water-absorbent resin particle is further cross-linked. For example, part of the water-absorbent resin particle whose surface has been cross-linked is coated (surface cross-linked) with the second water-soluble multivalent metal salt. In performing surface cross-linking, it is preferable that an aqueous solution containing the second water-soluble multivalent metal salt is added in at least one of the following stages: before, during, and after surface cross-linking treatment with an organic cross-linking agent. Apart from this, the surface cross-linking can be performed by a method of dry blending the second water-soluble multivalent metal salt, a method of dry blending the second water-soluble multivalent metal salt and adding an appropriate binder, or a method of heat sealing the second water-soluble multivalent metal salt.

In the present invention, it is preferable that a hydrophilic organic solvent as well as the water-soluble multivalent metal salt are mixed with the water-absorbent resin particles.

Examples of the hydrophilic organic solvent include the foregoing hydrophilic organic solvents that may be used in combination in the previously described surface cross-linking treatment. It is particularly preferable to use the following hydrophilic organic solvents: polyhydric alcohols such as ethyleneglycol, diethyleneglycol, propyleneglycol, triethyleneglycol, tetraethyleneglycol, polyethyleneglycol, 1,3-propanediol, dipropyleneglycol, 2,2,4-trimethyl-1,3-pentandiol, polypropyleneglycol, glycerin, polyglycerin, 2-butene-1,4-diol, 1,3-butandiol, 1,4-butandiol, 1,5-pentandiol, 1,6-hexanediol, 1,2-cyclohexanedimethanol, 1,2-cyclohexanol, trimethylolpropane, diethanolamine, triethanolamine, polyoxypropylene, oxyethlene-oxypropylene block copolymer, pentaerythritol, and sorbitol. Above all, preferable are ethyleneglycol, propyleneglycol, propanediol, butandiol, pentandiol, hexanediol, and glycerin, trimethylolpropane. These components may be used independently or in a suitable combination of two or more kinds.

The water-absorbing agent obtained in the present invention preferably has a hydrophilic organic solvent content of 0 to 1 parts by mass, more preferably 0 to 0.1 parts by mass, particularly preferably 0 to 0.02 parts by mass, with respect to 100 parts by mass of water-absorbent resin particles as main components of the water-absorbing agent. Using the hydrophilic organic solvent enables the water-soluble multivalent metal salt to be more evenly mixed into the water-absorbent resin particles.

Examples of a mixing device used after the second water-soluble multivalent metal salt is added to the water-absorbent resin particles whose surface have been cross-linked in the present invention include: a cylindrical mixer, a screw mixer, a screw extruder, a turbulizer, a Nauta mixer, a V-shaped mixer, a ribbon blender, a double-arm kneader, a fluidized mixer, air current mixer, a rotary disk mixer, a roll mixer, a tumbling mixer, and a Lödige mixer. A mixing method may be batch-type mixing or continuous mixing. These mixing methods may be used alone or in combination. In terms of industrial production, continuous mixing is more preferable. A rotational frequency in mixing is not particularly limited, but is preferably a rotational frequency in such a degree that the water-absorbent resin does not suffer damage. Specifically, the rotational frequency preferably ranges from 1 to 3000 rpm, more preferably 2 to 500 rpm, still more preferably 5 to 300 rpm. A rotational frequency of above 3000 rpm is not preferable because it causes a powdered water-absorbent resin and thus reduces water absorbing properties. Further, a rotational frequency of below 1 rpm causes insufficient mixing property and thus does not bring increases of the liquid permeability and the resistance to blocking as the objects of the present invention.

A particle temperature of the surface cross-linked water-absorbent resin particle before being mixed with the foregoing solution is not particularly limited, but is preferably from room temperature to 100° C., more preferably 50 to 80° C. A particle temperature of above 100° C. causes decrease in mixing property and thus does not bring increases of the absorption properties and the resistance to blocking as the objects of the present invention.

In the present invention, a mixture time spent for the mixture of the surface cross-linked water-absorbent resin particles and the water-soluble multivalent metal salt is not particularly limited, but is preferably 1 second to 20 minutes, more preferably 10 seconds to 10 minutes, still more preferably 20 seconds to 5 minutes. A mixture time of above 20 minutes does not bring effects commensurate with such a long mixture time, and might conversely cause a powdered water-absorbent resin.

Thus, most preferable mixture conditions for obtaining the water-absorbing agent of the present invention are: particle temperature of the surface cross-linked water-absorbent resin particle of 50 to 80° C.; a rotational frequency of 5 to 300 rpm; and a mixture time of 20 seconds to 5 minutes. A water-absorbing agent obtained by the mixture performed under the present conditions offers excellent handleability and does not cause the problems such as adhesion and flocculation. This eliminates the need for a drying step for increasing handleability of the water-absorbing agent, which is supposed to be performed after the mixture.

In the water-absorbing agent according to the present invention, in order to sufficiently exhibit effects of the present invention, it is preferable that at least part of the surface of the water absorbent resin particle is coated with trivalent and/or quadrivalent water-soluble multivalent metal salt. Further, it is more preferable not to coat entire surface of the water-absorbent resin particle. When the entire surface of the water absorbent resin particle is coated, an absorption rate (for example, a centrifuge retention capacity (CRC) and an absorbency against pressure of 4.83 kPa (AAP)) may significantly drop.

In the production process for a water-absorbing agent according to the present invention, instead of the steps (a) through (c), the following steps (a') through (c') may be performed:

(a') Step of forming water-absorbent resin particles containing first water-soluble multivalent metal salt and having an internal cross-linked structure, obtained by polymerizing a water-soluble unsaturated monomer in the presence of a covalent bonding cross-linking agent; and (b') Step of causing water-absorbent resin fine particles not containing the first water-soluble multivalent metal salt to be contained in the water-absorbent resin particle containing the first water-soluble multivalent metal salt; and (c') Step of heating a water-absorbent resin particle having the water-absorbent resin fine particles contained therein, or mixing the water-absorbent resin particle having the water-absorbent resin fine particles contained therein with a surface cross-linking agent and then heating a resultant mixture, so as to cross-link the vicinities of the surfaces of the water-absorbent resin particles.

Thus, it is possible to produce a water-absorbing agent which includes the water-absorbent resin particle containing the first water-soluble multivalent metal salt and having therein a sea-island structure having: part of containing the first water-soluble multivalent metal salt and part of not containing the first water-soluble multivalent metal salt.

[Water-Absorbing Agent]

The water-absorbing agent obtained in the present invention is arranged such that a cross-linked structure by ionic bonding formed with the first water-soluble multivalent metal salt is localized in a water-absorbent resin particle having internal cross-linkage and a surface cross-linkage therein. Thus, the water-absorbing agent obtained in the present invention has less water-soluble component content, more excellent liquid permeability, and more excellent water retention under pressure than the conventional water-absorbing agent.

A moisture content of the water-absorbing agent obtained in the present invention is preferably less than 10 mass %, particularly preferably less than 5 mass %.

The water-absorbing agent obtained in the present invention has a centrifuge retention capacity (CRC) of preferably 5 (g/g) or more, more preferably 10 (g/g) or more, still more preferably 15 (g/g) or more. An upper limit of the centrifuge retention capacity (CRC) is not particularly limited, but is preferably 100 (g/g) or less, more preferably 70 (g/g) or less, still more preferably 50 (g/g) or less. When the centrifuge retention capacity (CRC) is less than 5 (g/g), an amount of absorbed liquid is so small that the water-absorbing agent is not suitable for use in a sanitary material such as a diaper. Further, when the centrifuge retention capacity (CRC) exceeds 100 (g/g), it may be impossible to obtain a water-absorbing agent which is superior in liquid permeability.

An absorbency against pressure (AAP) of 4.83 kPa of the water-absorbing agent obtained in the present invention is preferably 5 (g/g) or more, more preferably 10 (g/g) or more, still more preferably 15 (g/g) or more. An upper limit of the absorbency against pressure (AAP) of 4.83 kPa (AAP) is not particularly limited, but is preferably 50 (g/g) or less. In case where the absorbency against pressure of 4.83 kPa (AAP) is less than 5 (g/g), it may be impossible to obtain a water-absorbing agent which is superior in liquid permeability. As a result, when the water-absorbing agent is used in a diaper for example, a wet back amount, i.e. a so-called re-wet amount (an amount of returning liquid which had been absorbed) is large which results in skin rash of a baby.

A saline flow conductivity (SFC) of the water-absorbing agent obtained in the present invention is preferably $10(\times 10^{-7}$ $cm^3 \cdot s \cdot g^{-1})$ or more, more preferably $40(\times 10^{-7}\ cm^3 \cdot s \cdot g^{-1})$ or more, still more preferably $100(\times 10^{-7}\ cm^3 \cdot s \cdot g^{-1})$ or more. An upper limit of the saline flow conductivity (SFC) is not particularly limited, but is preferably $2000(\times 10^{-7}\ cm^3 \cdot s \cdot g^{-1})$ or less. In case where the saline flow conductivity (SFC) is less than $30(\times 10^{-7}\ cm^3 \cdot s \cdot g^{-1})$, the liquid permeability cannot be increased even when the water-soluble multivalent metal salt is added. As a result, when concentration of the water-absorbent resin particles in a core of a diaper is 30 mass % or more (more specifically, when concentration of the water absorbent resin particles in a core of a diaper is 5.0 mass % or more), a rate at which urine is absorbed is low. This may result in leakage.

A water-absorbing agent of the present invention is preferably arranged such that a powder dust amount measured for 10 minutes by using a Heubach DUSTMETER is not more than 200 ppm. In other words, the water-absorbing agent of the present invention is preferably produced in a working environment-where the amount of dust collected is not more than 200 ppm. The powder dust amount is measured by a Heubach DUSTMETER, measurement mode Type I.

Such a water-absorbing agent is superior in low powder dust emissions and thus reduces powder dust that would have safety and health concerns. In producing a product including such a water-absorbing agent, e.g. disposable diaper, the amount of powder dust which workers are exposed to can be reduced, which improves a working environment.

That is, in a case where water-absorbent resin includes powder dust of not more than 200 ppm during the production of a water-absorbing agent, powder dust emitted in a working environment is invisible. In this case, the problem that a filter of a dust collector is easily blocked with powder dust and other problems are less likely to occur, which results in an improvement in workability. Further, it is possible to reduce the amount of powder dust in the air of a working atmosphere, which become safety and health concerns.

In a case where water-absorbent resin includes powder dust of more than 500 ppm during the production of a water-absorbing agent, powder dust emitted in a working environment is visible when water-absorbent resin particles filed in a flexible container bag are moved into another storage tank (e.g. hopper).

In a case where water-absorbent resin includes powder dust ranging from 500 to 300 ppm during the production of a water-absorbing agent, powder dust emitted in a working environment is barely visible. In this case, however, the problem that a filter of a dust collector is easily blocked with powder dust and other problems can possibly occur.

[Absorbent Core]

The water-absorbing agent obtained in the present invention is combined with a suitable material, thereby obtaining favorable absorbent core serving as an absorbing layer of a sanitary material for example. The following describes the absorbent core.

The absorbent core is a composition, used in sanitary materials such as a disposable diaper, a sanitary napkin, an incontinence pad, a medical pad, to absorb blood, body fluid, and urine. The composition contains the water-absorbing agent and other materials. An example of the material used is a cellulose fiber. Specific examples of the cellulose fiber include: wood pulp fibers such as a mechanical pulp, a chemical pulp, a semi-chemical pulp, a dissolved pulp, and the like, that are extracted from wood; artificial cellulose fibers such as rayon and acetate; and the like. Among the cellulose fibers, it is preferable to use the wood pulp fiber. Each of these cellulose fibers may partially contain a synthesis fiber such as polyester. In case of using the water-absorbing agent obtained in the present invention as a part of the absorbent core, a mass of the water-absorbing agent obtained in the present invention is preferably 20 mass % or more. When the mass of the water-absorbing agent obtained in the present invention is less than 20 mass %, it may be impossible to obtain a sufficient effect.

In order to obtain the absorbent core by using the water-absorbing agent obtained in the present invention and the cellulose fiber, an appropriate method is selected, for example, from the following known methods: a method in which the water-absorbing agent is dispersed on paper or a mat made from cellulose fiber and the dispersed water-absorbing agent is held by the paper or mat as required; a method in which the cellulose fiber and the water-absorbing agent are evenly blended with each other; and a similar method. It is preferable to adopt a method in which the water-absorbing agent and the cellulose fiber are dry mixed with each other and then are compressed. According to this method, it is possible to remarkably suppress the water-absorbing agent from falling away from the cellulose fiber. It is preferable to perform the compression while heating, and a temperature range at this time is 50 to 200° C. Further, in order to obtain the absorbent core, a method recited in U.S. Pat. No. 5,849,405 and a method recited in U.S. Patent Application Publication No. 2003/060112 are favorably adopted.

The water-absorbing agent obtained in the present invention is superior in properties. Thus, when the water-absorbing agent is used in the absorbent core, it is possible to obtain an extremely superior absorbent core which quickly absorbs liquid and has little liquid remaining on a surface layer thereof.

The water-absorbing agent obtained in the present invention has a superior water absorbing property. Thus, the water-absorbing agent can be used as a water absorbing/retaining agent in various uses. For example, it is possible to use the water-absorbing agent in: absorbing article water absorbing/retaining agents such as a disposable diaper, a sanitary napkin, an incontinence pad, and a medical pad; agriculture/horticulture water retaining agents such as an alternative bog moss, a soil reforming/improving agent, a water retaining agent, and an agrichemical effect maintaining agent; architectural water retaining agents such as an interior wall condensation preventing agent, and a cement additive; a release control agent; a cold insulation agent; a disposable body warmer; a sewage coagulator; a food freshness maintaining agent; an ion exchange column material; a sludge or oil dehydrating agent; a desiccating agent; a humidity controlling agent; and the like. Further, the water-absorbing agent obtained in the present invention is favorably used in an absorbing sanitary material, such as a disposable diaper and a sanitary napkin, which absorbs feces, urine, and blood.

In case where the absorbent core is used in sanitary materials such as a disposable diaper, a sanitary napkin, an incontinence pad, a medical pad, it is preferable to arrange the absorbent core so as to include: (a) a liquid permeable top sheet disposed adjacent to a body of the user, (b) a liquid impermeable back sheet disposed adjacent to a clothe of the user so as to be away from the body of the user, and (c) an absorbent core disposed between the top sheet and the back sheet. The absorbent core may be arranged so as to be two-or-more-layered, or may be used with a pulp layer.

Thus, according to the present invention, it is possible to provided a water-absorbing agent having less water-soluble component content, more excellent liquid permeability, and more excellent water retention under pressure than the conventional water-absorbing agent. Such a water-absorbing agent can exert high liquid permeability and uniform properties and can be used as a water absorbing/retaining agent in various uses. Especially, the water-absorbing agent of the present invention is particularly favorably used in an absorbing sanitary material, such as a disposable diaper and a sanitary napkin, which absorbs feces, urine, and blood.

Further, a water-absorbing agent (water-absorbent resin composition) according to the present invention has a low content of a fine powder which becomes a factor of generating a gel block in sanitary material and lowing liquid permeability, and realizes a low amount of powder dust dissipated in handling a water-absorbent resin. This enhances yield of a water-absorbent resin and is beneficial in terms of industrial safety and health.

In a production process for a water-absorbing agent according to the present invention, performing an agglomerating step allows for efficient production of a water-absorbing agent including agglomerated water-absorbent resin particles. The obtained water-absorbing agent is excellent in mechanical strength.

In a production process for a water-absorbing agent according to the present invention, an agglomerated water-absorbent resin is recycled as one material, and a recycled produce can be therefore added without generating nonuniform agglomeration. Besides, this recycled use can significantly improve productivity of a water-absorbent resin. In the production process for a water-absorbing agent according to the present invention, a low amount of powder dust is dissipated during the production of a water-absorbing agent. This improves productivity of a water-absorbing agent, and is beneficial in terms of industrial safety and health.

As described above, a production process for a water-absorbing agent of the present invention is a production process for a water-absorbing agent containing water-absorbent resin particles having an internal cross-linked structure obtained by polymerizing a water-soluble unsaturated monomer, and includes the following steps (A) and (B):

(A) step of forming non-surface-treated water-absorbent resin particles having an internal cross-linked structure obtained by polymerizing a water-soluble unsaturated monomer in the presence of a covalent bonding cross-linking agent; and (B) step of causing surface-treated water-absorbent resin fine particles to be contained in the non-surface-treated water-absorbent resin particles.

Further, the production process for a water-absorbing agent of the present invention is preferably arranged such that a mass ratio of the non-surface-treated water-absorbent resin particles and the surface-treated water-absorbent resin fine particles ranges from 99:1 to 50:50.

Another production process for a water-absorbing agent of the present invention is a production process for a water-absorbing agent containing water-absorbent resin particles having an internal cross-linked structure obtained by polymerizing a water-soluble unsaturated monomer, and includes the following steps (A') and (B'):

(A') forming surface-treated water-absorbent resin particles having an internal cross-linked structure obtained by polymerizing a water-soluble unsaturated monomer in the presence of a covalent bonding cross-linking agent; and (B') causing non-surface-treated water-absorbent resin fine particles to be contained in the surface-treated water-absorbent resin particles.

The production process for a water-absorbing agent of the present invention is preferably arranged such that a mass ratio of the surface-treated water-absorbent resin particles and the non-surface-treated water-absorbent resin fine particles ranges from 99:1 to 50:50.

It is preferable that the production process for a water-absorbing agent according to the present invention further includes the step (C):

(C) step of heating (i) non-surface-treated water-absorbent resin particles having the surface-treated water-absorbent resin fine particles contained therein, or mixing (ii) water-absorbent resin particles having the surface-treated water-absorbent resin fine particles contained therein with a surface cross-linking agent and then heating a resultant mixture, so as to cross-link vicinities of surfaces of the water-absorbent resin particles (i) or (ii).

It is preferable that the production process for a water-absorbing agent according to the present invention further includes the step (C'):

(C') step of heating (i) surface-treated water-absorbent resin particles having the non-surface-treated water-absorbent resin fine particles contained therein, or mixing (ii) water-absorbent resin particles having the water-absorbent resin fine particles contained therein with a surface cross-linking agent and then heating a resultant mixture, so as to cross-link vicinities of surfaces of the water-absorbent resin particles (i) or (ii).

In the production process for a water-absorbing agent of the present invention, it is preferable that the steps (A) and (B) are respectively the following steps (a) and (b):

(a) step of forming water-absorbent resin particles not containing first water-soluble multivalent metal salt, the water-absorbent resin particles having an internal cross-linked structure and being obtained by polymerizing a water-soluble unsaturated monomer in the presence of a covalent bonding cross-linking agent; and (b) step of causing water-absorbent resin fine particles containing the first water-soluble multivalent metal salt to be contained in the water-absorbent resin particles not containing the first water-soluble multivalent metal salt.

In the production process for a water-absorbing agent of the present invention, it is preferable that the steps (A') and (B') are respectively the following steps (a') and (b'):

(a') step of forming water-absorbent resin particles containing first water-soluble multivalent metal salt, the water-absorbent resin particles having an internal cross-linked structure and being obtained by polymerizing a water-soluble unsaturated monomer in the presence of a covalent bonding cross-linking agent; and (b') step of causing water-absorbent resin fine particles not containing the first water-soluble multivalent metal salt to be contained in the water-absorbent resin particles containing the first water-soluble multivalent metal salt.

In the production process for a water-absorbing agent of the present invention, it is preferable that the step (C) is the following step (c):

(c) heating (i) water-absorbent resin particles having the first water-soluble multivalent metal salt contained therein, or mixing (ii) the water-absorbent resin particles having the first water-soluble multivalent metal salt contained therein with a surface cross-linking agent and then heating a resultant mixture, so as to cross-link vicinities of surfaces of the water-absorbent resin particles (i) or (ii).

In the production process for a water-absorbing agent of the present invention, it is preferable that the step (C') is the following step (c'):

(c') heating (i) water-absorbent resin particles containing the first water-soluble multivalent metal salt and having water-absorbent resin fine particles contained therein, the water-absorbent resin fine particles not containing the first water-soluble multivalent metal salt, or mixing (ii) water-absorbent resin particles having the water-absorbent resin fine particles contained therein with a surface cross-linking agent and then heating a resultant mixture, so as to cross-link the vicinities of the surfaces of the water-absorbent resin particles (i) or (ii).

It is preferable that the production process for a water-absorbing agent of the present invention further includes the step of:

(d) step of adding a second water-soluble multivalent metal salt to surfaces of the water-absorbent resin particles obtained in the step (c).

It is preferable that the production process for a water-absorbing agent of the present invention further includes the step of:

(d) step of adding a second water-soluble multivalent metal salt to surfaces of the water-absorbent resin particles obtained in the step (c').

It is preferable that the production process for a water-absorbing agent of the present invention is arranged such that: in the step (b), a content of the first water-soluble multivalent metal salt in the water-absorbent resin particles ranges from 0.001 to 1 mass %, with respect to 100 parts by mass of the water-absorbent resin particles;

in the step (d), the amount of the second water-soluble multivalent metal salt added ranges from 0.001 to 4 mass %, with respect to 100 parts by mass of the water-absorbent resin particles; and the content of the first water-soluble multivalent metal salt is less than the amount of the second water-soluble multivalent metal salt added.

In the process production for a water-absorbing agent of the present invention, it is preferable that the first water-soluble multivalent metal salt and the second water-soluble multivalent metal salt each include aluminum.

In the process production for a water-absorbing agent of the present invention, it is preferable that the water-absorbent resin fine particles including the first water-soluble multivalent metal salt are so small in size as to pass through a sieve having a mesh size of 300 µm.

In the process production for a water-absorbing agent of the present invention, it is preferable that the step (b) is realized by agglomeration of the water-absorbent resin particles formed in the step (a) and the water-absorbent resin fine particles containing the first water-soluble multivalent metal salt.

In the process production for a water-absorbing agent of the present invention, it is preferable that the agglomeration is performed in the presence of water.

In the process production for a water-absorbing agent of the present invention, it is preferable that the step (b) is performed before and/or during the polymerization performed in the step (a).

In the process production for a water-absorbing agent of the present invention, it is preferable that the step (b) is realized by mixing a hydrogel water-absorbent resin having a moisture content of not less than 20 mass % and the water-absorbent resin fine particles containing the first water-soluble multivalent metal salt.

In the process production for a water-absorbing agent of the present invention, it is preferable that the surface cross-linking agent used in the step (c) includes polyhydric alcohol.

In the process production for a water-absorbing agent of the present invention, it is preferable that the surface cross-linking agent used in the step (c') includes polyhydric alcohol.

A water-absorbing agent of the present invention is the one obtained in any of the production processes for a water-absorbing agent of the present invention.

The water-absorbing agent of the present invention is a water-absorbing agent including water-absorbent resin particles having an internal cross-linked structure obtained by polymerizing a water-soluble unsaturated monomer, the internal cross-linked structure including covalent bonds, the water-absorbent resin particle having a sea-island structure having (i) part containing a first water-soluble multivalent metal salt and (ii) part not containing the first water-soluble multivalent metal salt.

The water-absorbing agent of the present invention is preferably arranged such that vicinities of surfaces-of the water-absorbent resin particles are cross-linked by the surface cross-linking agent.

The water-absorbing agent of the present invention is preferably arranged such that at least part of the surfaces of the water-absorbent resin particles is coated with a second water-soluble multivalent metal salt.

The water-absorbing agent of the present invention is preferably arranged such that the part (i) includes a portion having a major axis of not shorter than 10 µm long.

The water-absorbing agent of the present invention is preferably arranged such that the first water-soluble multivalent metal salt and the second water-soluble multivalent metal salt each include aluminum.

The water-absorbing agent of the present invention preferably has a mass average particle diameter ranging from 200 to 500 μm, and has logarithmic standard deviation (σζ) of the mass average particle diameter ranging from 0.20 to 0.45.

The water-absorbing agent of the present invention is preferably such that: a content of the water-absorbent resin particles having the sea-island structure ranges from 10 to 100 mass %; a content of the water-absorbent resin particles not having the sea-island structure ranges from 0 to 90 mass %; and a total content of the water-absorbent resin particles is not less than 80 mass %.

The water-absorbing agent of the present invention is preferably such that a saline flow conductivity (SFC) is $10(\times 10^{-7} cm^3 \cdot s \cdot g^{-1})$.

The water-absorbing agent of the present invention is preferably such that an absorbency against pressure (AAP) of 4.83 kPa is not less than 5 (g/g).

The water-absorbing agent of the present invention is preferably such that a powder dust amount measured for 10 minutes by using a Heubach dustmeter is not more than 200 ppm.

A production process for a water-absorbing agent of the present invention is a production process for a water-absorbing agent containing water-absorbent resin particles having an internal cross-linked structure obtained by polymerizing a water-soluble unsaturated monomer, and includes the steps (a) through (c):

(a) Step of forming water-absorbent resin particles not containing first water-soluble multivalent metal salt, the water-absorbent resin particles having an internal cross-linked structure and being obtained by polymerizing a water-soluble unsaturated monomer in the presence of a covalent bonding cross-linking agent;

(b) Step of causing water-absorbent resin fine particles containing the first water-soluble multivalent metal salt to be contained in the water-absorbent resin particle not, containing the first water-soluble multivalent metal salt; and (c) Step of heating (i) a water-absorbent resin particle having the first water-soluble multivalent metal salt contained therein, or mixing (ii) the water-absorbent resin particle having the first water-soluble multivalent metal salt contained therein with a surface cross-linking agent and then heating a resultant mixture, so as to cross-link the vicinities of the surfaces of the water-absorbent resin particles (i) or (ii).

Another production process for a water-absorbing agent of the present invention is a production process for a water-absorbing agent containing water-absorbent resin particles having an internal cross-linked structure obtained by polymerizing a water-soluble unsaturated monomer, and includes the steps (a') through (c'):

(a') step of forming water-absorbent resin particles containing first water-soluble multivalent metal salt and having an internal cross-linked structure, obtained by polymerizing a water-soluble unsaturated monomer in the presence of a covalent bonding cross-linking agent; and (b') step of causing water-absorbent resin fine particles not containing the first water-soluble multivalent metal salt to be contained in the water-absorbent resin particle containing the first water-soluble multivalent metal salt; and (c') step of heating a water-absorbent resin particle having the water-absorbent resin fine particles contained therein, or mixing the water-absorbent resin particle having the water-absorbent resin fine particles contained therein with a surface cross-linking agent and then heating a resultant mixture, so as to cross-link the vicinities of the surfaces the water-absorbent resin particles.

In order to achieve the above object, a water-absorbing agent of the present invention is a water-absorbing agent including water-absorbent resin particles having an internal cross-linked structure obtained by polymerizing a water-soluble unsaturated monomer, wherein the internal cross-linked structure includes covalent bonds, a vicinity of a surface of the water-absorbent resin particle is cross-linked with a surface cross-linking agent, and the water-absorbent resin particle having a sea-island structure having (i) part containing a first water-soluble multivalent metal salt and (ii) part not containing the first water-soluble multivalent metal salt.

According to such a water-absorbing agent and its production process of the present invention, the first water-soluble multivalent metal salt can be localized in the water-absorbent resin particle. This brings the effect of providing a water-absorbing agent having less water-soluble component content, more excellent liquid permeability, and more excellent water retention under pressure than the conventional water-absorbing agent.

Note that Patent document 1 does not disclose the surface treatment with multivalent metal salt. Examples of Patent document 1 merely disclose that a water-absorbent resin having a combination of (i) a cross-linkage by covalent bonding and (ii) a cross-linkage by multivalent metal bonding as internal cross-linkages is only heated without using a surface cross-linking agent. In addition, in Patent document 1, multivalent metal evenly exists inside the water-absorbent resin. This can possibly lower the amount of water absorbed.

Further, Patent documents 2 through 4 do not disclose that (i) an internal cross-linking agent for forming cross-linkage by covalent bonding and (ii) an internal cross-linking agent for forming cross-linkage by multivalent metal bonding are used in combination as internal cross-linking agents.

Patent document 5 describes that multivalent metal may be used in combination with an organic cross-linking agent at the time of surface cross-linking. However, a water-absorbent resin is not actually produced by using the multivalent metal and the organic cross-linking agent in combination.

The production process for a water-absorbing agent of the present invention can be also expressed as follows:

[1] A production process for a water-absorbing agent of the present invention is a production process for a water-absorbing agent containing water-absorbent resin particles having an internal cross-linked structure obtained by polymerizing a water-soluble unsaturated monomer, and includes the steps (a) through (c):

(a) Step of forming water-absorbent resin particles not containing first inorganic compound, the water-absorbent resin particles having an internal cross-linked structure and being obtained by polymerizing a water-soluble unsaturated monomer in the presence of a covalent bonding cross-linking agent;

(b) Step of causing water-absorbent resin fine particles containing the first inorganic compound to be contained in the water-absorbent resin particle not containing the first inorganic compound; and (c) Step of heating (i) a water-absorbent resin particle having the first inorganic compound contained therein, or mixing (ii) the water-absorbent resin particle having the first inorganic compound contained therein with a surface cross-linking agent and then heating a resultant mixture, so as to cross-link the vicinities of the surfaces of the water-absorbent resin particles (i) or (ii).

[2] Another production process for a water-absorbing agent of the present invention is a production process for a water-absorbing agent containing water-absorbent resin particles having an internal cross-linked structure obtained by polymerizing a water-soluble unsaturated monomer, and includes the steps (a') through (c'):

(a') step of forming water-absorbent resin particles containing first inorganic compound and having an internal cross-linked structure, obtained by polymerizing a water-soluble unsaturated monomer in the presence of a covalent bonding cross-linking agent; and (b') step of causing water-absorbent resin fine particles not containing the first inorganic compound to be contained in the water-absorbent resin particle containing the first inorganic compound; and (c') step of heating a water-absorbent resin particle having the water-absorbent resin fine particles contained therein, or mixing the water-absorbent resin particle having the water-absorbent resin fine particles contained therein with a surface cross-linking agent and then heating a resultant mixture, so as to cross-link the vicinities of the surfaces the water-absorbent resin particles.

The water-absorbing agent of the present invention may include an agglomerated water-absorbent resin, and the agglomerated water-absorbent resin may be obtained by agglomerating a fine powder of water-absorbent resin which has not yet been subjected to surface cross-linking treatment (surface treatment) and a fine powder of water-absorbent resin which has been subjected to surface cross-linking treatment (surface treatment).

The water-absorbing agent of the present invention (or agglomerated water-absorbent resin) may be obtained by further cross-linking a vicinity of a surface of a water-absorbent resin particle after the agglomeration.

The water-absorbing agent of the present invention (or agglomerated water-absorbent resin) may be such that the agglomerated product includes multivalent metal salt.

The water-absorbing agent of the present invention (or agglomerated water-absorbent resin) may be such that classification is performed to obtain particles of a uniform particle diameter.

The water-absorbing agent of the present invention may be a water-absorbent resin composition including such an agglomerated water-absorbent resin and non-agglomerated water-absorbent resin. In addition, the water-absorbing agent of the present invention may be such that classification is performed to obtain particles of a uniform particle diameter. The water-absorbing agent of the present invention may be a water-absorbent resin composition.

Thus, the water-absorbing agent including the agglomerated water-absorbent resin can be produced by agglomerating a fine powder of water-absorbent resin (water-absorbent resin fine particles) not having been yet subjected to surface cross-linking treatment and a fine powder of water-absorbent resin (water-absorbent resin fine particles) having been subjected to surface cross-linking treatment. It is preferable that a vicinity of a surface of a particle of the agglomerated water-absorbent resin after the agglomeration is further cross-linked. Further, it is preferable that the agglomerated product includes multivalent metal salt. In case of handling the agglomerated water-absorbent resin as a product, it is preferable that classification is performed to obtain particles of a uniform particle diameter. On the other hand, in case of handling the agglomerated water-absorbent resin as a recycled material, the classification is not necessary in general.

The production process for the foregoing agglomerated water-absorbent resin may include the step of agglomerating a mixture of a fine powder of water-absorbent resin not having been yet subjected to surface cross-linking treatment and a fine powder of water-absorbent resin having been subjected to surface cross-linking treatment.

The production process for the foregoing agglomerated water-absorbent resin may be such that the agglomeration is performed in the presence of water.

The production process for the foregoing agglomerated water-absorbent resin may include the step of adding the agglomerated water-absorbent resin, which is made by agglomerating (i) a fine powder of water-absorbent resin not having been yet subjected to surface cross-linking treatment and (ii) a fine powder of water-absorbent resin having been subjected to surface cross-linking treatment, to a system of any stage in the production process for water-absorbent resin.

In the production process for the foregoing agglomerated water-absorbent resin, the system to which the agglomerated water-absorbent resin is added may be an aqueous monomer solution which is used to obtain a polymer used for the production of a water-absorbent resin.

In the production process for the foregoing agglomerated water-absorbent resin, the system to which the agglomerated water-absorbent resin is added may be a gel being polymerized in progress or after being polymerized for obtaining of a polymer used for the production of a water-absorbent resin.

According to the foregoing processes, as a fine powder used for agglomeration of water-absorbent resin, used is the combination of a fine powder not having yet subjected to surface treatment and a fine powder having been subjected to surface cross-linking treatment. This allows an agglomerated water-absorbent resin to be excellent in mechanical strength, and to be used not only as a product but also as a recycled material. Besides, the agglomeration efficiency increases. Through the classification, it is possible to remove, from a final product, a fine powder of water-absorbent resin having been subjected to surface treatment. On this account, by using the water-absorbent resin particles (agglomerated water-absorbent resin) obtained after the classification, it is possible to produce a water-absorbing agent having a low fine powder content and realizing low powder dust emissions.

Further, surprisingly, by removing a fine powder of water-absorbent resin having been subjected to surface treatment from water-absorbent resin particles of the final product, it is possible to obtain a water-absorbing agent which attains the improvement of saline flow conductivity (SFC) among the properties of the water-absorbing agent. In addition, by removing a fine powder of water-absorbent resin having been subjected to surface treatment from the final product, powder dust is also removed. This enables the reduction of powder dust that would have safety and health concerns. In producing a product (absorbent core) including water-absorbent resin particles (or agglomerated water-absorbent resin), e.g. disposable diaper, the amount of powder dust which workers are exposed to can be reduced, which improves a working environment.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

EXAMPLES

The following will describe details of the present invention with reference to Examples and Comparative Examples. The present invention is not limited to descriptions in Examples and Comparative Examples.

The following description specifically explains the present invention, but the present invention is not limited to this. Note that, for convenience in description, "part by mass" is referred to merely as "part", and "litter" is referred to merely as "L". Also, "mass %" is referred to merely as "wt %". In the present invention, "mass" and "weight" have the same meaning.

Properties of the water-absorbent resin particles or the water-absorbing agent (sample) were measured in accordance with the following method. Further, when a specific condition is not described, this means that all the operations were performed at room temperature (20 to 25° C.) and at humidity of 50 RH %.

Note that, in case of the water-absorbing agent used as a final product such as a sanitary material, the water-absorbing agent absorbed moisture, so that the water-absorbing agent was separated from the final product as required and properties thereof were measured after being subjected to reduced-pressure low-temperature drying (for example, at 1 mmHg or less and at 60° C. for 12 hours). Further, a moisture content of each of the water-absorbing agent used in Examples and Comparative Examples of the present invention was 6 mass % or less.

<Centrifuge Retention Capacity (CRC)>

The centrifuge retention capacity (CRC) represents an absorption capacity at which 0.90 mass % of saline is absorbed for 30 minutes without any pressure. Note that, the CRC is sometimes referred to as an absorbency without load.

0.200 g of water-absorbent resin particles or a water-absorbing agent was evenly contained in a bag (85 mm×60 mm) made of a nonwoven fabric (Heatron Paper made by Nangoku Pulp Kogyo Co., Ltd.: model type is GSP-22). Then, the bag was heat-sealed. Thereafter, the bag was soaked in an excessively large amount (generally, about 500 ml) of 0.90 mass % physiological saline (sodium chloride aqueous solution) whose temperature had been adjusted to room temperature, and was withdrawn 30 minutes later. By using a centrifugal separator (centrifugal machine made by KOKUSAN Corporation: model type is H-122), the bag was drained for three minutes at a centrifugal force (250G) recited in edana ABSORBENCY II 441,1-99, and a mass W1 (g) of the bag was measured. Further, the same operation was performed without using the water absorbent resin particles or the water absorbent resin composition, and a mass W0 (g) was measured. Then, from the masses W1 and W0, a centrifuge retention capacity (CRC) (g/g) was calculated according to the following equation.

Centrifuge retention capacity $(g/g)=((\text{mass } W1 (g) - \text{mass } W0 (g))/\text{mass} (g)$ of water-absorbent resin particles or water-absorbing agent)$-1$ <Absorbency Against Pressure of 4.83kPa (AAP)>

The absorbency against pressure of 4.83 kPa (AAP) represents an absorbency at which 0.90 mass % of saline is absorbed for 60 minutes at 4.83 kPa. Note that, the AAP is referred to also as an absorbency against pressure of 4.83 kPa.

By using an apparatus shown in FIG. 1, the absorbency against pressure (AAP) was measured. On a bottom of a plastic supporting cylinder 100 having a 60 mm internal diameter, a metal gauze 101 of stainless-steel 400 mesh (mesh size of 38 μm) was fusion-bonded. Then, under a condition of a room temperature (20° C. to 25° C.) and 50 RH % relative humidity, 0.900 g of water-absorbent resin particles or a water-absorbing agent was evenly spread on the mesh. Subsequently, a piston 103 and a load 104 were placed in this order on the water-absorbent resin particles or the water-absorbing agent. External diameters of the piston 103 and the load 104 were slightly smaller than 60 mm which was the internal diameter of the supporting cylinder 100, so that there is no gap between the piston and the supporting cylinder, and upward and downward movements of the piston 103 and the load 104 would not be hampered. Note that, the piston 103 and the load 104 were so adjusted as to evenly apply a 4.83 kPa (0.7 psi) load onto the water-absorbent resin particles or the water-absorbing agent. Then, a mass Wa (g) of this measurement set was measured.

Inside a petri dish 105 having a 150 mm diameter, a glass filter 106 (product of Sougo Rikagaku Glass Seisakusho Co., Ltd.; diameter of fine pores: 100 μm to 120 μm) having a 90 mm diameter was placed. Thereafter, a 0.90 mass % of sodium chloride solution 108 whose temperature had been adjusted to 20° C. to 25° C. was added until it reached a level of an upper surface of the glass filter 106. Then, a piece of filter paper (product of Advantec Toyo Kaisha, Ltd.; product name: JIS P3801, No. 2; thickness: 0.26 mm; diameter of retained particles: 5 μm) having a 90 mm diameter was placed thereon, so that an entire surface of the filter paper 107 was wetted. An excess of the 0.90 mass % saline 108 was removed.

The measuring apparatus set was placed on the wet filter paper 107. Then, the water-absorbent resin particles or the water-absorbing agent was made to absorb the 0.90 mass % saline 108 for one hour under the load of 4.83 kPa (0.7 psi). One hour later, the measuring apparatus set having absorbed the 0.90 mass % saline 108 was lifted, and a mass Wb (g) thereof was measured. From the masses Wa and Wb, the absorbency against pressure (AAP) (g/g) was calculated according to the following equation.

Absorbency against pressure $(AAP)=(Wb(g)-Wa(g))/$ (mass (0.900) g of water-absorbent resin particles or water-absorbing agent)

<Absorbency Against Pressure of 2.07 kPa (AAP2)>

Absorbency against pressure of 2.07 kPa (AAP2) was measured as in the case of the measurement of absorbency against pressure of 4.83 kPa (AAP), but 2.07 kPa (0.3 psi) load was evenly applied to the sample (water-absorbent resin particles or water-absorbing agent).

<Saline Flow Conductivity (SFC)>

The saline flow conductivity (SFC) is a value indicative of liquid permeability when water-absorbent resin particles or a water-absorbing agent is swollen. The higher the SFC is, the higher the liquid permeability is.

Calculation of the saline flow conductivity was performed in accordance with a saline flow conductivity (SFC) test recited in U.S. Pat. No. 5,849,405.

Figure 2:
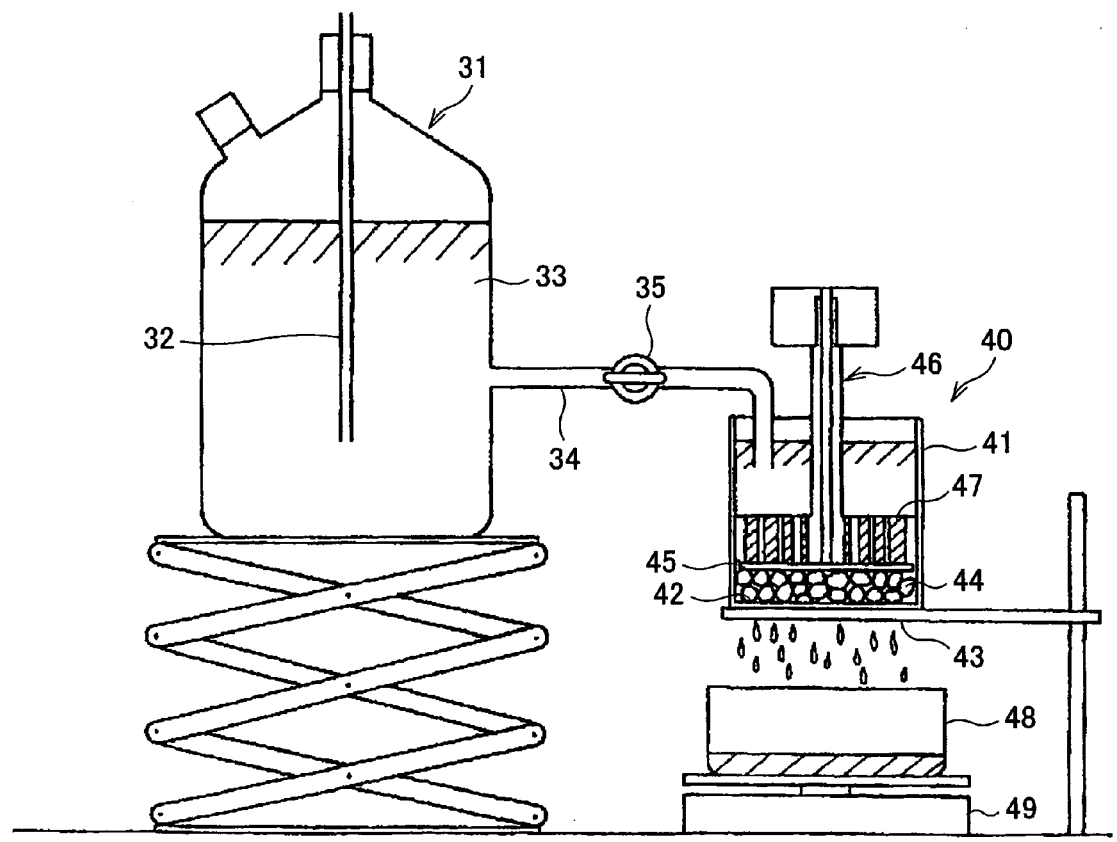
FIG. 2 is a schematic view of a SFC measuring apparatus.

By using an apparatus shown in FIG. 2, the water-absorbent resin particles or the water-absorbing agent (0.900 g) evenly spread in a container 40 was swollen in a synthesized urine (1) under a pressure of 0.3 psi (2.07 kPa) for 60 minutes, and a height of a gel layer of a gel 44 was recorded. Then, under a pressure of 0.3 psi (2.07 kPa), 0.69 mass % sodium chloride solution 33 was made to flow from a tank 31 and to pass through the swollen gel layer at a constant hydrostatic pressure. The SFC test was performed at room temperature (20 to 25° C.). By using a computer and a scale, an amount of liquid passing through the gel layer at intervals of 20 seconds was recorded for 10 minutes as a time function. A flow rate Fs(t) of the solution passing through the swollen gel 44 (mainly between particles thereof) was determined in, terms of g/s by dividing an increasing weight (g) by an increasing time (s). A time in which a constant hydrostatic pressure and a stable flow rate had been obtained was set as "Ts", and only data obtained between "Ts" and a ten-minute interval was used to calculate the flow rate, the flow rate calculated between "Ts" and a ten-minute interval was used to calculate a value of Fs (t=0), i.e., a first flow rate of the solution passing through the gel layer. Fs (T=0) was calculated by extrapolating T=0 from a result obtained by approximating a function indicative of a relationship between Fs (T) and T.

$$\text{Saline flow conductivity}(SFC) = (Fs(t=0) \times L0)/(\rho \times A \times \Delta P)$$
$$= (Fs(t=0) \times L0)/139506$$

Here,

Fs (t=0): a flow rate represented by "g/s"
L0: a height of the gel layer that is represented by "cm"
$\rho$: a density (1.003 g/cm$^3$) of NaCl solution
A: an area (28.27 cm$^2$) on the upper side of the gel layer of the cell 41
$\Delta P$: a hydrostatic pressure (4920 dyne/cm$^2$) exerted to the gel layer. Further, a unit of the saline flow conductivity (SFC) is ($10^{-7} \times cm^3 \times s \times g^{-1}$).

In the apparatus shown in FIG. 2, a glass tube 32 was inserted into the tank 31, and a lower end of the glass tube 32 was disposed so that 0.69 mass % sodium chloride solution 33 was positioned 5 cm higher than a bottom of the swelling gel 44 in the cell 41. 0.69 mass % sodium chloride solution 33 contained in the tank 31 was supplied to the cell 41 via an L-shaped tube 34 with a cock. A collecting container 48 for collecting liquid having passed through the gel layer was disposed under the cell 41, and the collecting container 48 was placed on an even balance 49. An inside diameter of the cell 41 was 6 cm, and No. 400 stainless metal gauze (38 μm in mesh) 42 was placed on a bottom of a lower portion of the cell 41. A hole 47 which allowed liquid to pass through was provided on a lower portion of a piston 46, and a glass filter 45 having high permeability was provided on the bottom thereof so that (i) the water-absorbent resin particles or the water-absorbing agent or (ii) the swelling gel did not enter into the hole 47. The cell 41 was placed on a table for the cell, and the table's surface which is in contact with the cell was positioned on the stainless metal gauze 43 which did not prevent the liquid from passing through.

The synthesized urine (1) was prepared by mixing 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, 0.15 g of ammonium dihydrogen phosphate, and 994.25 g of pure water.

<Mass Average Particle Diameter (D50) and Logarithmic Standard Deviation (σζ) of Particle Size Distribution>

The water-absorbent resin particles or the water-absorbing agent was sieved by using JIS standard sieves respectively having mesh sizes of 850 μm, 710 μm, 600 μm, 500 μm, 425 μm, 300 μm, 212 μm, 150 μm, 45 μm, and the like, and a residual percentage R was plotted on a logarithmic probability paper. Then, a particle diameter corresponding to R=50 mass % was read as the mass average particle diameter (D50). Further, assuming that X1 is a particle diameter in case where R=84.1% and X2 is a particle diameter in case where R=15.9%, the logarithmic standard deviation (σζ) is represented by the following equation. As a value of σζ is smaller, the particle size distribution is narrower.

$$\sigma\zeta = 0.5 \times ln(X2/X1)$$

Classification in measuring the logarithmic standard deviation (σζ) of the particle size distribution was performed as follows: 10.0 g of the water-absorbent resin particles or the water-absorbing agent was spread on JIS standard sieves (THE IIDA TESTING SIEVE: diameter is 8 cm) respectively having mesh sizes of 850 μm, 710 μm, 600 μm, 500 μm, 425 μm, 300 μm, 212 μm, 150 μm, and 45 μm, and was classified by using a sieve shaker (IIDA SIEVE SHAKER, TYPE: ES-65 (rotational frequency: 60 Hz 230 rpm, impact: 60 Hz 130 rpm), SER. No. 0501) for five minutes at the room temperature (20° C. to 25° C.) under the humidity of 50 RH %.

<Quantity of Water-Soluble Component (Extractable Polymer Content)>

184.3 g of a 0.90 mass % saline, was measured and poured into a 250 ml plastic container having a cover. Into the saline, 1.00 g of water-absorbent resin particles or a water-absorbing agent was added, and the saline was stirred for 16 hours by rotating a stirrer, thereby preparing a water-soluble component extract solution. The water-soluble component extract solution was filtered through a piece of filter paper (product of Advantec Toyo Kaisha, Ltd.; product name: JIS P3801, No. 2; thickness: 0.26 mm; diameter of retained particles: 5 μm), thereby obtaining a filtrate. 50.0 g of the filtrate was measured, and used as a measurement solution.

First, 0.90 mass % of the saline to which the water-absorbent resin particles or the water-absorbing agent had not been added was titrated by using a 0.1N NaOH solution, until pH of the saline reached 10. In this way, a titration amount ([bNaOH]ml) of 0.1N NaOH solution which was required so that pH of the saline reached 10 was measured. After that, the 0.1N HCl solution was titrated until pH of the saline reached 2.7. In this way, a titration amount ([bHCl]ml) of 0.1N HCl solution which was required so that pH of the saline reached 2.7 was measured.

The same titration was performed with respect to the measurement solution. As a result, a titration amount ([NaOH]ml) of 0.1 N NaOH solution which was required so that pH of the measurement solution reached 10 was measured, and a titration amount ([HCl]ml) of 0.1N HCl solution which was required so that pH of the measurement solution reached 2.7 was obtained.

For example, in case where water-absorbent resin particles or a water-absorbing agent includes a known amount of acrylic acid and its sodium chloride, it is possible to calculate a quantity of soluble component in the water-absorbent resin particles or the water-absorbing agent in accordance with the following equation. In case of an unknown quantity, an average molecular weight of the monomer is calculated in accordance with a neutralization ratio obtained by the titration.

Quantity of soluble component (mass %)=0.1×(average molecular weight)×184.3×100×([HCl]-[bHCl])/1000/1.0/50.0

Neutralization ratio (mol %)=(1-([NaOH]-[bNaOH])/([HCl]-[bHCl]))×100

<Paint Shaker Test>

The paint shaker test (PS) was performed as follows. 10 g of glass beads whose diameter was 6 mm and 30 g of water-absorbent resin particles or a water-absorbent resin composition were placed in a glass container whose diameter was 6 cm and height was 11 cm. Then, the glass container was provided on a paint shaker (product of Toyo Seiki Seisakusyo, LTD: product No. 488), and was shaken at 800 cycle/min (CPM). An apparatus used in this test is detailed in Japanese Unexamined Patent Publication No. 235378/1997 (Tokukaihei 9-235378).

A test in which a time taken to shake the glass container was 30 minutes was a paint shaker test 1. A test in which a time taken to shake the glass container was 10 minutes was a paint shaker test 2.

After shaking the glass container, the glass beads were removed by using a JIS standard sieve (2 mm in opening), thereby obtaining water-absorbent resin particles or a water-absorbent resin composition which had been damaged.

<Powder Dust Amount (Powder Dust Forming Property>

Figure 10:
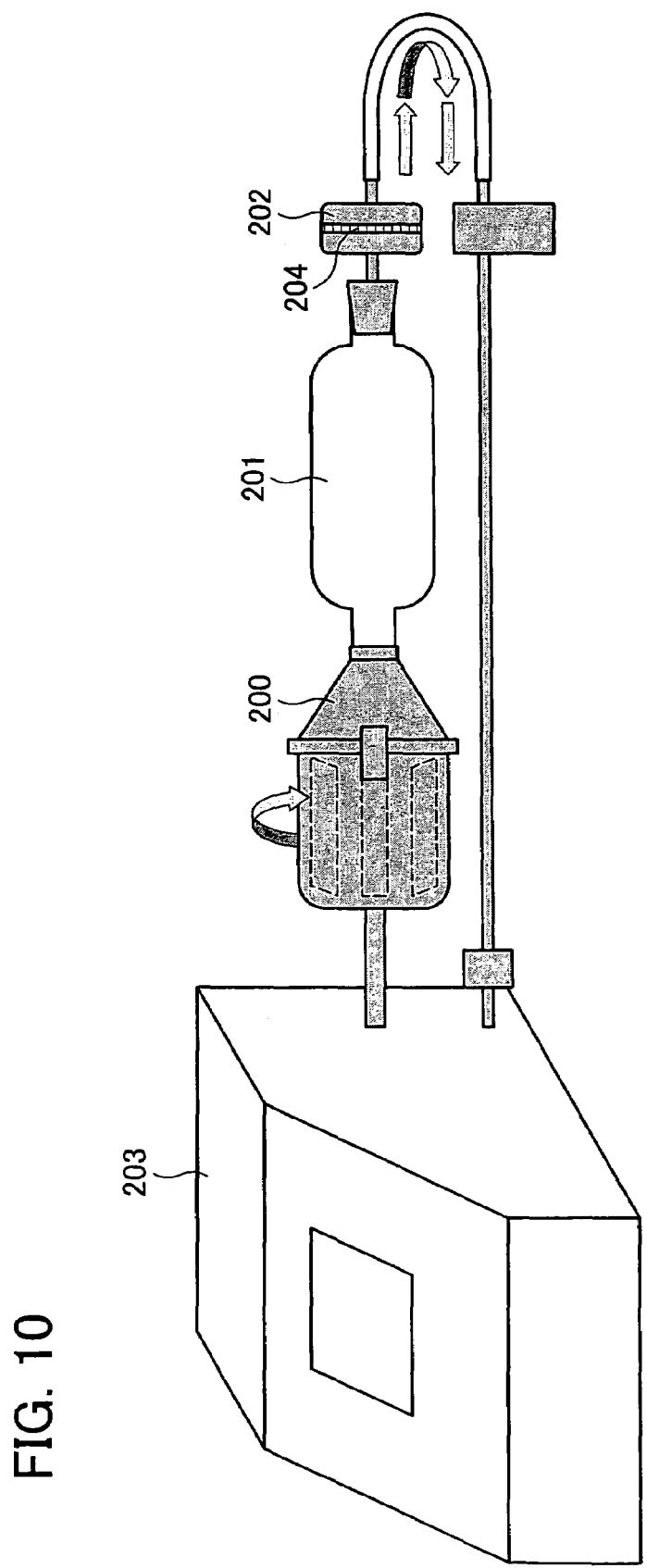
FIG. 10 is a schematic view of a measurement apparatus for measuring the amount of powder dust.

From an increased amount in mass of dust sucked and collected by a glass fiber filter paper for a predetermined time under the conditions below, a powder dust amount of the water-absorbent resin was measured. A measurement apparatus used was a Heubach DUSTMETER (produced by Heubach Engineering GmbH, German; measurement mode: Type I). The measurement was conducted in the atmosphere at a temperature and humidity of 25° C. (±2° C.) and at a relative humidity of 20 to 40% in a normal atmospheric pressure. FIG. 10 is a view schematically illustrating an apparatus for measuring a powder dust amount. The measurement was conducted in the following manner:

(1) Put 100.00 g of water-absorbent resin, as a sample to be measured, into a rotating drum 200;

(2) Measure a mass of a glass fiber filter paper having a retained particles diameter of 0.5 µm (JIS P3801) and a diameter of 50 mm (e.g. GLASS FIBER, GC-90, produced by ADVANTEC Corporation or its equivalent filter paper processed to have a diameter of 50 mm) down to 0.00001 g [Da]g;

(3) Attach a large particles separator 201 to the rotating drum 200, and then attach a filter case 202 equipped with a glass fiber filter paper 204 to the large particles separator 201;

(4) Initiate the measurement after setting a control section 203 of the dustmeter to the following measurement conditions: drum rotational frequency of 30 R/min; suction airflow quantity of 20 L/min; and time (measurement time) of 10 minutes;

(5) After a predetermined period, measure a mass of the glass fiber filter paper 204 down to 0.00001 g [D b].

The powder dust amount is calculated as follows:

Powder dust amount [ppm]=([Db]−[Da])/100.00× 1000000.

Production Example 1

396.7 g of acrylic acid, 4198.1 g of 37 mass % sodium acrylate aqueous solution, 348.1 g of pure water, and 8.64 g of polyethyleneglycoldiacrylate (molecular weight was 523) were dissolved in a reactor that had been prepared by placing a lid on a 10 L stainless-steel double-arm kneader equipped with two sigma blades and a jacket, thereby obtaining a reaction solution. Then, the reaction solution was deaerated for 20 minutes in an atmosphere of nitrogen gas. Subsequently, 26.43 g of 10 mass % sodium persulfate aqueous solution and 22.02 g of 0.1 mass % L-ascorbic acid aqueous solution were added to the reaction solution, while the reaction solution was stirred. Approximately one minute later, polymerization was initiated. During the polymerization, the reaction solution was kept at 20° C. to 95° C. while the generated gel was being pulverized. After 30 minutes from the initiation of the polymerization, the cross-linked hydrogel polymer was removed from the reactor. Thus obtained cross-linked hydrogel polymer had been fragmented so that its diameter was approximately 5 mm or smaller.

The cross-linked hydrogel polymer fragmented was spread out on a wire mesh of 50 mesh, and was dried by hot air at 180° C. for 50 minutes. A dry polymer thus obtained was pulverized by using a roll mill, and then classified by using a JIS standard sieve whose mesh size was 850 µm and a JIS standard sieve whose mesh size was 150 µm, thereby obtaining water-absorbent resin particles (1a) and water-absorbent resin particles (1b). The water-absorbent resin particles (1a) were in irregularly-pulverized shape and had a particle diameter of 850 to 150 µm and a mass average particle diameter of 350 µm. The water-absorbent resin particles (1b) were in irregularly-pulverized shape and had a particle diameter of 150 µm or smaller. In the water-absorbent resin particles (1a), a centrifuge retention capacity was 33.0 g/g and water soluble component was 10.0 mass %.

In 100 parts by mass of thus obtained water-absorbent resin particles (1), a surface cross-linking agent including 0.4 parts by mass of 1,4-butanediol, 0.6 parts by mass of propyleneglycol, and 3.0 parts by mass of pure water, was mixed evenly. The mixture was then heated at 200° C. for 30 minutes. Further, the particles were disintegrated so as to pass through a JIS standard sieve whose mesh size was 850 µm. Subsequently, the particles were subjected to the paint shaker test 1, thereby obtaining water-absorbent resin particles (1a-1) whose surfaces had been cross-linked.

Next, an aqueous solution made of 0.4 parts by mass of aluminum sulfate tetradeca-octadeca hydrate, 0.1 parts by mass of sodium lactate, and 0.5 parts by mass of pure water was evenly added to 100 parts by mass of water-absorbent resin particles (A), and thus obtained mixture was dried at 60° C. for one hour. The dried product was subjected to the paint shaker test 2, and then classified by using a JIS standard sieve whose mesh size was 850 µm and a JIS standard sieve whose mesh size was 150 µm, thereby obtaining water-absorbent resin particles (1a-2) and water-absorbent resin particles (1b-2). The water-absorbent resin particles (1a-2) were in irregularly-pulverized shape and had a particle diameter of 850 to 150 µm. The water-absorbent resin particles (1b-2) were in irregularly-pulverized shape and had a particle diameter of 150 µm or smaller. The water-absorbent resin particles (1a-2) included 0.4 mass % of aluminum sulfate.

Example 1

85 parts by mass of the water-absorbent resin particles (1b) and 15 parts by mass of the water-absorbent resin particles (1b-2) were evenly mixed together, and the thus obtained mixture was heated to 60° C. To the heated mixture, 1.20 parts by mass of hot water of a temperature of 90° C. was quickly added, and stirred at high speed for one minute. The thus obtained hydrogel was dried at 180° C. for 50 minutes, pulverized by using a roll mill, and then classified by using a JIS standard sieve whose mesh size was 600 µm and a JIS standard sieve whose mesh size was 150 µm, thereby obtaining water-absorbent resin particles (1b-3) in irregularly-pulverized shape. In 100 parts by mass of thus obtained water-absorbent resin particles (1b-3), a surface cross-linking agent including 0.4 parts by mass of 1,4-butanediol, 0.6 parts by mass of propyleneglycol, and 3.0 parts by mass of pure water, was mixed evenly. The mixture was then heated at 200° C. for 30 minutes. Further, the particles were disintegrated so as to pass through a JIS standard sieve whose mesh size was 600 µm, thereby obtaining water-absorbent resin particles (1b-4). Next, an aqueous solution made of 0.4 parts by mass of aluminum sulfate tetradeca-octadeca hydrate, 0.1 parts by mass of sodium lactate, and 0.5 parts by mass of pure water was evenly added to 100 parts by mass of the water-absorbent resin particles (1b-4), and thus obtained mixture was dried at 60° C. for one hour, thereby obtaining a water-absorbing agent (1) in irregularly-pulverized shape.

Example 2

The water-absorbent resin particles (1b-4) were used as a water-absorbing agent (2).

Example 3

85 parts by mass of the water-absorbent resin particles (1b) and 15 parts by mass of the water-absorbent resin particles (1b-2) were evenly mixed together, and the thus obtained mixture was heated to 60° C. To the heated mixture, 120 parts by mass of hot water of a temperature of 90° C. was, quickly added, and stirred at high speed for one minute. The thus obtained hydrogel was dried at 180° C. for 50 minutes, pulverized by using a roll mill, and then classified and prepared by using JIS standard sieves whose mesh sizes were 600 μm, 500 μm, 425 μm, 300 μm, and 150 μm, thereby obtaining water-absorbent resin particles (3b-3) in irregularly-pulverized shape having a logarithmic standard deviation ($\sigma\zeta$) of mass average particle diameter was 0.46. In 100 parts by mass of thus obtained water-absorbent resin particles (3b-3), a surface cross-linking agent including 0.4 parts by mass of 1,4-butanediol, 0.6 parts by mass of propyleneglycol, and 3.0 parts by mass of pure water, was mixed evenly. The mixture was then heated at 200° C. for 30 minutes. Further, the particles obtained by heating were disintegrated so as to pass through a JIS standard sieve whose mesh size was 600 μm, thereby obtaining water-absorbent resin particles (3b-4). The thus obtained water-absorbent resin particles (3b-4) were used as a water-absorbing agent (3).

Example 4

The water-absorbent resin particles (1b-3) were used as a water-absorbing agent (4).

Comparative Example 1

100 parts by mass of the water-absorbent resin particles (1b) were heated to 60° C. To the heated water-absorbent resin particles (1b), 120 parts by mass of hot water of a temperature of 90° C. was quickly added, and stirred at high speed for one minute. The thus obtained hydrogel was dried at 180° C. for 50 minutes, pulverized by using a roll mill, and then classified by using a JIS standard sieve whose mesh size was 600 μm and a JIS standard sieve whose mesh size was 150 μm, thereby obtaining water-absorbent resin particles (2b-2) in irregularly-pulverized shape. The thus obtained water-absorbent resin particles (2b-2) were used as a comparative water-absorbing agent (1).

Comparative Example 2

In 100 parts by mass of water-absorbent resin particles (2b-2) thus obtained in Comparative Example 1, a surface cross-linking agent -including 0.4 parts by mass of 1,4-butanediol, 0.6 parts by mass of propyleneglycol, and 3.0 parts by mass of pure water, was mixed evenly. The mixture was then heated at 200° C. for 30 minutes. Further, the particles were disintegrated so as to pass through a JIS standard sieve whose mesh size was 600 μm, thereby obtaining water-absorbent resin particles (2b-3). The thus obtained water-absorbent resin particles (2b-3) were used as a comparative water-absorbing agent (2).

Comparative Example 3

Next, an aqueous solution made of 0.4 parts by mass of aluminum sulfate tetradeca-octadeca hydrate, 0.1 parts by mass of sodium lactate, and 0.5 parts by mass of pure water was evenly added to 100 parts by mass of the water-absorbent resin particles (2b-3); and thus obtained mixture was dried at 60° C. for one hour, thereby obtaining a water-absorbing agent (3) in irregularly-pulverized shape.

FIG. 4 is a schematic diagram illustrating a water-absorbing agent obtained in Examples 1 through 4 and Comparative Examples 1 through 3. As-illustrated in FIG. 4, in Examples 1, 2, and 4, aluminum sulfate which is the first water-soluble multivalent metal salt is localized in the water-absorbent resin particle. In Comparative Examples 1 through 3, aluminum sulfate evenly exists in the water-absorbent resin particle. Further, in Examples 1 and 2 and Comparative Examples 2 and 3, the water-absorbent resin particle is subjected to surface cross-linking with a covalent bonding surface cross-linking agent. In Example 1 and Comparative Example 3, part of the surface cross-linked portion is further subjected to surface cross-linking with aluminum sulfate which is the second water-soluble multivalent metal salt.

Table 1 shows 1 hr soluble component content, SFC, AAP/CRC×100, CRC, and AAP values of the water-absorbing agents (1) through (4) (Examples 1 through 4) and the comparative water-absorbing agents (1) through (3) (Comparative Examples 1 through 3). As is apparent from these values, the water-absorbing agent of the present invention has less soluble component, excellent liquid permeability, and excellent water retention under pressure.

TABLE 1

|  |  | water-absorbing agent (1) | water-absorbing agent (2) | water-absorbing agent (3) | water-absorbing agent (4) | comparative water-absorbing agent (1) | comparative water-absorbing agent (2) | comparative water-absorbing agent (3) |
|---|---|---|---|---|---|---|---|---|
| structures | first water-soluble multivalent metal exists inside | ◯ | ◯ | ◯ | ◯ | X | X | X |
|  | surface cross-linked with organic cross- | ◯ | ◯ | ◯ | X | X | ◯ | ◯ |

TABLE 1-continued

|  |  | water-absorbing agent (1) | water-absorbing agent (2) | water-absorbing agent (3) | water-absorbing agent (4) | comparative water-absorbing agent (1) | comparative water-absorbing agent (2) | comparative water-absorbing agent (3) |
|---|---|---|---|---|---|---|---|---|
|  | linking agent second water-soluble multivalent metal exists on surface | ○ | X | X | X | X | X | ○ |
| properties | 1 hr soluble component content | 5.4 | 5.9 | 5.9 | 10.6 | 15.5 | 9.7 | 8.8 |
|  | SFC | 605 | 394 | 329 | 1 | 0 | 196 | 317 |
|  | AAP/CRC * 100 | 109 | 113 | 108 | 41 | 25 | 103 | 102 |
|  | CRC | 16.3 | 16.6 | 16.6 | 23.7 | 27.7 | 19.5 | 19.3 |
|  | AAP | 17.8 | 18.8 | 17.9 | 9.6 | 7.0 | 20.0 | 19.6 |

Table 2 shows the measurement results of particle distributions of the water-absorbing agents (1) through (4) and the comparative water-absorbing agents (1) through (3). As is apparent from a comparison between the water-absorbing agent (2) and the water-absorbing agent (3), it is preferable that a logarithmic standard deviation (σζ) of mass average particle diameter is not more than 0.45.

TABLE 2

|  | Example 1 water-absorbing agent (1) | Example 2 water-absorbing agent (2) | Example 3 water-absorbing agent (3) | Example 4 water-absorbing agent (4) | Comparative Example 1 comparative water-absorbing agent (1) | Comparative Example 2 comparative water-absorbing agent (2) | Comparative Example 3 comparative water-absorbing agent (3) |
|---|---|---|---|---|---|---|---|
| 850 µm or more | 0 | 0 | 0 | 0 | 0 | 0 | 0 |
| 850 to 710 µm | 0 | 0 | 0.1 | 0 | 0 | 0 | 0 |
| 710 to 600 µm | 0.2 | 0.1 | 0.2 | 0.1 | 0.1 | 0.1 | 0.1 |
| 600 to 500 µm | 4.1 | 3.2 | 18.4 | 3.3 | 3.9 | 4.1 | 4.4 |
| 500 to 425 µm | 19.3 | 18.1 | 19.7 | 18 | 18.6 | 18.9 | 19.3 |
| 425 to 300 µm | 45.4 | 45.5 | 20 | 45.7 | 45.8 | 46.2 | 47 |
| 300 to 212 µm | 21.7 | 22.7 | 19.8 | 22.5 | 21.9 | 21.1 | 20.2 |
| 212 to 150 µm | 7.4 | 8.2 | 19.9 | 8.1 | 7.9 | 7.8 | 7.5 |
| 150 to 45 µm | 1.9 | 2.1 | 1.9 | 2.2 | 1.7 | 1.7 | 1.5 |
| 45 µm or less | 0 | 0.1 | 0.1 | 0.1 | 0.1 | 0.1 | 0 |
| Total (wt %) | 100 | 100 | 100 | 100 | 100 | 100 | 100 |
| D50 (µm) | 346 | 340 | 346 | 340 | 344 | 346 | 349 |
| σζ | 0.3 | 0.31 | 0.46 | 0.31 | 0.31 | 0.3 | 0.3 |

In Table 2, "A µm or more" means a particle diameter of water-absorbent resin particles or water-absorbing agent remaining on a sieve having a mesh size of A µm after the classification. "B µm or less" means a particle diameter of water-absorbent resin particles or water-absorbing agent having passed through a sieve having a mesh size of B µm after the classification. "A to B µm" means a particle diameter of water-absorbent resin particles or water-absorbing agent having passed through a sieve having a mesh size of A µm and remaining on a sieve having a mesh size of B µm, after the classification.

Production Example 2

506 parts by mass of acrylic acid, 4431 parts by mass of 37 mass % sodium acrylate aqueous solution, 581 parts by mass of pure water, and 8.3 parts by mass of polyethyleneglycoldiacrylate (molecular weight was 523) were dissolved in a reactor that had been prepared by placing a lid on a stainless-steel double-arm kneader equipped with two sigma blades and a jacket, thereby obtaining a reaction solution. Then, the reaction solution was deaerated for 20 minutes in an atmosphere of nitrogen gas. Subsequently, 29 parts by mass of 10 mass % sodium persulfate aqueous solution and 24 parts by mass of 0.1 mass % L-ascorbic acid aqueous solution were added to the reaction solution, while the reaction solution was stirred. Approximately one minute later, polymerization was initiated. During the polymerization, the reaction solution was kept at 20° C. to 95° C. while the generated gel was being pulverized. After 30 minutes from the initiation of the polymerization, the cross-linked hydrogel polymer was removed from the reactor. Thus obtained cross-linked hydrogel polymer had been fragmented so that its diameter was approximately 5 mm or smaller.

The cross-linked hydrogel polymer fragmented was spread out on a wire mesh of 50 mesh, and was dried by hot air at 180° C. for 50 minutes. A dried cross-linked polymer thus obtained was pulverized by using a roll mill, and then classified by using a JIS standard sieve whose mesh size was 850 µm and a JIS standard sieve whose mesh size was 150 µm, thereby obtaining water-absorbent resin (10A) and water-absorbent resin (10a). The water-absorbent resin (10A) was a non-agglomerated particulate product of irregular shape and which had a mass average particle diameter of 450 μm. The water-absorbent resin (10a) was a fine powder which had passed through a sieve having a mesh size of 150 μm. A large water-absorbent resin not having passed through the sieve having a mesh size of 850 μm was pulverized and then classified. 15 parts by mass of the water-absorbent resin (10a) was obtained, relative to 100 parts by mass of the water-absorbent resin (10A). In the water-absorbent resin (10A) before being subjected to surface cross-linking, a centrifuge retention capacity was 36 g/g and water soluble component content was 10 mass %.

Next, 100 parts by mass of the water-absorbent resin (10A) was evenly mixed in a plow mixer with a surface treatment agent solution including 0.4 parts by mass of 1,4-butanediol, 0.6 parts by mass of propyleneglycol, and 3.0 parts by mass of pure water, and the thus obtained mixture was heated in a puddle mixer which had been heated to 200° C. An average residence time of the mixture was approximately 50 minutes. The heated mixture was cooled down and classified by using JIS standard sieves respectively having mesh sizes of 850 μm and 150 μm, thereby obtaining a water-absorbent resin (10B) as a product and a water-absorbent resin (10b) that is a fine powder which had passed through the sieve having a mesh size of 150 μm. The water-absorbent resin, after being subjected to surface cross-linking, remaining on the sieve having a mesh size of 850 μm, was disintegrated until it passed through the sieve. 3 parts by mass of the water-absorbent resin (10b), a fine powder which had passed through- the sieve having a mesh size of 150 μm, was obtained relative to 100 parts by mass of the water-absorbent resin (10B).

The water-absorbent resin (10B) as a product had a centrifuge retention capacity (CRC) of 30 g/g, an absorbency against pressure of 4.83 kPa (AAP) of 24.5 g/g, and a saline flow conductivity (SFC) of 40($10^{-7}$ cm$^3$·s·g$^{-1}$).

Example 5

A mixture of (i) 15 parts by mass of the fine powder (10a) before being subjected to surface cross-linking, which had been obtained in Production Example 2, and (ii) 1 part by mass of the fine powder (10b) after being subjected to surface cross-linking was mixed with 18 parts by mass of hot water having a temperature of 95° C. Then, the obtained hydrogel was dried at 180° C., pulverized by a roll mill, and classified by using two sieves respectively having mesh sizes of 850 μm and 150 μm, thereby obtaining a water-absorbent resin (10) that is an agglomerated particulate product. A proportion of water-absorbent resin that is a fine powder which had passed through the sieve having a mesh size of 150 μm was 20 mass %, with respect to a water-absorbent resin that is an agglomerated product which had passed through the sieve having a mesh size of 850 μm.

The water-absorbent resin (10), which is an agglomerated particulate product, had a centrifuge retention capacity (CRC) of 32 g/g and an absorbency against pressure of 2.07 kPa (AAP2) of 16 g/g.

Example 6

A mixture of (i) 15 parts by mass of the fine powder (10a) before being subjected to surface cross-linking, which had been obtained in Production Example 2, and (ii) 3 parts by mass of the fine powder (10b) after being subjected to surface cross-linking was mixed with 20 parts by mass of hot water having a temperature of 95° C. Then, the obtained hydrogel was dried at 180° C., pulverized by a roll mill, and classified by using two sieves respectively having mesh sizes of 850 μm and 150 μm, thereby obtaining a water-absorbent resin (20) that is an agglomerated particulate product. A proportion of water-absorbent resin that is a fine powder which had passed through the sieve having a mesh size of 150 μm was 18 mass %, with respect to a water-absorbent resin that is an agglomerated product which had passed through the sieve having a mesh size of 850 μm.

The water-absorbent resin (20), which is an agglomerated particulate product, had a centrifuge retention capacity (CRC) of 29 g/g and an absorbency against pressure of 2.07 kPa (AAP2) of 18 g/g.

Comparative Example 4

16 parts by mass of the fine powder (10a) before being subjected to surface cross-linking, which had been obtained in Production Example 2, was mixed with 18 parts by mass of hot water having a temperature of 95° C. Then, the obtained hydrogel was dried at 180° C., pulverized by a roll mill, and classified by using two sieves respectively having mesh sizes of 850 μm and 150 μm, thereby obtaining a comparative water-absorbent resin (21) that is an agglomerated particulate product. A proportion of water-absorbent resin that is a fine powder which had passed through the sieve having a mesh size of 150 μm was 22 mass %, with respect to a water-absorbent resin that is an agglomerated product which had passed through the sieve having a mesh size of 850 μm.

The comparative water-absorbent resin (21), which is an agglomerated particulate product, had a centrifuge retention capacity (CRC) of 33 g/g and an absorbency against pressure of 2.07 kPa (AAP2) of 9 g/g.

Comparative Example 5

16 parts by mass of the fine powder (10b) after being subjected to surface cross-linking, which had been obtained in Production Example 2, was mixed with 18 parts by mass of hot water having a temperature of 95° C. Then, the obtained hydrogel was dried at 180° C., pulverized by a roll mill, and classified by using two sieves respectively having mesh sizes of 850 μm and 150 μm, thereby obtaining a comparative water-absorbent resin (22) that is an agglomerated particulate product. A proportion of water-absorbent resin that is a fine powder which had passed through the sieve having a mesh size of 150 μm was 40 mass %, with respect to a water-absorbent resin that is an agglomerated product which had passed through the sieve having a mesh size of 850 μm.

Obtaining such a large amount of fine powder (40 mass %) means that a resultant agglomerated product obtained by agglomeration using only a fine powder after being subjected to surface cross-linking has a low mechanical strength, and therefore is divided into particles due to the release of bonding of the particles of the agglomerated product at the pulverization of a polymer gel and at the classification of a pulverized substance.

The comparative water-absorbent resin (22), which is an agglomerated particulate product, had a centrifuge retention capacity (CRC) of 17 g/g and an absorbency against pressure of 2.07 kPa (AAP2) of 15 g/g.

Example 7

A mixture of (i) 100 parts by mass of the water-absorbent resin (10A) that is a non-agglomerated particulate product before being subjected to surface cross-linking and (ii) 16 parts by mass of the water-absorbent resin (10) that is an agglomerated particulate product before being surface cross-linking, which had been obtained in Example 5, was evenly mixed in a plow mixer with a surface treatment agent solution including 0.46 parts by mass of 1,4-butanediol, 0.70 parts by mass of propyleneglycol, and 3.5 parts by mass of pure water, and the thus obtained mixture was heated in a puddle mixer which had been heated to 200° C. The heated mixture was cooled down and classified by using JIS standard sieves respectively having mesh sizes of 850 µm and 150 µm, thereby obtaining a water-absorbent resin (30) as a product.

A proportion of a water-absorbent resin that is a fine powder which had passed through the sieve having a mesh size of 150 µm was 3 mass %. The powder dust amount of the obtained water-absorbent resin (30) was 150 ppm.

The water-absorbent resin (30) that is a mixture had a centrifuge retention capacity (CRC) of 29.8 g/g, an absorbency against pressure of 4.83 kPa (AAP) of 24.2 g/g, and a saline flow conductivity (SFC) of $38(10^{-7} \text{ cm}^3 \cdot \text{s} \cdot \text{g}^{-1})$.

Example 8

A mixture of (i) 100 parts by mass of the water-absorbent resin (10A) that is a non-agglomerated particulate product before being subjected to surface cross-linking and (ii) 16 parts by mass of the water-absorbent resin (20) that is an agglomerated particulate product before being surface cross-linking, which had been obtained in Example 2, was evenly mixed in a plow mixer with a surface treatment agent solution including 0.46 parts by mass of 1,4-butanediol, 0.70 parts by mass of propyleneglycol, and 3.5 parts by mass of pure water, and the thus obtained mixture was heated in a puddle mixer which had been heated to 200° C. The heated mixture was cooled down and classified by using JIS standard sieves respectively having mesh sizes of 850 µm and 150 µm, thereby obtaining a water-absorbent resin (40) as a mixture. A proportion of a water-absorbent resin-that is a fine powder which had passed through the sieve having a mesh size of 150 µm was 2.5 mass %. The powder dust amount of the obtained water-absorbent resin (40) was 100 ppm.

The water-absorbent resin (40) that is a mixture had a centrifuge retention capacity (CRC) of 30.2 g/g, an absorbency against pressure of 4.83 kPa (AAP) of 24.8 g/g, and a saline flow conductivity (SFC) of $42(10^{-7} \text{ cm}^3 \cdot \text{s} \cdot \text{g}^{-1})$.

Example 9

A mixture of (i) 100 parts by mass of the water-absorbent resin (10A) that is a non-agglomerated particulate product before being subjected to surface cross-linking, which had been obtained in Production Example 2, and (ii) 18 parts by mass of the water-absorbent resin (20) that is an agglomerated particulate product which had been obtained in Example 6, was evenly mixed in a plow mixer with a surface treatment agent solution including 0.46 parts by mass of 1,4-butanediol, 0.70 parts by mass of propyleneglycol, and 3.5 parts by mass of pure water, and the thus obtained mixture was heated in a puddle mixer which had been heated to 200° C. The heated mixture was cooled down and classified by using JIS standard sieves respectively having mesh sizes of 850 µm and 150 µm, thereby obtaining a water-absorbent resin (50) as a mixture. A proportion of a water-absorbent resin that is a fine powder which had passed through the sieve having a mesh size of 150 Mm was 2.2 mass %. The powder dust amount of the obtained water-absorbent resin (50) was 110 ppm.

The water-absorbent resin (50) that is a mixture had a centrifuge retention capacity (CRC) of 29.5 g/g, an absorbency against pressure of 4.83 kPa (AAP) of 24.4 g/g, and a saline flow conductivity (SFC) of $41(10^{-7} \text{ cm}^3 \cdot \text{s} \cdot \text{g}^{-1})$.

Example 10

A mixture of (i) 15 parts by mass of the water-absorbent resin (10a) that is a fine powder, which had been obtained in Production Example 2, and (ii) 1 part by mass of the water-absorbent resin (10b) that is a fine powder after being subjected to surface treatment was mixed with 18 parts by mass of hot water having a temperature of 95° C., thereby obtaining a hydrogel water-absorbent resin (61).

Next, 34 parts by weight of the hydrogel water-absorbent resin (61) together with 100 parts by weight of the cross-linked hydrogel polymer fragmented after the polymerization in the Production Example 1 were spread out on a wire mesh of 50 mesh, and were dried by hot air at 180° C. for 50 minutes. A dry product thus obtained was pulverized by using a roll mill, and then classified by using a JIS standard sieve whose mesh size was 850 µm and a JIS standard sieve whose mesh size was 150 µm, thereby obtaining water-absorbent resin (60A) and water-absorbent resin. (60a). The water-absorbent resin (60A) was particulate of irregular shape and had a mass average particle diameter of 450 µm. The water-absorbent resin (60a) was a fine powder which had passed through the sieve having a mesh size of 150 µm. A water-absorbent resin after the surface cross-linking, remaining on the sieve having a mesh size of 850 µm, was disintegrated until it passed through the sieve. 15 parts by mass of the water-absorbent resin (60a), which is an agglomerated product but a fine powder, was obtained, relative to 100 parts by mass of the water-absorbent resin (60A) that is particulate of irregular shape.

In the water-absorbent resin (60A) before being subjected to surface cross-linking, a centrifuge retention capacity (CRC) was 35 g/g and water soluble component content was 10 mass %.

Then, 100 parts by mass of the water-absorbent resin (60A) before subjected to surface cross-linking that was particulate of irregular shape was evenly mixed in a plow mixer with a surface treatment agent solution including 0.4 parts by mass of 1,4-butanediol, 0.6 parts by mass of propyleneglycol, and 3.0 parts by mass of pure water, and the thus obtained mixture was heated in a puddle mixer which had been heated to 200° C. The heated mixture was cooled down and classified by using JIS standard sieves respectively having mesh sizes of 850 µm and 150 µm, thereby obtaining a water-absorbent resin (60) as a product. The water-absorbent resin after subjected to surface cross-linking, remaining on the sieve having a mesh size of 850 µm, was disintegrated until it passed through the sieve.

In the water-absorbent resin (60) as a product, a centrifuge retention capacity (CRC) was 29.8 g/g, an absorbency against pressure of 4.83 kPa (AAP) was 24.8 g/g, and a saline flow conductivity (SFC) was $38(10^{-7} \text{ cm}^3 \cdot \text{s} \cdot \text{g}^{-1})$.

Example 11

506 parts by mass of acrylic acid, 4431 parts by mass of 37 mass % sodium acrylate aqueous solution, 581 parts by mass of pure water, and 7.7 parts by mass of polyethyleneglycoldiacrylate (molecular weight was 523) were dissolved in a reactor that had been prepared by placing a lid on a stainless-steel double-arm kneader equipped with two sigma blades and a jacket, thereby obtaining a reaction solution. Then, the reaction solution was deaerated for 20 minutes in an atmosphere of nitrogen gas. Subsequently, in the reaction solution, 243 parts by mass of the hydrogel water-absorbent resin (61), which had been obtained in Example 10, was added and stirred. As a result, the hydrogel water-absorbent resin (61)

was dispersed in the reaction solution without forming non-uniform agglomeration. Subsequently, 29 parts by mass of 10 mass % sodium persulfate aqueous solution and 24 parts by mass of 0.1 mass % L-ascorbic acid aqueous solution were added to the reaction solution, while the reaction solution was stirred. Approximately two minutes later, polymerization was initiated. During the polymerization, the reaction solution was kept at 20° C. to 95° C. while the generated gel was being pulverized. After 30 minutes from the initiation of the polymerization, the cross-linked hydrogel polymer was removed from the reactor. Thus obtained cross-linked hydrogel polymer had been fragmented so that its diameter was approximately 5 mm or smaller.

The cross-linked hydrogel polymer fragmented was spread out on a wire mesh of 50 mesh, and was dried by hot air at 1.80° C. for 50 minutes. A dried cross-linked polymer thus obtained was pulverized by using a roll mill, and then classified by using a JIS standard sieve whose mesh size was 850 μm and a JIS standard sieve whose mesh size was 150 μm, thereby obtaining a water-absorbent resin (70A) that was particulate of irregular shape.

In the water-absorbent resin (70A) before subjected to surface cross-linking that was particulate of irregular shape, a centrifuge retention capacity (CRC) was 36 g/g and water soluble component content was 11 mass %.

Next, 100 parts by mass of the water-absorbent resin (70A) was evenly mixed in a plow mixer with a surface treatment agent solution including 0.4 parts by mass of 1,4-butanediol, 0.6 parts by mass of propyleneglycol, and 3.0 parts by mass of pure water, and the thus obtained mixture was heated in a puddle mixer which had been heated to 200° C. An average residence time of the mixture was approximately 50 minutes. The heated mixture was cooled down and classified by using JIS standard sieves respectively having mesh sizes of 850 μm and 150 μm, thereby obtaining a water-absorbent resin (70) of irregular shape, as a product. The water-absorbent resin after being subjected to surface cross-linking, remaining on the sieve having a mesh size of 850 μm, was disintegrated until it passed through the sieve.

In the water-absorbent resin (70) of irregular shape as a product, a centrifuge retention capacity (CRC) was 30.1 g/g, an absorbency against pressure of 4.83 kPa (AAP) was 23.8 g/g, and a saline flow conductivity (SFC) was $40(10^{-7}\ cm^3 \cdot s \cdot g^{-1})$.

Production Example 3

In Production Example 2, after the heated mixture after surface cross-linking was cooled down, 100 parts by mass of a cooled resultant was mixed with 3 parts by mass of a mixture solution including 2.5 parts by mass of 25% aluminum sulfate aqueous solution and 0.5 parts by mass of 50% sodium lactate aqueous solution, and the mixture was left still for 30 minutes at a room temperature.

Subsequently, the mixture was classified by using JIS standard sieves respectively having mesh sizes of 850 μm and 150 μm, thereby obtaining a water-absorbent resin (100B) as a product and a water-absorbent resin (100b) that is a fine powder which had passed through the sieve having a mesh size of 150 μm and whose surface is cross-linked. The water-absorbent resin after being subjected to surface cross-linking, remaining on the sieve having a mesh size of 850 μm, was disintegrated until it passed through the sieve. 3 parts by mass of the water-absorbent resin (100b), a fine powder which had passed through the sieve having a mesh size of 150 μm, was obtained relative to 100 parts by mass of the water-absorbent resin (10B) as a product. The water-absorbent resin (100b) that is a fine powder after surface cross-linking had an aluminum sulfate content of 2%.

In the water-absorbent resin (100B) as a product, a centrifuge retention capacity (CRC) was 29.8 g/g, an absorbency against pressure of 4.83 kPa (AAP) was 23.8 g/g, and a saline flow conductivity (SFC) was $65(10^{-7}\ cm^3 \cdot s \cdot g^{-1})$.

Example 12

A mixture of (i) 15 parts by mass of the water-absorbent resin (10a) that is fine particles, which had been obtained in Production Example 2, and (ii) 3 parts by mass of the water-absorbent resin (100b) that is a fine powder after being subjected to surface cross-linking, which had been obtained in Production Example 3, was mixed with, 20 parts by mass of hot water having a temperature of 95° C. The obtained hydrogel was dried at 180° C., pulverized by a roll mill, and classified by using sieves respectively having mesh sizes of 850 μm and 150 μm, thereby obtaining a water-absorbent resin (80) that is an agglomerated particulate product of irregular shape. A proportion of a water-absorbent resin that is an agglomerated fine powder which had passed through the sieve having a mesh size of 150 μm was 15 mass %, with respect to a water-absorbent resin that is an agglomerated product which had passed through the sieve having a mesh size of 850 μm.

In the water-absorbent resin (80) that is an agglomerated particulate product of irregular shape, a centrifuge retention capacity (CRC) was 28 g/g, and an absorbency against pressure of 2.07 kPa (AAP2) was 19 g/g.

Example 13

A mixture of (i). 100 parts by mass of the water-absorbent resin (10A) that is a non-agglomerated particulate product before being subjected to surface cross-linking and (ii) 16 parts by mass of the water-absorbent resin (80) that is an agglomerated particulate product containing a multivalent metal before subjected to surface cross-linking, which had been obtained in Example 8, was evenly mixed in a plow mixer with, a surface treatment agent solution including 0.46 parts by mass of 1,4-butanediol, 0.70 parts by mass of propyleneglycol, and 3.5 parts by mass of pure water, and the thus obtained mixture was heated in a puddle mixer which had been heated to 200° C. The heated mixture was cooled down. 100 parts by mass of a cooled resultant was mixed with 3 parts by mass of a mixture solution including 2.5 parts by mass of 25% aluminum sulfate aqueous solution and 0.5 parts by mass of 50% sodium lactate aqueous solution, and the mixture was left still for 30 minutes at a room temperature.

The mixture was classified by using JIS standard sieves respectively having mesh sizes of 850 μm and 150 μm, thereby obtaining a water-absorbent resin (90) as a mixture. A proportion of a water-absorbent resin that is a fine powder which had passed through the sieve having a mesh size of 150 μm was 1.5 mass %. The powder dust amount of the obtained water-absorbent resin (90) was 90 ppm. In the water-absorbent resin (90) as a product, a centrifuge retention capacity (CRC) was 29.8 g/g, an absorbency against pressure of 4.83 kPa (AAP) was 23.8 g/g, and a saline flow conductivity (SFC) was $62(10^{-7}\ cm^3 \cdot s \cdot g^{-1})$.

Comparative Example 6

As in Example 7, a mixture of (i) 100 parts by mass of the water-absorbent resin (10A) that is a non-agglomerated particulate product before being subjected to surface cross-linking and (ii) 16 parts by mass of the water-absorbent resin (10) that is an agglomerated particulate product before being surface cross-linking, which had been obtained in Example 1, was evenly mixed in a plow mixer with a surface treatment agent solution including 0.46 parts by mass of 1,4-butanediol, 0.70 parts by mass of propyleneglycol, and 3.5 parts by mass of pure water, and the thus obtained mixture was heated in a puddle mixer which had been heated to 200° C. The heated mixture was cooled down and classified by using a JIS standard sieve having a mesh size of 850 µm, thereby obtaining a water-absorbent resin (31), as a product, having a particle size of not more than 850 µm. A water-absorbent resin after the surface cross-linking, remaining on the sieve having a mesh size of 850 µm, was disintegrated until it passed through the sieve. In the water-absorbent resin (31) that is a mixture, a centrifuge retention capacity (CRC) was 29.8 g/g, an absorbency against pressure of 4.83 kPa (AAP) was 24.0 g/g, and a saline flow conductivity (SFC) was 28($10^{-7}$ cm$^3$·s·g$^{-1}$). The powder dust amount of the obtained water-absorbent resin (31) was 250 ppm.

Comparative Example 7

As in Example 7, a mixture of (i) 100 parts by mass of the water-absorbent resin (10A) that is a non-agglomerated particulate product before being subjected to surface cross-linking and (ii) 16 parts by mass of the water-absorbent resin (21) that is an agglomerated particulate product before being surface cross-linking, which had been obtained in Comparative Example 1, was evenly mixed in a plow mixer with a surface treatment agent solution including 0.46 parts by mass of 1,4-butanediol, 0.70 parts by mass of propyleneglycol, and 3.5 parts by mass of pure water, and the thus obtained mixture was heated in a puddle mixer which had been heated to 200° C. The heated mixture was cooled down and classified by using a JIS standard sieve having a mesh size of 850 µm, thereby obtaining a water-absorbent resin (41), as a product, having a particle size of not more than 850 µm. In the water-absorbent resin (41) that is a mixture, a centrifuge retention capacity (CRC) was 29.8 g/g, an absorbency against pressure of 4.83 kPa (AAP) was 23.8 g/g, and a saline flow conductivity (SFC) was 25($10^{-7}$ cm$^3$·s·g$^{-1}$). The powder dust amount of the obtained water-absorbent resin (31) was 300 ppm.

Comparative Example 8

As in Example 7, a mixture of (i) 100 parts by mass of the water-absorbent resin (10A) that is a non-agglomerated particulate product before being subjected to surface cross-linking and (ii) 16 parts by mass of the water-absorbent resin (22) that is an agglomerated particulate product before being surface cross-linking, which had been obtained in Comparative Example 2, was evenly mixed in a plow mixer with a surface treatment agent solution including 0.46 parts by mass of 1,4-butanediol, 0.70 parts by mass of propyleneglycol, and 3.5 parts by mass of pure water, and the thus obtained mixture was heated in a puddle mixer which had been heated to 200° C. The heated mixture was cooled down and classified by using a JIS standard sieve having a mesh size of 850 µm, thereby obtaining a water-absorbent resin (51), as a product, having a particle size of not more than 850 µm. In the water-absorbent resin (51) that is a mixture, a centrifuge retention capacity (CRC) was 29.8 g/g, an absorbency against pressure of 4.83 kPa (AAP) was 23.8 g/g, and a saline flow conductivity (SFC) was 25($10^{-7}$ cm$^3$·s·g$^{-1}$). The powder dust amount of the obtained water-absorbent resin (51) was 500 ppm.

Production Example 4

506 parts by mass of acrylic acid, 4431 parts by mass of 37 mass % sodium acrylate aqueous solution, 581 parts by mass of pure water, and 11.5 parts by mass of polyethyleneglycoldiacrylate (molecular weight was 523) were dissolved in a reactor that had been prepared by placing a lid on a stainless-steel double-arm kneader equipped with two sigma blades and a jacket, thereby obtaining a reaction solution. Then, the reaction solution was deaerated for 20 minutes in an atmosphere of nitrogen gas. Subsequently, 29 parts by mass of 10 mass % sodium persulfate aqueous solution and 24 parts by mass of 0.1 mass % L-ascorbic acid aqueous solution were added to the reaction solution, while the reaction solution was stirred. Approximately one minute later, polymerization was initiated. During the polymerization, the reaction solution was kept at 20° C. to 95° C. while the generated gel was being pulverized. After 30 minutes from the initiation of the polymerization, the cross-linked hydrogel polymer was removed from the reactor. Thus obtained cross-linked hydrogel polymer had been fragmented so that its diameter was approximately 5 mm or smaller.

The cross-linked hydrogel polymer fragmented was spread out on a wire mesh of 50 mesh, and was dried by hot air at 180° C. for 50 minutes. A dried cross-linked polymer thus obtained was pulverized by using a roll mill, and then classified by using a JIS standard sieve whose mesh size was 710 µm and a JIS standard sieve whose mesh size was 150 µm, thereby obtaining a water-absorbent resin (30A) and water-absorbent resin (30a). The water-absorbent resin (30A) was a non-agglomerated particulate product which had a mass average particle diameter of 346 µm and logarithmic standard deviation (σζ) of mass average particle diameter of 0.31. The water-absorbent resin (30a) was a fine powder which had passed through a sieve having a mesh size of 150 µm. A large water-absorbent resin not having passed through the sieve having a mesh size of 710 µm was pulverized and then classified. 18 parts by mass of the water-absorbent resin (30a) was obtained, relative to 100 parts by mass of the water-absorbent resin (30A). In the water-absorbent resin (30A) before being subjected to surface cross-linking, a centrifuge retention capacity was 32 g/g and water soluble component content was 7 mass %.

Next, 100 parts by mass of the water-absorbent resin (30A) was evenly mixed in a plow mixer with a surface treatment agent solution including 0.4 parts by mass of 1,4-butanediol, 0.6 parts by mass of propyleneglycol, and 3.0 parts by mass of pure water, and the thus obtained mixture was heated in a puddle mixer which had been heated to 200° C. An average residence time of the mixture was approximately 50 minutes. The heated mixture after surface cross-linking was cooled down, and 100 parts by mass of a cooled resultant was mixed with 3 parts by mass of a mixture solution including 2.5 parts by mass of 25% aluminum sulfate aqueous solution and 0.5 parts by mass of 50% sodium lactate aqueous solution, and the mixture was left still for 30 minutes at a room temperature.

Subsequently, the mixture was classified by using JIS standard sieves respectively having mesh sizes of 710 µm and 150 µm, thereby obtaining a water-absorbent resin (30B) as a product and a water-absorbent resin (30b) that is a fine powder which had passed through the sieve having a mesh size of 150 µm and whose surface is cross-linked. The water-absorbent resin after being subjected to surface cross-linking, remaining on the sieve having a mesh size of 710 µm, was disintegrated until it passed through the sieve. 3 parts by mass of the water-absorbent resin (30b), a fine powder which had passed through the sieve having a mesh size of 150 µm, was obtained relative to 100 parts by mass of the water-absorbent resin (30B) as a product. The water-absorbent resin (30b) that is a fine powder after surface cross-linking had an aluminum sulfate content of 3%.

In the water-absorbent resin (30B) as a product, a centrifuge retention capacity (CRC) was 26.5 g/g, an absorbency against pressure of 4.83 kPa (AAP) was 23.5 g/g, and a saline flow conductivity (SFC) was $140(10^{-7}\,cm^3 \cdot s \cdot g^{-1})$.

Example 14

A mixture of (i) 18 parts by mass of the fine powder (30a) before subjected to surface cross-linking and (ii) 3 parts by mass of the fine powder (30b) after subjected to surface cross-linking, both of which had been obtained in Production Example 2, was mixed with 24 parts by mass of hot water having a temperature of 95° C. The obtained hydrogel was dried at 180° C., pulverized by a roll mill, and classified by using sieves respectively having mesh sizes of 710 µm and 150 µm, thereby obtaining a water-absorbent resin (100) that an agglomerated particulate product. A proportion of a water-absorbent resin that is a fine powder which had passed through the sieve having a mesh size of 150 µm was 20 mass %, with respect to a water-absorbent resin that is an agglomerated product which had passed through the sieve having a mesh size of 710 µm.

In the water-absorbent resin (100) that is an agglomerated particulate product, a centrifuge retention capacity (CRC) was 25 g/g, and an absorbency against pressure of 2.07 kPa (AAP2) was 16 g/g.

Example 15

A mixture of (i) 100 parts by mass of the water-absorbent resin (30A) that is a non-agglomerated particulate product before being subjected to surface cross-linking and (ii) 21 parts by mass of the water-absorbent resin (100) that is an agglomerated particulate product containing a multivalent metal before subjected to surface cross-linking, which had been obtained in Example 10, was evenly mixed in a plow mixer with a surface treatment agent solution including 0.46 parts by mass of 1,4-butanediol, 0.70 parts by mass of propyleneglycol, and 3.5 parts by mass of pure water, and the thus obtained mixture was heated in a puddle mixer which had been heated to 200° C. The heated mixture was cooled down. 100 parts by mass of a cooled resultant was mixed with 3 parts by mass of a mixture solution including 2.5 parts by mass of 25% aluminum sulfate aqueous solution and 0.5 parts by mass of 50% sodium lactate aqueous solution, and the mixture was left still for 30 minutes at a room temperature.

The mixture was classified by using JIS standard sieves respectively having mesh sizes of 710 µm and 150 µm, thereby obtaining a water-absorbent resin (11B) and a water-absorbent resin (11b). The water-absorbent resin (11B) was a non-agglomerated particulate product which had a mass average particle diameter of 360 µm and logarithmic standard deviation (σζ) of mass average particle diameter of 0.38. The water-absorbent resin (11b) was a fine powder which had passed through a sieve having a mesh size of 150 µm. A proportion of a water-absorbent resin that is a fine powder which had passed through the sieve having a mesh size of 150 µm was 2 mass %. The powder dust amount of the obtained water-absorbent resin (11B) was 150 ppm. In the water-absorbent resin (11B) as a product, a centrifuge retention capacity (CRC) was 26.5 g/g, an absorbency against pressure of 4.83 kPa (AAP) was 23.4 g/g, and a saline flow conductivity (SFC) was $120(10^{-7}\,cm^3 \cdot s \cdot g^{-1})$.

Comparative Example 9

A mixture of (i) 100 parts by mass of the water-absorbent resin (30A) that is a non-agglomerated particulate product before being subjected to surface cross-linking and (ii) 21 parts by mass of the water-absorbent resin (100) that is an agglomerated particulate product containing a multivalent metal before subjected to surface cross-linking, which had been obtained in Example 14, was evenly mixed in a plow mixer with a surface treatment agent solution including 0.46 parts by mass of 1,4-butanediol, 0.70 parts by mass of propyleneglycol, and 3.5 parts by mass of pure water, and the thus obtained mixture was heated in a puddle mixer which had been heated to 200° C. The heated mixture was cooled down. 100 parts by mass of a cooled resultant was mixed with 3 parts by mass of a mixture solution including 2.5 parts by mass of 25% aluminum sulfate aqueous solution and 0.5 parts by mass of 50% sodium lactate aqueous solution, and the mixture was left still for 30 minutes at a room temperature.

The mixture was classified by using a JIS standard sieve having a mesh size of 710 µm, thereby obtaining a water-absorbent resin (71) that is a non-agglomerated particulate product which had a mass average particle diameter of 350 µm and logarithmic standard deviation (σζ) of mass average particle diameter of 0.40. The powder dust amount of the obtained water-absorbent resin (71) was 350 ppm. In the water-absorbent resin (71) as a product, a centrifuge retention capacity (CRC) was 26.2 g/g, an absorbency against pressure of 4.83 kPa (AAP) was 23.2 g/g, and a saline flow conductivity (SFC) was $100(10^{-7}\,cm^3 \cdot s \cdot g^{-1})$.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A production process for a water-absorbing agent containing water-absorbent resin particles having an internal cross-linked structure obtained by polymerizing a water-soluble unsaturated monomer, the production process comprising the steps of:
   (A) forming non-surface-treated water-absorbent resin particles having an internal cross-linked structure obtained by polymerizing the water-soluble unsaturated monomer in the presence of a covalent bonding cross-linking agent;
   (B) obtaining surface treated water-absorbent resin fine particles by reacting resin fine particles in the presence of a surface-cross-linking agent; and
   (C) causing the surface-treated water-absorbent resin fine particles to be contained in the non-surface-treated water-absorbent resin particles.

2. The production process according to claim 1, wherein;
   a mass ratio of the non-surface-treated water-absorbent resin particles and the surface-treated water-absorbent resin fine particles ranges from 99:1 to 50:50.

3. A water-absorbing agent obtained in the production process for a water-absorbing agent according to claim 2.

4. The production process according to claim 1, further comprising the step of:
   (D) heating non-surface-treated water-absorbent resin particles having the surface-treated water-absorbent resin fine particles contained therein, or mixing water-absorbent resin particles having the surface-treated water-absorbent resin fine particles contained therein with a second surface cross-linking agent and then heating a resultant mixture, so as to cross-link vicinities of surfaces of the water-absorbent resin particles.

5. The production process according to claim 4, wherein: the step (D) is the following step (d):

(d) heating water-absorbent resin particles having a first water-soluble multivalent metal salt contained therein, or mixing the water-absorbent resin particles having the first water-soluble multivalent metal salt contained therein with the second surface cross-linking agent and then heating a resultant mixture, so as to cross-link vicinities of surfaces of the water-absorbent resin particles.

6. The production process according to claim 5, further comprising the step of:

(e) adding a second water-soluble multivalent metal salt to surfaces of the water-absorbent resin particles obtained in the step (d).

7. The production process according to claim 6, wherein:
in the step (c), a content of the first water-soluble multivalent metal salt in the water-absorbent resin particles ranges from 0.001 to 1 mass %, with respect to 100 parts by mass of the water-absorbent resin particles;
in the step (e), the amount of the second water-soluble multivalent metal salt added ranges from 0.001 to 4 mass %, with respect to 100 parts by mass of the water-absorbent resin particles; and
the content of the first water-soluble multivalent metal salt is less than the amount of the second water-soluble multivalent metal salt added.

8. The production process according to claim 6, wherein:
the first water-soluble multivalent metal salt and the second water-soluble multivalent metal salt each include aluminum.

9. The production process according to claim 5, wherein:
the surface cross-linking agent used in the step (d) includes polyhydric alcohol.

10. The production process according to claim 1, wherein:
the steps (A) and (C) are respectively the following steps (a) and (c):
(a) step of forming water-absorbent resin particles not containing first water-soluble multivalent metal salt, the water-absorbent resin particles having an internal cross-linked structure and being obtained by polymerizing a water-soluble unsaturated monomer in the presence of a covalent bonding cross-linking agent; and
(c) step of causing water-absorbent resin fine particles containing the first water-soluble multivalent metal salt to be contained in the water-absorbent resin particles not containing the first water-soluble multivalent metal salt.

11. The production process according to claim 10, wherein:
the water-absorbent resin fine particles including the first water-soluble multivalent metal salt are so small in size as to pass through a sieve having a mesh size of 300 μm.

12. The production process according to claim 10, wherein:
the step (c) is realized by agglomeration of the water-absorbent resin particles formed in the step (a) and the water-absorbent resin fine particles containing the first water-soluble multivalent metal salt.

13. The production process according to claim 12, wherein:
the agglomeration is performed in the presence of water.

14. The production process according to claim 10, wherein:
the step (a) and step (c) are a step of, by polymerizing a water-soluble unsaturated monomer in the presence of a covalent bonding cross-linking agent before and/or during the addition of the water-absorbent resin fine particles containing the first water-soluble multivalent metal salt, forming water-absorbent resin particles not containing the first water-soluble multivalent metal salt and having an internal cross-linked structure.

15. The production process according to claim 10, wherein:
the step (c) is realized by mixing a hydrogel water-absorbent resin having a moisture content of not less than 20 mass % and the water-absorbent resin fine particles containing the first water-soluble multivalent metal salt.

16. A water-absorbing agent obtained in the production process for a water-absorbing agent according to claim 1.

* * * * *